(12) United States Patent
Seto et al.

(10) Patent No.: US 7,179,019 B2
(45) Date of Patent: Feb. 20, 2007

(54) METHOD AND STRUCTURE FOR LAYING COMMUNICATION CABLE IN UNDERGROUND LINE, AND MEMBERS USED FOR LAYING

(75) Inventors: Ichiro Seto, Chiba (JP); Fumiaki Tsuchiya, Chiba (JP); Isaburo Yagi, Osaka (JP); Katsuhiko Azuma, Osaka (JP); Nobuyasu Kishibe, Osaka (JP); Koji Aso, Osaka (JP); Yasuhiro Ueda, Osaka (JP)

(73) Assignees: Ashimori Industry Co., Ltd., Osaka (JP); Sanski Engineering Co., Ltd., Tokyo (JP)

( * ) Notice: Subject to any disclaimer, the term of this patent is extended or adjusted under 35 U.S.C. 154(b) by 0 days.

(21) Appl. No.: 10/110,001

(22) PCT Filed: Aug. 7, 2001

(86) PCT No.: PCT/JP01/06767

§ 371 (c)(1),
(2), (4) Date: Aug. 5, 2002

(87) PCT Pub. No.: WO02/13345

PCT Pub. Date: Feb. 14, 2002

(65) Prior Publication Data
US 2003/0021633 A1    Jan. 30, 2003

(30) Foreign Application Priority Data

| Aug. 7, 2000 | (JP) | ............................. 2000-275668 |
| Sep. 25, 2000 | (JP) | ............................. 2000-289743 |
| Dec. 4, 2000 | (JP) | ............................. 2000-368222 |
| Feb. 19, 2001 | (JP) | ............................. 2001-42326 |
| Jul. 9, 2001 | (JP) | ............................. 2001-207852 |

(51) Int. Cl.
*F16L 7/00* (2006.01)
*F16L 3/04* (2006.01)

(52) U.S. Cl. ................................. 405/183.5; 405/184.4
(58) Field of Classification Search ............. 405/183.5, 405/184, 184.4, 177, 174
See application file for complete search history.

(56) References Cited

U.S. PATENT DOCUMENTS 244,752 A * 7/1881 Hunter et al. ............... 405/156

(Continued)

FOREIGN PATENT DOCUMENTS

DE            29802655 U1    4/1998

(Continued)

*Primary Examiner*—Michael Safavi
(74) *Attorney, Agent, or Firm*—Wolf, Greenfield & Sacks, P.C.

(57) ABSTRACT

A laying method for laying communication cables (16) is provided which allows to lay optical fiber cables (20) in an underground pipeline such as a sewage pipe neither placing direct tension nor allowing slack on them, and for a main pipe in which a plurality of optical fiber cables (20) are to be laid, the method also allows to lay optical fiber cables (20) in the upper space of inside the pipeline and to obviate the need of an expensive robot for the laying operation. In the proposed laying method, a high-strength low-elongation tension member is disposed to be slidable in the lengthwise direction along each optical fiber cable (20, 21, 22), and the tension members (25, 26, 27) are drawn into the underground pipeline (1) to tension the trunk tension member (25) thereby stretching the trunk tension member (25) substantially straight in the underground pipeline (1), and thus the optical fiber cables (20, 21, 22) are laid in the upper space of inside the underground pipeline (1). Also the branch tension member (26, 27) is tensioned in the branch pipe (4, 5) to lay the optical fiber cables (21, 22) in the branch pipe without allowing slack.

29 Claims, 43 Drawing Sheets

U.S. PATENT DOCUMENTS

| | | |
|---|---|---|
| 4,647,251 A * | 3/1987 | Gale ................. 405/184.4 |
| 5,087,153 A * | 2/1992 | Washburn ............ 405/183.5 |
| 5,788,414 A | 8/1998 | Gordon |
| 6,377,734 B1 | 4/2002 | Mayr et al. |
| 6,527,478 B2 * | 3/2003 | Finzel et al. ......... 405/184.4 |
| 6,536,463 B1 * | 3/2003 | Beals et al. ............ 137/318 |

FOREIGN PATENT DOCUMENTS

| | | |
|---|---|---|
| DE | 19813728 A1 | 9/1999 |
| EP | 0905433 | 3/1999 |
| EP | 0942504 A1 | 9/1999 |
| GB | 2 124 728 A | 7/1982 |
| JP | 55-106012 | 8/1980 |
| JP | 55-130539 * | 9/1980 |
| JP | 3-50483 | 1/1988 |
| JP | 04199105 | 7/1992 |
| JP | 8-103012 | 4/1996 |
| JP | 11-105134 | 4/1999 |
| JP | 11-150822 | 6/1999 |
| JP | 2000-104325 | 4/2000 |
| JP | 2001-104325 | 4/2000 |

* cited by examiner

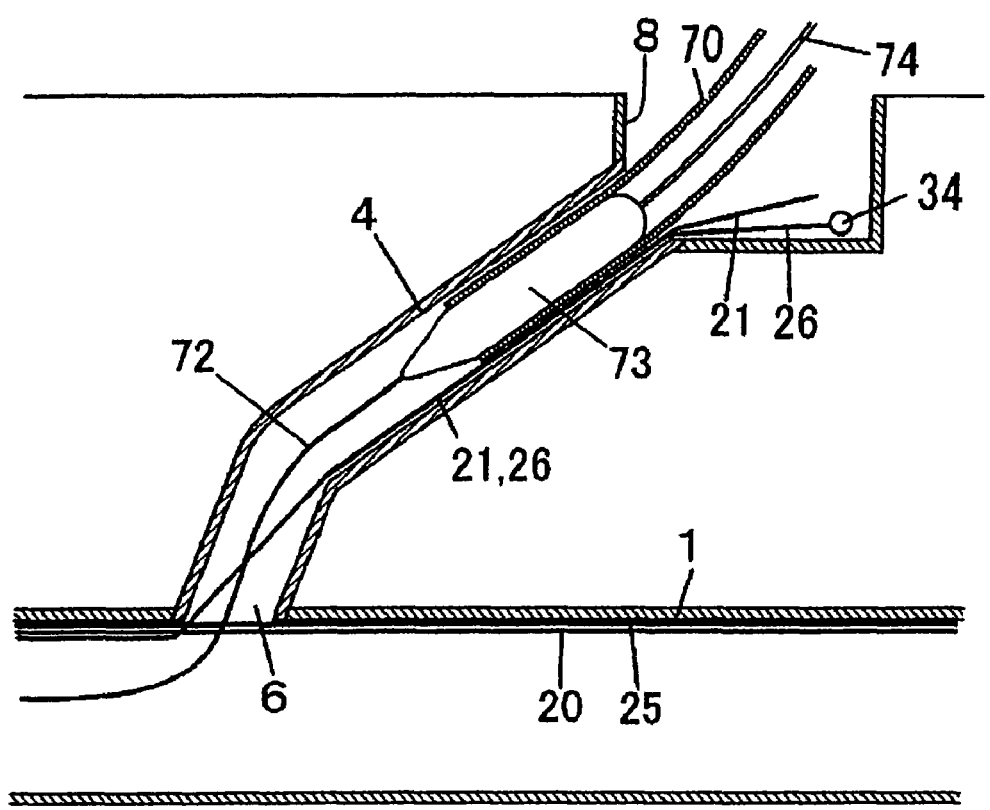

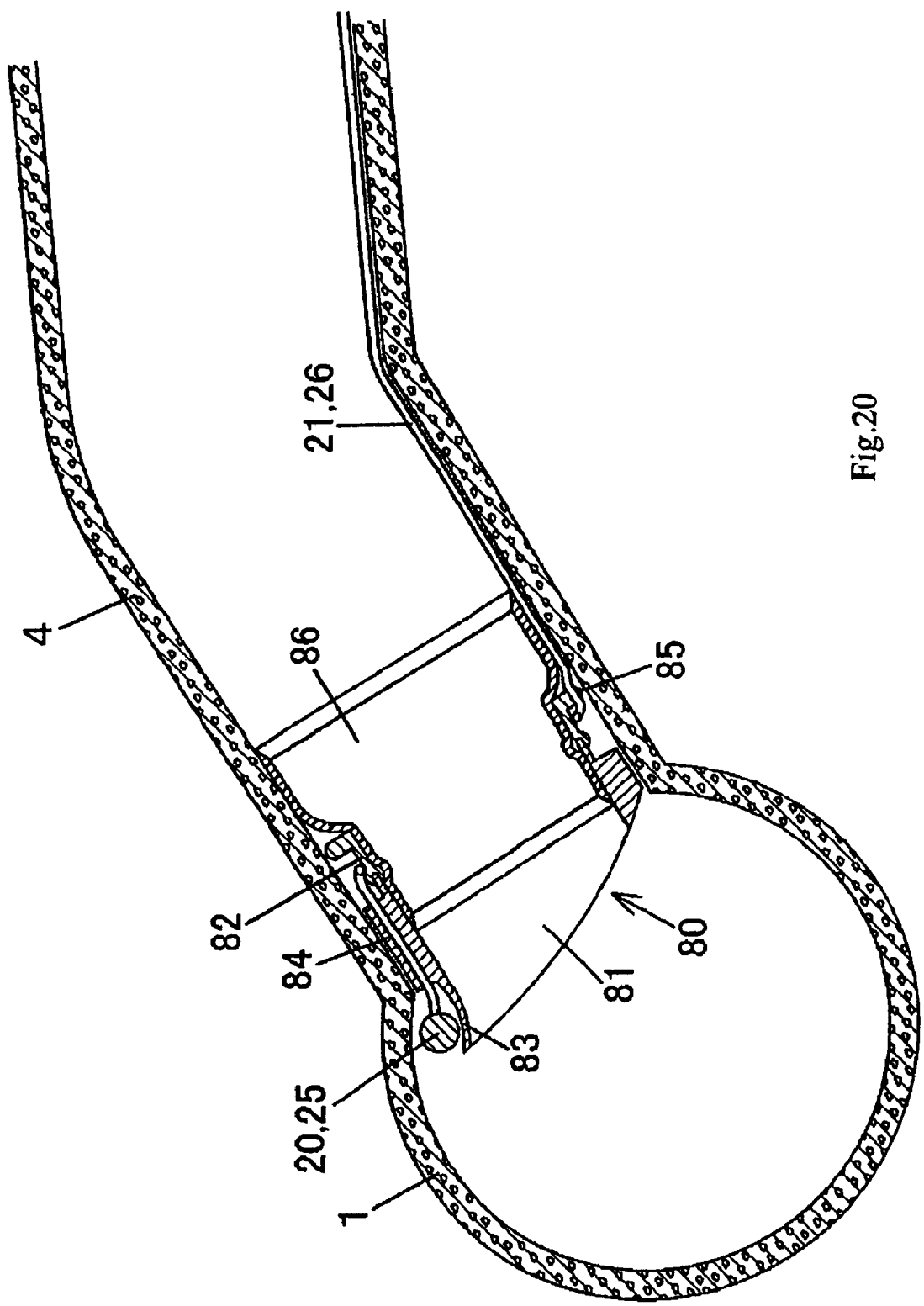

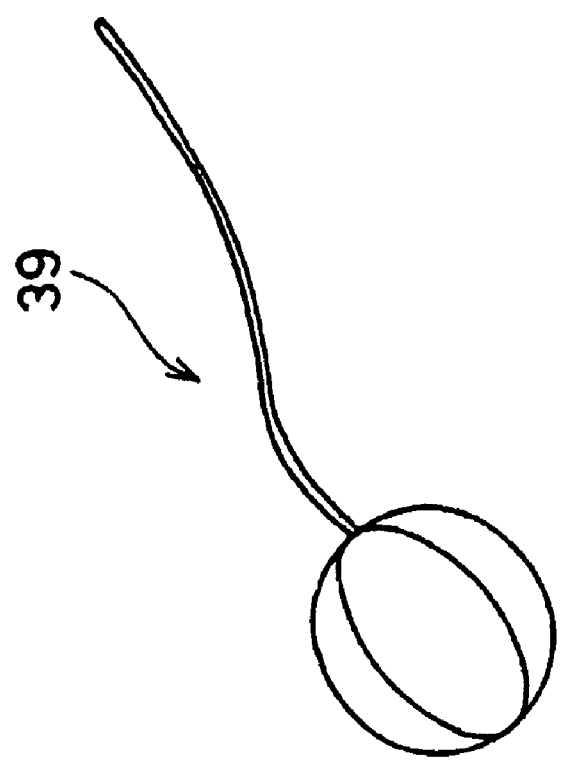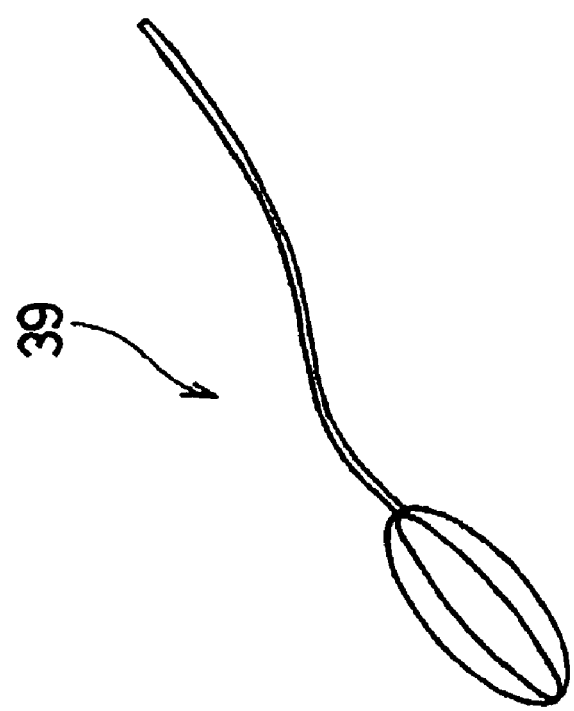
Fig. 33

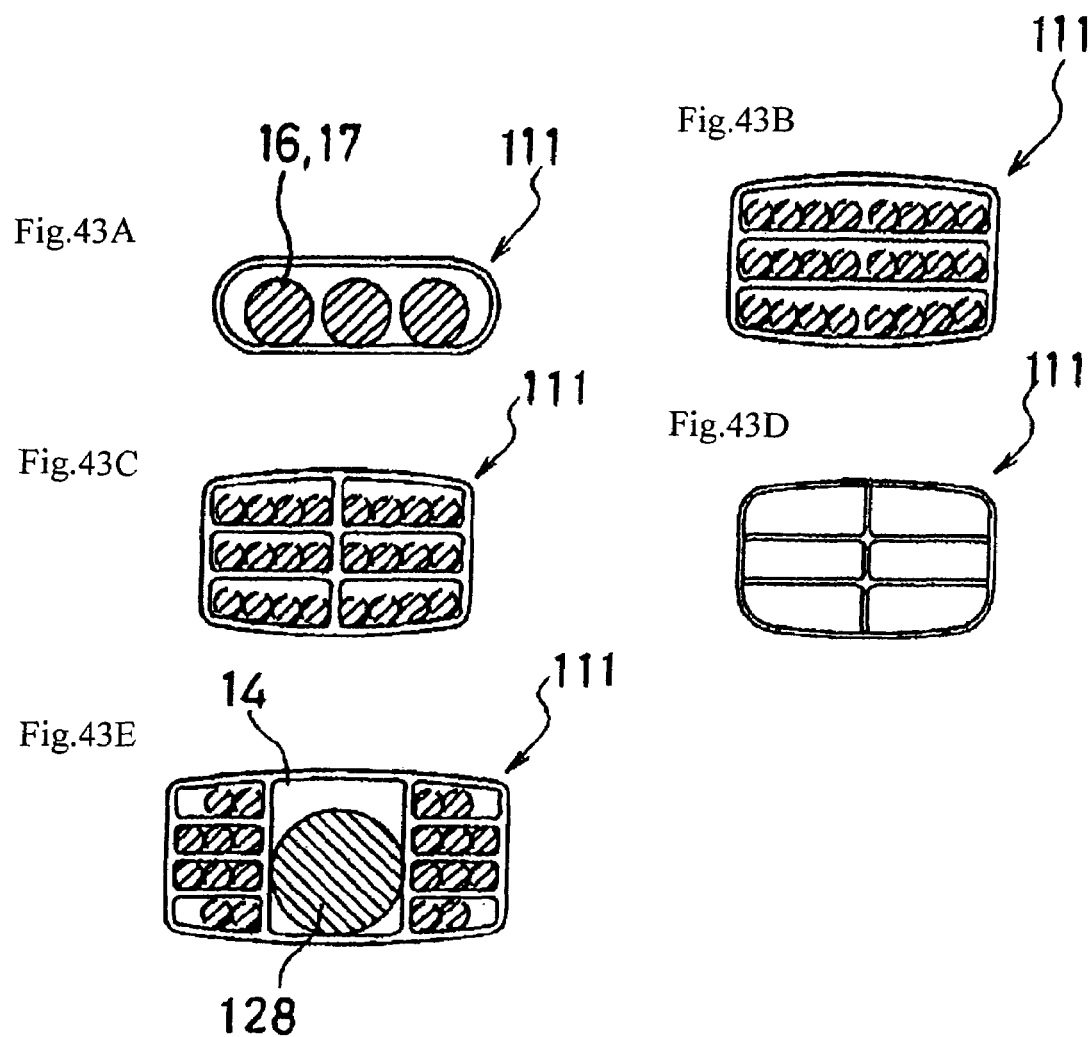

METHOD AND STRUCTURE FOR LAYING COMMUNICATION CABLE IN UNDERGROUND LINE, AND MEMBERS USED FOR LAYING

TECHNICAL FIELD

This invention relates to laying methods, laying structures, and structural members for laying communication cables such as optical fiber cables in underground pipelines, particularly in sewer pipelines.

In recent years, in pursuit of new communication systems, creation of an information and communications network employing optical fiber cables as its transmission medium has been extensively studied. And, as the transmission path, a method of laying optical fiber cables in sewer pipelines, which offer an established communication path to each household, has gained much attention rather than a method of replacing the existing telephone lines with optical fiber cables.

BACKGROUND ART

Optical fiber cables are easy to handle and superior in transmission rate and transmission capacity owing to their lightness and flexibility compared to existing metal cables, therefore they are considered to be the likely winner of the competition for a next generation transmission medium.

However, an optical fiber cable has a drawback in that its elongation at breakage is very small because its material is made of glass. Therefore, when laying an optical fiber cable in a sewerage pipe, the operation needs to be carefully conducted so that the optical fiber cable will not undergo tension.

Studies have been going on about the laying of large diameter optical fiber cables, called a trunk cable or a branch cable and having a outer diameter of about 20 mm, for use in transmission of large amount of information, in the main pipes of sewer pipelines, and also the laying of relatively small diameter optical fiber cables called a drop cable and having an outer diameter of about 5 mm in branch pipes connected to each household from a main pipe.

When laying an optical fiber cable in a sewer pipeline in which a gravitational flow down method is adopted, it is required to lay the optical fiber cable consisting of trunk cables, branch cables, and drop cables in the upper space of inside the sewer main pipe so as not to hinder the sewage flow therein.

Concerning the above described background art, techniques described in JP, B, 3-50483 and JP, A, 8-103012 are known as methods for laying an optical fiber cables in the upper space of inside a sewer main pipe without tensioning the cable.

In these prior arts, a laying robot is introduced in a sewer main pipe while inserting a optical fiber cable raising the optical fiber cable with the robot's arm and pressing it against the upper part of the inner surface of the sewer main pipe and also attaching hooks equipped on the laying robot to the inner surface of the sewer main pipe at an appropriate spacing while hanging the optical fiber cable on the hook.

The method for attaching the hooks in the above described techniques is such that hook mount holes are drilled in the upper part of the inner surface of a sewer main pipe with a drill equipped on the laying robot and after filling an adhesive in a hook mount hole, a hook is forced into the hook mount hole overflowing the adhesive in the hook mount hole to secure the hook in the inner surface of the sewer main pipe.

In this conventional technique, however, an optical fiber cable between hooks may sag under its own weight and therefore the spacing between the hooks needs to be relatively short to prevent a creep rupture due to the sag, and therefore a large amount of time is required for the hook mounting operation.

Moreover, the laying robot is equipped with mechanisms for conducting various operations in a sewer pipeline such as an arm mechanism for pressing the optical fiber cable, a drill mechanism for drilling hook mount holes, an injection mechanism for injecting an adhesive, and a mechanism for forcing the hook into a hook mounting hole. Thus, the robot has a complex structure requiring a high cost. To construct an optical fiber cable network in a sewer pipeline within short time, it is desired that the laying operation consists of a low cost and versatile technique. In this respect, the techniques described in the above publications are not readily adopted.

Furthermore, no consideration so far has been given to the laying of optical fiber cables in branch pipes extending from a sewer main pipe. For this reason, there are occasions that smooth sewage flow is hindered or optical fibers are damaged.

DISCLOSURE OF INVENTION

In view of the above mentioned background, it is an object of the present invention to provide a laying method and laying structure for laying optical fiber cables in underground pipelines, and structural members used for the laying, which makes it possible to lay optical fiber cables without applying direct tension on them while preventing their loosening in underground pipelines such as a sewerage pipe, and also to place the communication cables such as optical fiber cables in the upper space of inside the main pipes in which multiple optical fiber cables are laid. It is a secondary object of the present invention to provide a laying method and laying structure for laying communication cables in underground pipelines and structural members used for the laying, which makes it more appropriate to lay communication cables in branch pipes extending from a sewer main pipe.

Accordingly, the present invention relates to a method for laying communication cables in an underground pipeline which has at least one or more branch pipes branching off from a main pipe constructed between pits, characterized in that, a high-strength low-elongation tension member is disposed along each of the trunk communication cables (corresponds to the above mentioned trunk and branch cables) laid in a main pipe and branch communication cables (corresponds to the above mentioned lead-in wire) laid in a branch pipe, the tension member being slidable in the lengthwise direction with respect to each communication cable, and then each communication cable is inserted into the main pipe and the branch pipe by drawing in the trunk tension member placed along the trunk communication cable from one pit to the other pit within the main pipe and the branch tension member placed along the branch communication cable from the foregoing pit to a branch pipe box through the main pipe and the branch pipe, and subsequently each communication cable is laid in the upper space of inside the main pipe by tensioning each tension member thereby stretching tension members inserted in the main pipe substantially straight in the upper space of inside the main pipe, and also the branch communication cable is laid in the branch pipe in such a way that it is prevented from becoming loose by tensioning the branch tension member inserted in the branch pipe.

The present invention also relates to the above described method for laying communication cables in an underground pipeline, characterized in that the branch tension member to be inserted in the branch pipe is tied to the trunk tension member to be laid in the main pipe at a position corresponding to an opening of branch pipe in the main pipe.

The present invention also relates to the above described method for laying communication cables in an underground pipeline, characterized in that the branch tension member to be inserted in a branch pipe branches off from the trunk tension member to be laid in the main pipe at a position corresponding to an opening of branch pipe in the main pipe.

The present invention also relates to the above described method for laying communication cables in an underground pipeline, characterized in that communication cables and tension members are inserted in a guide pipe, both being placed in parallel so as to be slidable with each other in the lengthwise direction, and a branch communication cable and a branch tension member branch off to the outside from the foregoing guide pipe at a position of the guide pipe corresponding to an opening of branch pipe in the main pipe.

The present invention also relates to the above described method for laying communication cables in an underground pipeline, characterized in that the tension member has a cylindrical form and the communication cable is inserted in the tension member so that the communication cable is slidable in the lengthwise direction with respect to the tension member.

The present invention also relates to the above described method for laying communication cables in an underground pipeline, characterized in that the tension member is a string-like body or a strip-like body and the communication cable is partly bound to the tension member allowing some slack thereon so that the communication cable is slidable in the lengthwise direction with respect to the tension member.

The present invention also relates to the above described method for laying communication cables in an underground pipeline, characterized in that the cross section of the tension member consists of a rigid body having a shape including a space open to one direction such as a substantially U-shape, a substantially V-shape, and a substantially W-shape and a communication cable is placed in the space of the tension member so that the communication cable is slidable with respect to the tension member.

The present invention also relates to the above described method for laying communication cables in an underground pipeline, characterized in that after laying a trunk tension member and a trunk communication cable in the upper space of inside the main pipe by tensioning the trunk tension member, an arcuate or ring-like slack prevention member is inserted in the main pipe, and thereafter the slack prevention member is expanded in diameter to press the trunk tension member and the trunk communication cable against the inner wall surface of the main pipe.

The present invention also relates to the above described method for laying communication cables in an underground pipeline, characterized in that after installing a tension member and a communication cable into the main pipe and the branch pipe, a guide member is disposed at an opening of branch pipe of the main pipe to make the communication cable and the tension member skirt around the area directly beneath the opening of branch pipe.

The present invention also relates to the above described method for laying communication cables in an underground pipeline, characterized in that after installing the tension member and a communication cable in the main pipe and the branch pipe, a flexible and shape retaining pipe having a diameter smaller than the inner diameter of the branch pipe is inserted in the branch pipe so that the branch communication cable and the branch tension member installed in the branch pipe are clamped between the inner surface of the branch pipe and the outer surface of the pipe.

The present invention also relates to the above described method for laying communication cables in an underground pipeline, characterized in that after installing the tension member and the communication cable in the main pipe and the branch pipe, the branch tension member and the branch communication cable at an opening of branch pipe is guided from the upper space of inside the main pipe to the upper part or lower part of the branch pipe by means of a guide member disposed in the opening of branch pipe, and the branch tension member is tensioned so that the branch communication cable is laid along the upper surface or the lower surface of the branch pipe.

The present invention also relates to the above described method for laying communication cables in an underground pipeline, characterized in that the guide member includes a trunk slide part projecting into the main pipe from the branch pipe and slidably holding members to be laid in the main pipe, and the branch slide part for slidably holding members to be laid in the branch pipe.

The present invention also relates to the above described method for laying communication cables in an underground pipeline, characterized in that a curable cylindrical fixing member is hardened in the end of the guide member placed inward to the branch pipe in a state that it is expanded and pressed against the inner surface of a branch pipe so that the guide member is secured to the branch pipe.

The present invention also relates to the above described method for laying communication cables in an underground pipeline, characterized in that the guide member consists of a tubular main part having the foregoing trunk slide part and a support part for supporting the branch communication cable and the branch tension member, and a tubular rotary part having the foregoing branch slide part and rotatably fitted against the foregoing tubular main part, wherein the support part and the branch slide part is aligned with each other to hold the branch communication cable and the branch tension member, and then the guide member is placed at an opening of branch pipe holding the members laid in the main pipe in the upper space of inside the main pipe with the trunk slide part of the tubular main part, and then the tubular rotary part is rotated with respect to the cylinder body thereby placing the branch slide part in the lower part of the branch pipe so that the branch communication cable and the branch tension member are guided into the lower part of the branch pipe.

The present invention also relates to the above described method for laying communication cables in an underground pipeline, characterized in that the guide member consists of a pipe body formed of a plate member by spirally rolling it up and fitting adjacent side edges of the plate member slidably with each other and formed with a trunk slide part and a support part in one end and a branch slide part in the other end, wherein the support part and the branch slide part is aligned with each other to hold the branch communication cable and the branch tension member, and the guide member is placed at an opening of branch pipe to make the trunk slide part hold the members laid in the main pipe in the upper space of inside the main pipe, and then the plate member is twisted expanding its diameter and placing the branch slide part in the lower part of the branch pipe so that the branch communication cable and the branch tension member are guided into the lower part of the branch pipe.

The present invention also relates to the above described method for laying communication cables in an underground pipeline, characterized in that a seal formed of a water-swelling rubber is attached to the outer surface of the guide member making the seal swelled with the water in the branch pipe so that the guide member is air tightly secured to the branch pipe.

The present invention also relates to the above described method for laying communication cables in an underground pipeline, characterized in that the guide member is a pipe whose end parts are made of a rigid material and middle part is made of a deformable resilient material, wherein the branch communication cable and the branch tension member are inserted in the pipe in a straight state and then the pipe is placed at the opening of branch pipe making the leading end of the pipe project into the main pipe to hold the members laid in the main pipe in the upper space of inside the main pipe, and the middle part of the pipe is twisted deforming it into a spiral shape along the inner surface of the branch pipe, and the rear end of the pipe is placed in the lower part of the branch pipe so that the branch communication cable and the branch tension member are guided into the lower part of the branch pipe.

The present invention also relates to the above described method for laying communication cables in an underground pipeline, characterized in that the guide member consists of a pipe made of a deformable resilient material, each end of the pipe being fixed respectively to an expansion member, the expansion member being formed of a ring having a diameter slightly larger than the inner diameter of the branch pipe, its portion being cut open, and the arrangement is made such that the branch communication cable and the branch tension member are inserted in the pipe in a straight state and the expansion members are contracted with their both ends fastened temporarily and, in this state, the guide member is placed at an opening of branch pipe so that the leading end of the pipe projects into the main pipe holding the members laid in the main pipe in the upper space of inside the main pipe, and then the temporal fastening of the expansion member at the leading end of the pipe is released to make it expand pressing itself against the inner surface of the branch pipe, and then the middle part of the pipe is twisted to deform it into a spiral shape along the inner surface of the branch pipe placing the rear end of the pipe in the lower part of the opening of branch pipe, and further the temporal fastening of the expansion member at the rear end of the pipe is released to make it expand pressing itself against the inner surface of the branch pipe, and thus the guide member guides the branch communication pipe and the branch tension member into the lower part of the branch pipe.

The present invention also relates to the above described method for laying communication cables in an underground pipeline, wherein communication cables are laid in a main pipe and each branch pipe in the underground pipeline, at least one or more branch pipes being provided in the main pipe constructed between pits, characterized in that, first the provision is made such that high-strength low-elongation tension members are inserted in a guide pipe and arranged to be slidable in the lengthwise direction along each trunk communication cable laid in the main pipe and the branch communication cable laid in each branch pipe, and the branch communication cable and the branch tension member are being taken out from the portion of the guide pipe corresponding to the opening of branch pipe, and a guide member is slidably attached to the outer periphery of the guide pipe in the portion corresponding to an opening of branch pipe, the branch communication cable and the branch tension member being attached to the portion of the guide pipe corresponding to the upper part in the branch pipe, and after the above provision, the guide pipe is drawn in from one pit to the other pit through the main pipe thereby drawing in the trunk communication cable and trunk tension member from said one pit to said other pit through the main pipe and also drawing in the branch communication cable and branch tension member from the one pit to near the predetermined opening of branch pipe in the main pipe, and then the branch tension member placed near the opening of branch pipe is pulled up from the branch pipe box placing the guide member in the opening of branch pipe at the same time and drawing in the branch communication cable and the branch tension member, and finally the trunk tension member between the pits is tensioned to stretch the trunk tension member substantially straight in the upper space of inside the main pipe thereby laying the guide pipe and each communication cable in the upper space of inside the main pipe, and also the branch tension member is tensioned between the opening of branch pipe and the branch pipe box to stretch the branch tension member substantially straight in the upper space of inside the branch pipe thus laying the branch communication cable in the upper space of inside the branch pipe.

The present invention also relates to the above described method for laying communication cables in an underground pipeline, characterized in that a fixing member is disposed in the upper part of the inner surface of the valley part of a pipe bend formed in the branch pipe and a branch tension member is slidably attached to the inside or the outside of the foregoing fixing member so that the branch communication cable is placed in the upper part of the inner surface of the pipe bend.

The present invention also relates to the above described method for laying communication cables in an underground pipeline, wherein at least one or more branch pipes branch off from the main pipe constructed between pits in an underground pipeline, characterized in that a high-strength low-elongation trunk tension member is inserted in or attached to a guide member, and a lead string for replacing a communication cable is accommodated in the guide pipe in advance, and after the guide pipe is laid in the main pipe, the guide pipe is disposed in the upper space of inside the main pipe by tensioning the trunk tension member in the main pipe, and then when installation of a communication cable in a branch pipe is needed, the communication cable is drawn into the branch pipe from the guide pipe by appropriately replacing a lead string of the guide pipe with the branch communication cable.

The present invention also relates to the above described method for laying communication cables in an underground pipeline, characterized in that first provision is made such that the communication cable and/or the lead string are inserted into a guide pipe and one end of the lead string is taken out from the portion of the guide pipe corresponding to an opening of branch pipe, and then the guide pipe is laid in the main pipe and a branch communication cable is laid in branch pipes for which installation of communication cables is needed, and when the installation of branch communication cables is needed for the rest of the branch pipes in which no communication cables are installed, one end of the lead string placed at the opening of branch pipe is drawn out to a branch pipe box and the other end of the lead string is connected to the branch communication cable, and then the end of the lead string which has been taken out in the branch pipe box is pulled thereby laying the branch communication cable in the branch pipe through the guide pipe.

The present invention also relates to the above described method for laying communication cables in an underground pipeline, in an underground pipeline, characterized in that after communication cables and/or lead strings are inserted into the guide pipe and one end of the lead string is taken out outside from the portion of the guide pipe corresponding to the opening of branch pipe, the guide pipe is laid in the main pipe and branch communication cables are laid in branch pipes which need installation of communication cables, and then one end of the lead string placed at the opening of branch pipe is taken out to the branch pipe box and when installation of communication cables are needed for the rest of the branch pipes in which communication cables are not installed, the branch communication cable is connected to the other end of the lead string and one end of the lead string which has been taken out to a branch pipe box is pulled laying the branch communication cable in the branch pipe through the guide pipe.

The present invention also relates to the above described method for laying communication cables in an underground pipeline, wherein at least one or more branch pipes branch off from the main pipe constructed between pits in an underground pipeline, characterized in that a high-strength low-elongation trunk tension member is inserted in or attached to a guide member, and the trunk tension member is tensioned laying the guide pipe in the upper space of inside the main pipe and also laying the branch communication cables in branch pipes which are in need of communication cable installation, and when installation of communication cables is needed in the rest of the branch pipes in which no branch communication cables are installed, a lead string is inserted in the guide pipe and one end of the lead string is taken out from the portion of the guide pipe corresponding to the opening of branch pipe, and a branch communication cable is attached to the other end of the lead string, and the end of the lead string placed near the opening of branch pipe is pulled thereby laying the branch communication cable in the branch pipe through the guide conduit.

The present invention also relates to the above described method for laying communication cables in an underground pipeline, in an underground pipeline characterized in that when drawing out the lead string placed at an opening of branch pipe to a branch pipe box, the lead string is taken out to one end of the main pipe and a pull member is installed from the branch pipe box to one end of the main pipe to connect the lead string with the pull member at the end of the main pipe, and then the pull member on the branch pipe box side is pulled to draw in the lead string to the branch pipe box.

The present invention also relates to the above described method for laying communication cables in an underground pipeline, in an underground pipeline characterized in that to draw out the lead string in the branch pipe box, a lead tug is provided on an end of the lead string which has been taken out from the opening of branch pipe of the guide pipe, the lead tug being used for hooking or grasping the lead string from a branch pipe box.

The present invention further relates to the above described method for laying communication cables in an underground pipeline characterized in that the outer diameter of the communication cables is substantially equal to that of the lead string.

The present invention also relates to the above described method for laying communication cables in an underground pipeline characterized in that a high-strength low-elongation branch tension member branches off from the guide pipe in the vicinity of the opening of branch pipe and slidably integrated with the lead string or branch communication cable to lay it in the branch pipe when laying the lead string or the branch communication cable in the branch pipe.

The present invention relates to a laying structure for laying communication cables in an underground pipeline, wherein at least one or more branch pipes branch off from the main pipe constructed between pits in the underground pipeline, characterized in that high-strength low-elongation tension members are slidably disposed in the lengthwise direction with respect to each communication cable along the trunk communication cable laid in the main pipe and the branch communication cable laid in each branch pipe from the main pipe, and the trunk tension member placed along the trunk communication cable is tensioned in the range from one pit to the other pit through inside the main pipe to be placed in the upper space of inside the main pipe substantially straight thereby laying each communication cable in the upper space of inside the main pipe, and the branch tension member placed along the branch communication cable is tensioned at least between the opening of branch pipe and branch pipe box through the branch pipe to be placed in the upper part in the branch pipe substantially straight laying the branch communication cable in the upper space of inside the branch pipe.

The present invention also relates to the above described laying structure of laying communication cables in an underground pipeline, characterized in that a guide member is disposed at an opening of branch pipe where the branch pipe branches off from the main pipe so that the guide member holds the branch tension member changing its direction from the upper part in the main pipe to the upper space of inside the branch pipe, and thereby the branch communication cable is disposed in the portion of the opening of branch pipe which corresponds to the upper part in the branch pipe.

The present invention also relates to the above described laying structure of laying communication cables in an underground pipeline, characterized in that a fixing member is disposed in the upper part of the inner surface of the valley part of a pipe bend formed in the branch pipe, and the branch tension member is slidably held in the inner part or outer part of the fixing member, thereby disposing the branch communication cable in the upper part of the inner surface of the pipe bend.

The present invention also relates to the above described laying structure of laying communication cables in an underground pipeline, characterized in that the communication cable and the tension member in the main pipe are disposed in a guide pipe.

The present invention also relates to the above described laying structure of laying communication cables in an underground pipeline, characterized in that the guide pipe is disposed in the upper space of inside the main pipe assisted by slack prevention members at appropriate positions in the main pipe.

The present invention also relates to the above described laying structure of laying communication cables in an underground pipeline, characterized in that a guide pipe accommodating a plurality of communication cables placed in parallel in the lateral direction is laid in the main pipe and communication cables are inserted through the guide pipe from the near side of a pit with respect to the branch pipe.

The present invention also relates to the above described laying structure of laying communication cables in an underground pipeline, characterized in that the guide pipe is laid in the upper space of inside the main pipe and, for branch pipes connected to each side of the cross section of the main pipe, branch communication cables are inserted in parallel in the guide pipe from the proximal side of a pit corresponding to the branch pipes connected to both sides of the main pipe.

The present invention also relates to the above described laying structure of laying communication cables in an underground pipeline, characterized in that branch communication cables are introduced in the foregoing guide pipe from the proximal sides of each pit symmetrically with respect to the substantially middle point of the main pipe or a point where the number of branch pipes between pits substantially halves.

The present invention also relates to the above described laying structure of laying communication cables in an underground pipeline, characterized in that branch communication cables are inserted in a tubular branch tension member which is disposed at least from an opening of branch pipe to a branch pipe box and has bending properties exceeding the allowable bending radius of the branch communication cable.

The present invention also relates to the above described laying structure of laying communication cables in an underground pipeline, characterized in that a guide pipe accommodating branch communication cables is disposed in the main pipe and the tube branches off from the guide pipe.

The present invention also relates to the above described laying structure of laying communication cables in an underground pipeline, characterized in that one end of the tube is accommodated in the guide pipe and the tube slidably branches off from the outer surface of the guide pipe.

The present invention also relates to the above described laying structure of laying communication cables in an underground pipeline, characterized in that a holding member for holding the tube along the inner wall of the branch pipe is mounted at an opening of branch pipe.

The present invention also relates to the above described laying structure of laying communication cables in an underground pipeline, characterized in that a fixing member for holding the tube along the inner wall of the branch pipe is attached to a pipe bend part formed in the branch pipe.

The present invention also relates to the above described laying structure of laying communication cables in an underground pipeline, characterized in that the tube is slidable with respect to the holding member and the fixing member.

The present invention also relates to the above described laying structure of laying communication cables in an underground pipeline, characterized in that the tube held by the holding member is placed at a certain distance from the inner wall of a branch pipe in the vicinity of the opening of branch pipe.

The present invention also relates to the above described laying structure of laying communication cables in an underground pipeline, characterized in that the tube is formed of a flexible tube made of stainless steel or plastics.

The present invention also relates to the above described laying structure of laying communication cables in an underground pipeline, characterized in that the tube is formed of a tubular textile.

The present invention relates to structural members for laying communication cables, and more specifically relates to a guide member to be placed at an opening of branch pipe, the guide member being characterized by having an outer diameter substantially equal to the inner diameter of the branch pipe and comprising an arcuate or ring-like insertion part having a cross section larger than a half circle, a trunk slide part projecting downwardly continuously from the insertion part and slidably supporting members to be laid in the main pipe, and a branch slide part placed in the insertion part, the slide part slidably holding members to be laid in the branch pipe.

The present invention relates to structural members for laying communication cables, and more specifically relates to a fixing member to be placed in the upper part of the inner surface of the valley part of the pipe bend formed in a branch pipe, the fixing member characterized by having a outer diameter substantially equal to the inner diameter of the branch pipe and comprising an arcuate or ring-like fixing part having a cross section larger than a half circle and a slide part provided on the fixing part, the slide part slidably holding members to be laid in the branch pipe.

The present invention relates to structural members for laying communication cables, and more specifically to a guide pipe to be disposed in the main pipe, characterized in that the guide pipe has a length equal to the length of the main pipe and a pipe shape including at least one or more spaces continuous in the pipe length direction, and is provided with an opening in the thickness direction in the portion corresponding to the opening of branch pipe.

The present invention relates to structural members for laying communication cables, and more specifically to a slack prevention member to be disposed in the main pipe, characterized in that the slack prevention member has an outer diameter substantially equal to the inner diameter of the main pipe and has a arcuate or ring-like cross section at least larger than a half circle, and is formed in a portion in its length with at least one or more concaves for slidably holding the members to be laid in the main pipe.

The present invention relates to a structural member for laying communication cables and characterized in that a guide pipe has a width sufficient to introduce a plurality of branch communication cables corresponding to each branch pipe and its internal height is smaller than twice of the outer diameter of the branch communication cable.

The present invention further relates to the above described structural member for laying communication cables, characterized in that at least one or more partition plates vertically partitioning the interior of the guide pipe into sections are provided.

The present invention relates to the above described structural member for laying communication cables, characterized by having a dual structure in which a guide pipe has an inner pipe for inserting trunk communication cables to be laid in the main pipe and an outer pipe for inserting branch communication cables to be laid in each branch pipe, the outer pipe having a sufficient width to accommodate a plurality of branch communication cables corresponding to each branch pipe.

The present invention further relates to the above described structural member for laying communication cables, characterized in that the outer pipe is provided with at least one or more partition plates for vertically partitioning its cross section and the height of the partitioned sections is smaller than twice of the outer diameter of the branch communication cable.

BRIEF DESCRIPTION OF DRAWINGS

FIG. 17 is a longitudinal mid-section view to show an operational state of inserting the flexible shape retaining pipe into the branch pipe in FIG. 16.

FIG. 20 is a transverse sectional view to show a state that a curable fixing member is mounted inside the guide member in FIG. 18.

FIG. 33 shows an example of the jigs to be used for placing the guide members.

FIG. 43 is a sectional view to show a guide pipe or another embodiment.

DESCRIPTION OF SYMBOLS

Figure 1:
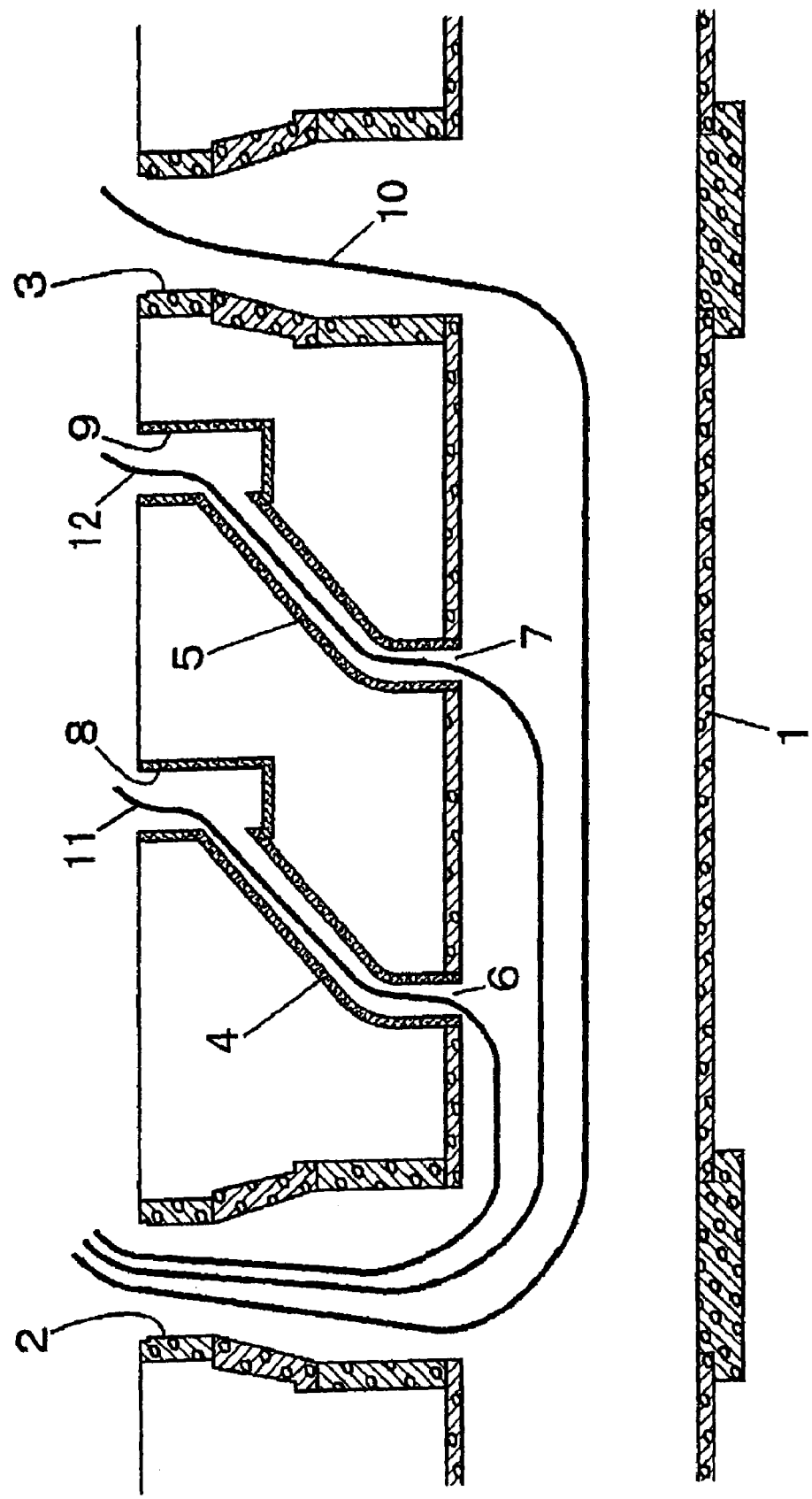
FIG. 1 is a longitudinal mid-section view to show a state that a pulling rope is inserted in a sewer pipeline.

P guide member (holding member)
Q fixing member (holding member)
1 underground pipeline, main pipe
2, 3 manhole
4, 5 branch pipe
6, 7 opening of branch pipe
8, 9 branch pipe box
10, 11, 12 pull member
13 partition plate
14 inner pipe
15 space
16 branch communication cable
17 branch lead string
18 opening part
19a, 19b lead tug
20 trunk optical fiber cable (trunk communication cable)
21, 22 branch optical fiber cable (branch communication cable)
28 space part
30, 31 tying string
34 tension device
41 arcuate fixing part
42 tapered face
43 slide part
44 arcuate fixing part
45 guide pipe
50, 52 slack prevention member
55 slack prevention member
56 arcuate fixing part
60, 65 guide member
70 flexible shape retaining pipe
80 guide member
81 tubular main part
82 tubular rotary part
83 trunk slide part
84 support part
85 branch slide part
86 curable fixing member
87 plate member
88 pipe body
89 seal member
90 pipe
91, 92 expansion member
102 trunk slide part
103 branch slide part
104 insertion part
111 guide pipe
112 outer pipe
121 trunk tension member
122 thin lead string
123 trunk lead string
127 guide conduit connecting member
128 trunk communication cable
212 branching member
216 branch tension member
218 opening part
231 trunk slide part
232 branch slide part
241 arcuate fixing part

EMBODIMENTS OF THE INVENTION

The embodiments of the present invention will be described below referring to the drawings. In the following description, it is assumed that underground pipelines are a sewer pipeline, but the present invention imposes no limitations on the kinds of pipeline systems or pipes because no jigs such as a hook are not directly attached to the inner surface of the underground pipeline. Potential applications include all kinds of underground pipelines such as gas pipelines laid by steel pipes, water supply pipelines laid by cast iron pipes, storm drain pipelines, and power cable pipelines. When the foregoing pipelines are not provided with manholes which are an existing pit, it is possible to utilize the present invention by installing a new pit. The branch pipe in the present invention means a lateral pipe in sewer pipeline.

FIG. 1 shows a sewer pipeline as an example of the underground pipeline, the numeral 1 denotes a main pipe of a sewerage pipe laid between a manhole 2 and another manhole 3. Branch pipes 4, 5 branch off from the upper side of the main pipe 1 at the openings of branch 6, 7, and the branch pipes 4, 5 are connected to branch pipe boxes 8, 9 for individual households (not shown).

Figure 2:
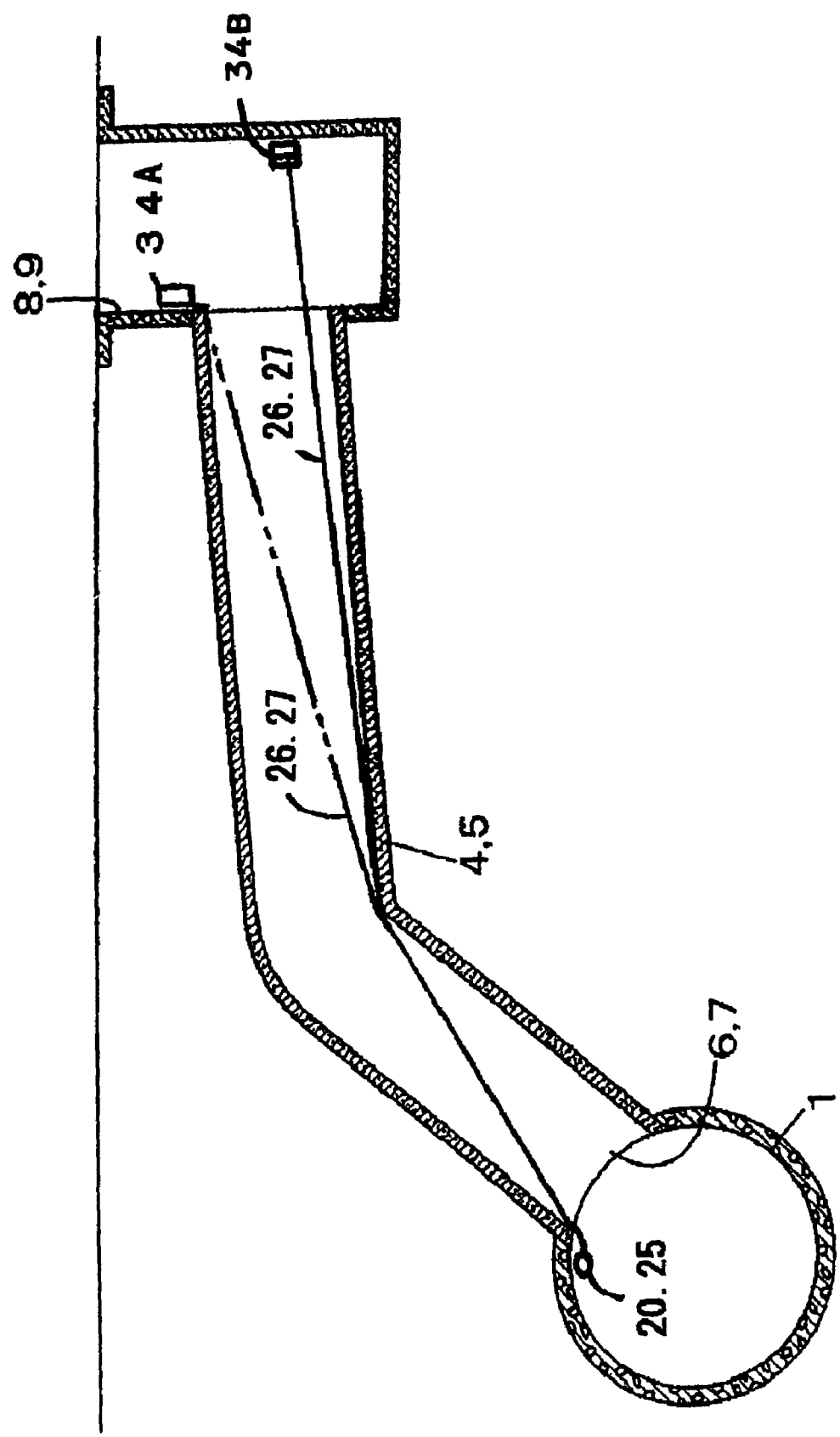
FIG. 2 is a transverse sectional view to show an installation condition of a branch pipe in a sewer pipeline.

Generally main pipes are laid at a depth of several meters along the road, and as shown in FIG. 2, the openings of branch pipe 6, 7 are formed on the main pipe 1 in an upwardly slanting direction. The branch pipes 4, 5 ascend at a steep angle from the openings of branch pipe 6, 7 and then change their directions near the earth's surface connecting to the branch pipe boxes 8, 9 at a gentle angle.

When laying an optical fiber cable, first, the insides of the main pipe 1 and branch pipes 4, 5, in which optical fiber cables are laid, are inspected with a TV camera to acquire numerical data such as the distance between the manhole 2 and the manhole 3 (there may be other manholes between them), the distances between the manhole 2 and the openings of branch pipe 6, 7, and the lengths and diameters of the branch pipes 4, 5. If there are obstacles (a lump of mortar, a protrusion of a branch pipe into the main pipe) and others within a pipeline, they are taken out by a machine specifically designed to remove obstacles (not shown and, for example, described in JP, U, 4-32808) so that they will not hinder the laying of optical fiber cables.

Accordingly in the present invention, pull members 10, 11, 12 are installed from the manhole 2 to the other manhole 3 and to the branch pipe boxes 8, 9. The known methods of this installation include a method of tucking a rigid member such as a wire, a method of flying a parachute-like drawing tool by an air pressure, and a method of connecting to a self-propelling vehicle inside the pipe, and these known methods may be adopted as needed.

Also the distances are measured from the manhole 2 to the other manhole 3 and to the branch pipe boxes 8, 9 via the branch pipe 4, 5, and optical fiber cables 20, 21, 22 are prepared corresponding to the distances.

Then, based on the survey results, the lengths of the optical fiber cables 20, 21, 22 and tension members 25, 26, 27 are determined and they are slidably combined. This work can be conducted either at the factory or at the work site.

The tension members 25, 26, 27 are made of a high-strength low-elongation material and they extend parallel with the optical fiber cables 20, 21, 22 so that the tension members 25, 26, 27 and the optical fiber cables 20, 21, 22 are easily movable with each other in the lengthwise direction. The optical fiber cables 20, 21, 22 may be comprised of other communications cables.

Figure 3:
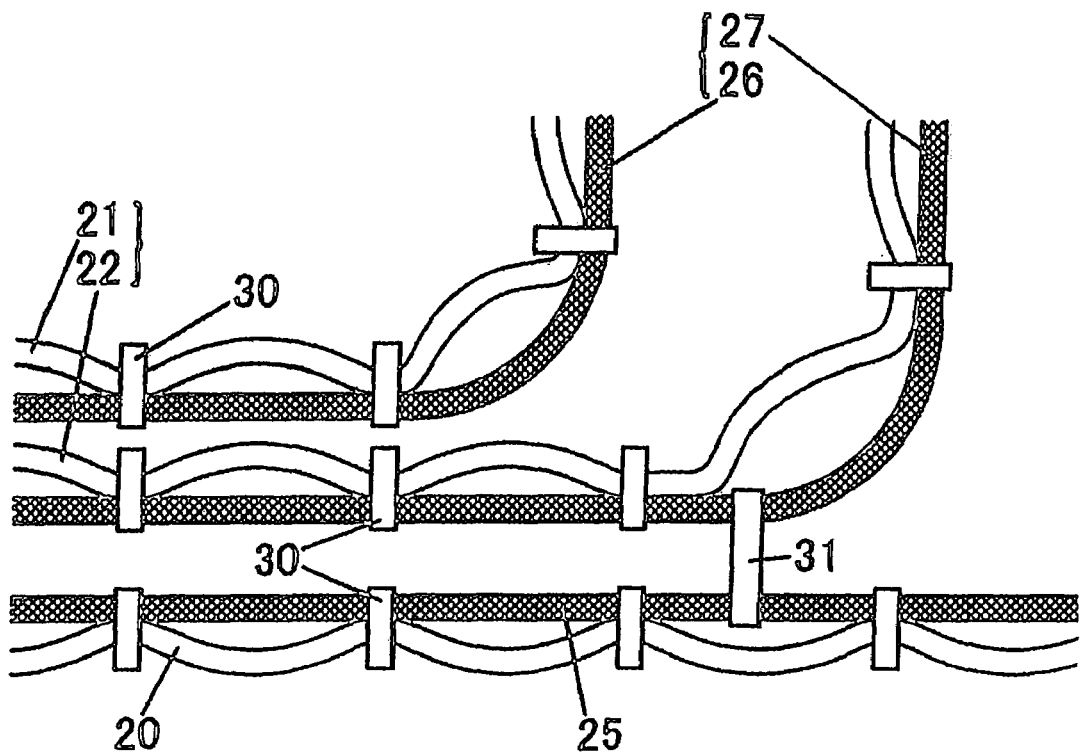
FIG. 3 shows a state that an optical fiber cable is bound to a tension member in part.

For the tension members 25, 26, 27, of which examples are shown in FIG. 3, elongated members such as ropes, strings, and belts, made of high-strength low-elongation fibers such as poly-para-phenylene-benzo-bis-oxazole (POB) fibers, aramid fibers, carbon fibers, metal fibers, and glass fibers may be used.

The optical fiber cables 20, 21, 22 are placed in parallel, in a state having certain slack, with the tension members 25, 26, 27 and both of them are tied in part with tying strings 30.

Thus, in this configuration, the optical fiber cables 20, 21, 22 and the tension members 25, 26, 27 are tied by means of tying strings 30 thereby being combined with some clearance in part, and the optical fiber cables 20, 21, 22 is configured to be slightly longer than the tension members 25, 26, 27 so that both are slidable to each other in the lengthwise direction on the whole.

In FIG. 3, a branch tension member 27 to be inserted into a branch pipe 5 is tied to a trunk tension member 25 in the main pipe 1 with a tying string 31 at a position corresponding to an opening of branch pipe 7 in the main pipe 1.

When arranged in this manner, the tension member 25 can be hauled in toward the branch pipe 5 at the opening of branch pipe 7 by tensioning the tension member 27 from the branch pipe box 9 after laying the optical fiber cable in a sewer pipeline, and thus it becomes possible to pull the optical fiber cable 20 to the upper space of inside the main pipe 1 in an intermediate portion of the main pipe 1 thereby laying the optical fiber cable 20 in the main pipe 1 preventing it from further loosening.

Figure 4A:
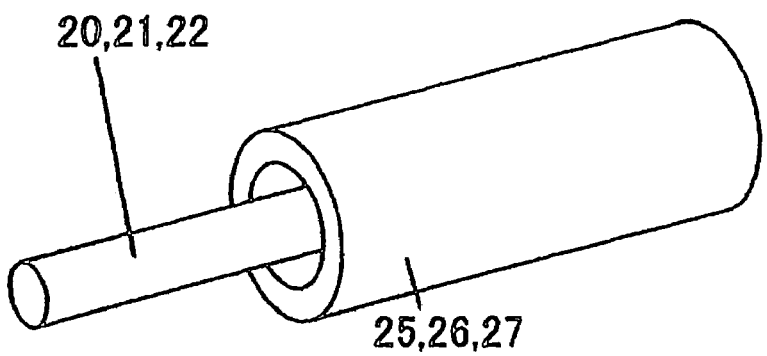
FIG. 4 shows (a) a perspective view and (b) its enlarged transverse sectional view of a pipe-shaped tension member with optical fiber cables inserted therein.
Figure 4B:
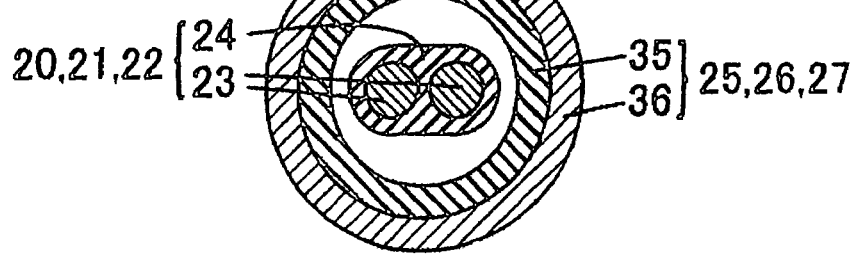

FIG. 4 shows another embodiment of a structure in which tension members 25, 26, 27 are slidably unified with optical fiber cables 20, 21, 22. The tension member 25, 26, 27 have a pipe structure and the optical fiber cable 20, 21, 22 is slidably inserted in the tension member 25, 26, 27.

FIG. 4(*b*) is an enlarged transverse sectional view; the tension members 25, 26, 27 are formed of a metal pipe 35 such as stainless steel pipe whose outer surface is coated with an anti-corrosion resin coating. Inside the metal pipe 35, two-core optical fiber cables 20, 21, 22 formed of two optical fibers 23 and whose outer surface is coated with a resin coating 24, are inserted into the metal pipe 35. The optical fiber cable is not limited to the two-core cable and other types of optical fiber cables such as a four-core cable and others may be used.

Configuring the inner diameter of the metal pipe 35 to be larger than the outer diameter of the optical fiber cables 20, 21, 22 it is possible to make the optical fiber cables 20, 21, 22 be slidable in the metal pipe 35. The metal pipe 35 is preferably flexible and bendable. Also the anti-corrosion coating 36 is preferably reinforced in the lengthwise direction by embedding filamentary high-strength low-elongation fibers within the coating.

Figure 5:
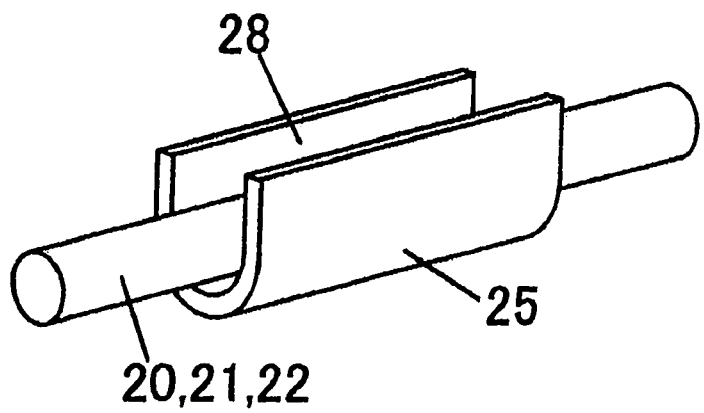
FIG. 5 is perspective view to show a state that an optical fiber cable is installed in a tension member with a U-shape cross section.
Figure 6A:
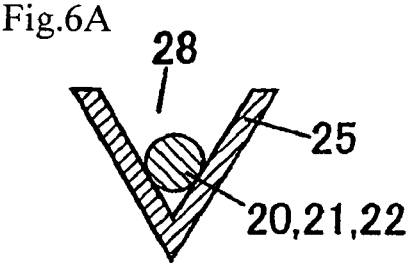
FIG. 6 is a transverse sectional view to show a state in that optical fiber cables are installed in tension members with different cross sections; a V-shape in (a) and a W-shape in (b).
Figure 6B:
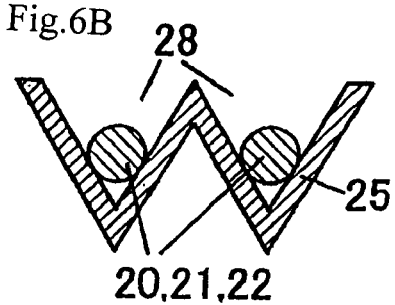
Figure 7:
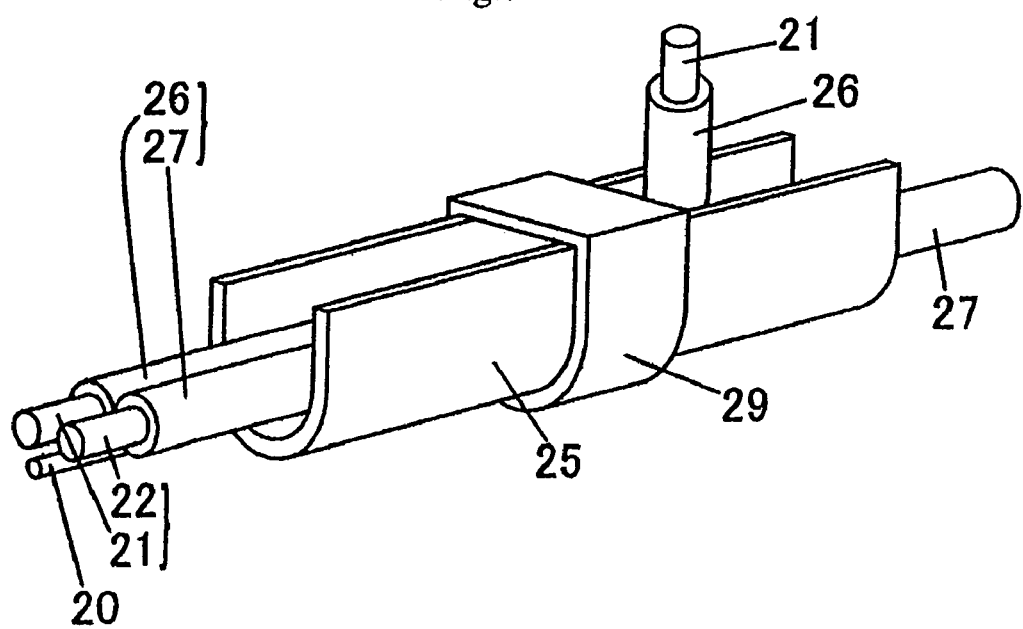
FIG. 7 is a perspective view to show a state that tension members formed of rigid bodies are connected with a connecting member.

FIGS. 5 to 7 shows still another embodiment in which a trunk tension member 25 in the main pipe 1 is slidably unified with the optical fiber cables 20, 21, 22 to be inserted in the main pipe 1. Only one optical fiber cable is shown in the figures, but in reality, a plurality of cables are provided depending on the number of the branch pipes 4, 5.

FIG. 5 shows a trunk tension member 25 having a U-shaped cross section formed of a rigid material such as stainless steel or FRP, and the optical fiber cables 20, 21, 22 are placed in the space 28 inside the member.

FIG. 6 shows embodiments of different cross sections; FIG. 6(*a*) shows a substantially V-shaped cross section and FIG. 6 (*b*) shows a substantially W-shaped cross section. In the space 28 of each cross section, one optical fiber cable 20, 21, 22 is placed in FIG. 6(*a*) and two cables in FIG. 6(*b*).

The cross section of the trunk tension member 25 is not limited to the shapes shown in FIGS. 5 and 6, but any cross section having a space 28 open to one direction, into which optical fiber cables are placed, will suffice for the present invention.

FIG. 7 shows a state in which two trunk tension members 25 are connected lengthwise with a ring connection member 29. Since the trunk tension member 25 is a rigid body as described above, the length which can be brought in from the manholes 2, 3 is limited. Therefore, to lay a tension member 25 across the whole length of the main pipe 1, it is necessary to form a long trunk tension member 25 by connecting short tension members in the main pipe 1 using the connection member 29.

FIG. 7 shows a structure in which the trunk tension members 25 having a substantially U-shaped, V-shaped, or W-shaped cross section open to one direction shown in FIG. 5 or 6 are connected with a closed cylindrical shape connection member 29 covering the open part.

In this structure, placing the connection member 29 at a position corresponding to the opening of branch pipe 6 in the main pipe 1 makes it possible to make the branch optical fiber cable 21 and the branch tension member 26, which are placed in the trunk tension member 25, branch off at the position of the connection member 29 and pass through the branch pipe 4. Thus it also becomes possible to lay the trunk optical fiber cable 20 in the main pipe 1 preventing it from loosening by applying tension on the branch tension member 26 from the branch pipe box 8 in a similar manner as in the case of the tying string 31 shown in FIG. 3 thereby hauling in the trunk tension member 25 toward the opening of branch pipe 6.

Now explanation will be made referring to FIGS. 2 and 8. In the manhole 2, each optical fiber cable 20, 21, 22 is slidably combined with a corresponding tension member 25, 26, 27 respectively and then one end of the pull member 10, 11, 12 is connected to an end of each tension member 25, 26, 27.

Then the optical fiber cables 20, 21, 22 and the tension member 25, 26, 27 are inserted into the main pipe 1 and the branch pipes 4, 5 by taking up the other end of each pull member 10, 11, 12 from the manhole 3, and each branch pipe box 8, 9, and the other end of each tension member 25, 26, 27 are taken out in the manhole 3 and the branch pipe boxes 8, 9.

In this state, first, one end of each tension member 25, 26, 27 in the manhole 2 is fixed by fixing means such as an anchor 40 and then the other ends of the tension members 25, 26, 27 are pulled by a wind-up means such as a tension device 34 placed in the manhole 3 and the branch pipe boxes 8, 9 thereby tensioning the tension members 25, 26, 27. This state is shown in FIG. 8. As the tension device 34, for example, a tension device consisting of a drum wind manual winch paired with a hook, a turn buckle, or the like is used.

The placement position of the tension device 34 is preferably at the same level as the upper side of the main pipe 1 or higher than that at least in the manhole 3 so that the tension members 25, 26, 27 can be stretched straight in the upper space of inside the underground pipeline when they are tensioned.

Figure 8:
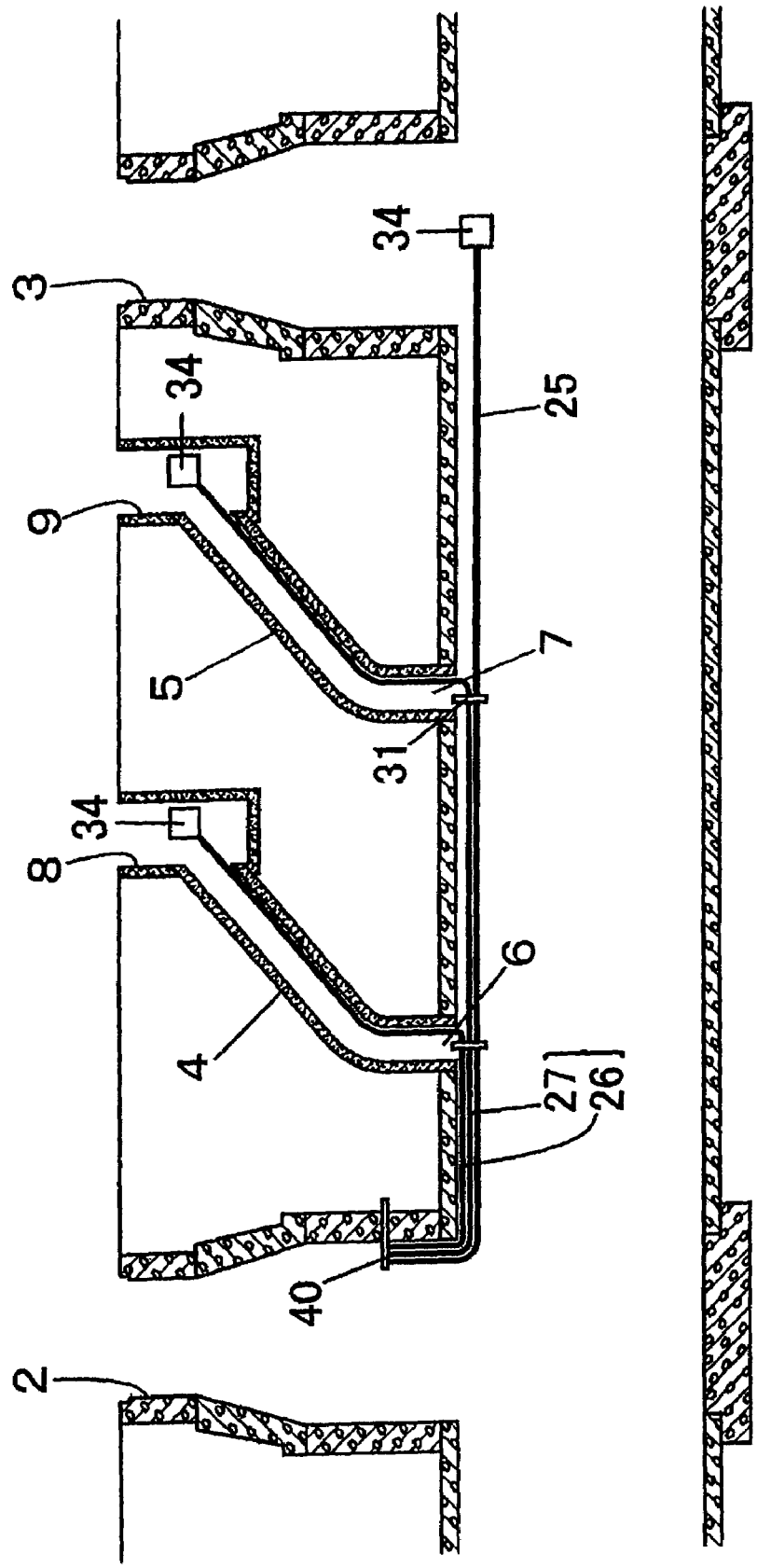
FIG. 8 is a longitudinal mid-section view to show a state that tension members are tensioned in a sewer pipeline.

In FIG. 8, the optical fiber cables 20, 21, 22 are omitted by way of simplification; the optical fiber cables 20, 21, 22 are slidably combined with the tension members 25, 26, 27 as described so far.

When tensioning the tension members 25, 26, 27, it is arranged such that tension is applied only on the tension members 25, 26, 27 without tensioning the optical fiber cables 20, 21, 22.

Particularly in the example shown in FIG. 4, since the optical fiber cables 20, 21, 22 are passed through the tension members 25, 26, 27, a tension applying means needs to be used in such a way that it will not place tension on the optical fiber cables 20, 21, 22 inserted in the tension members 25, 26, 27 when tensioning the tension members.

As shown in FIG. 8, tying the branch tension members 26, 27 to the trunk tension members 25 with the tying strings 31 at the opening of branch pipe 6, 7 makes it possible to draw in the trunk tension member 25 at the openings of branch pipe 6, 7 toward the branch pipes 4, 5 when tensioning the branch tension members 26, 27 from the branch pipe boxes 8, 9 thus allowing to dispose the tension members 25, 26, 27 and the optical fiber cables 20, 21, 22 in the upper space of inside the main pipe 1 without excessively tensioning the trunk tension member 25 between the manhole 2 and the manhole 3.

Through the above described procedure, the optical fiber cable 20 can be laid in upper part within the main pipe 1. Finally, the optical fiber cables 20, 21, 22 are connected to connection boxes (not shown) for optical fiber cables and the end of each branch optical fiber cable 20, 21, 22 are connected to the connector appropriately placed for individual households, and thus laying operation of the optical fiber cables 20, 21, 22 between the manholes 2 and 3 is completed.

In the present invention, all of the tension members 25, 26, 27 need not to be in the same configuration and any combination of optimal configurations can be adopted depending on the need for each pipeline.

Figure 9:
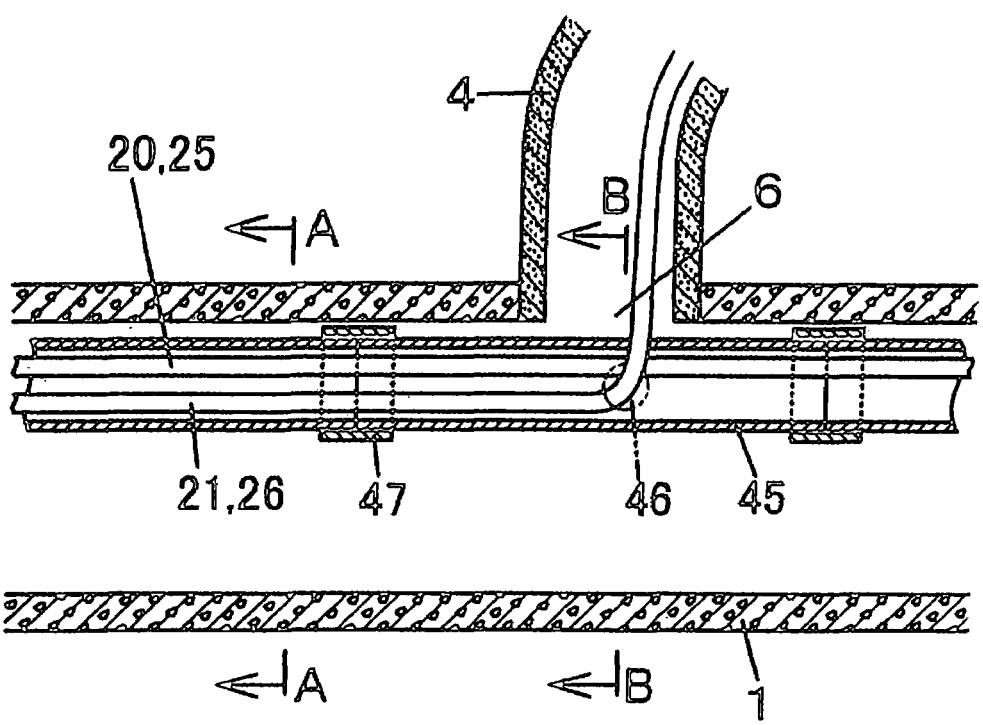
FIG. 9 is a longitudinal mid-section view to show a state that an optical fiber cable and a tension member are inserted in a guide pipe.
Figure 10A:
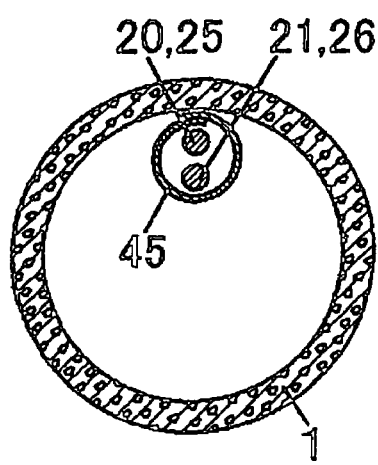
FIG. 10 shows transverse sections taken along (a) A—A line and (b) B—B line in FIG. 9.
Figure 10B:
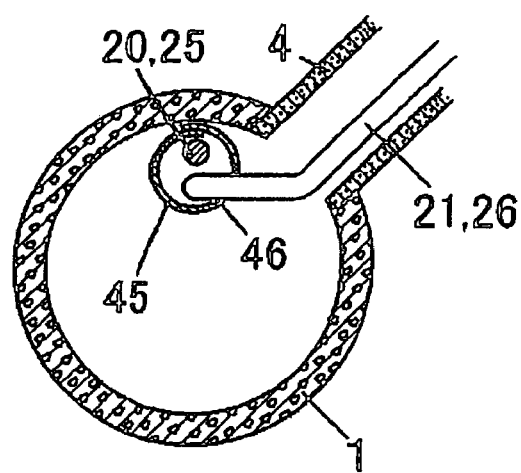

FIGS. 9 and 10 show another embodiment of the present invention. The numeral 45 indicates a guide pipe which is formed into a pipe by rolling up a plate such as a plastic plate and putting its one side edge upon another forming into a pipe-shape to be able to be opened and closed.

Then the side edges of the guide conduit 45 are opened to insert the optical fiber cables 20, 21 and the tension members 25, 26 and, after that, the guide pipe returns to a pipe-shape due to its resiliency and thereby protects them shielding from the outside.

An opening 46 formed on the guide conduit 45 at a position corresponding to the guide conduit 45, and the optical fiber cable 21 and the tension member 26 branch off from the inside to the outside through the opening 46. The numeral 47 shows a connection member for connecting two guide pipes 45.

In the embodiments shown in FIGS. 9 and 10, the trunk tension member is tensioned by the above described method thereby stretching the trunk tension member 25 substantially straight in the upper space of inside the main pipe 1 to place the guide conduit 45 covering the trunk tension member 25 in the upper space of inside the main pipe 1 and thus allowing the optical fiber cables 20, 21, 22 inserted in the guide conduit 45 to be disposed in the upper space of inside the main pipe 1 together with the guide conduit 45.

In the present invention, the tension members 25, 26, 27 and the optical fiber cables 20, 21, 22 are disposed in the upper space of inside the main pipe 1 by tensioning the trunk tension member 25 inserted in the main pipe 1, but it is difficult to securely dispose them along the upper space of inside the main pipe 1 between distant manholes 2 and 3 only by tensioning the trunk tension member 25, and it is inevitable that they sag to some extent under their own weights.

Also the optical fiber cables 20, 21, 22 are tied to the tension members 25, 26, 27 with some slack and therefore, for example in the embodiment in FIG. 3, the optical fiber cables 20, 21, 22 slack with respect to the tension members 25, 26, 27 sagging into the main pipe 1.

Figure 11:
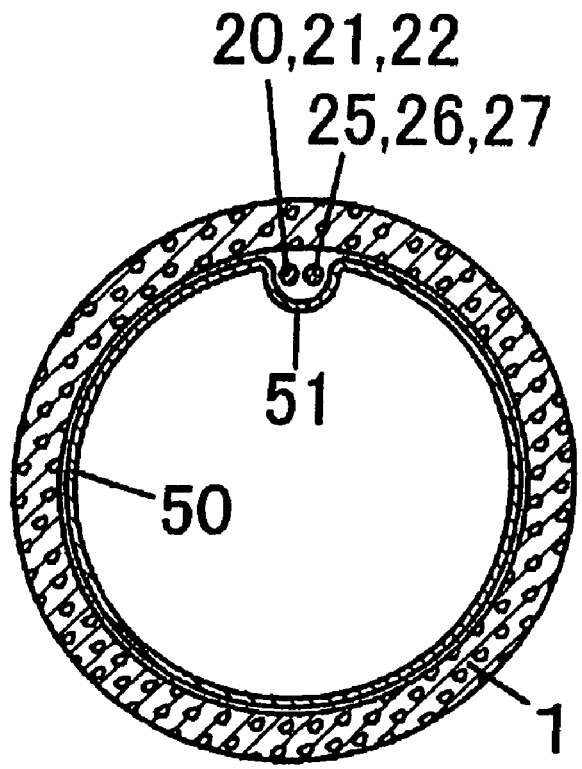
FIG. 11 is a transverse sectional view to show a state that a metal ring is fitted into the inner surface of a main pipe as a slack prevention member.
Figure 12:
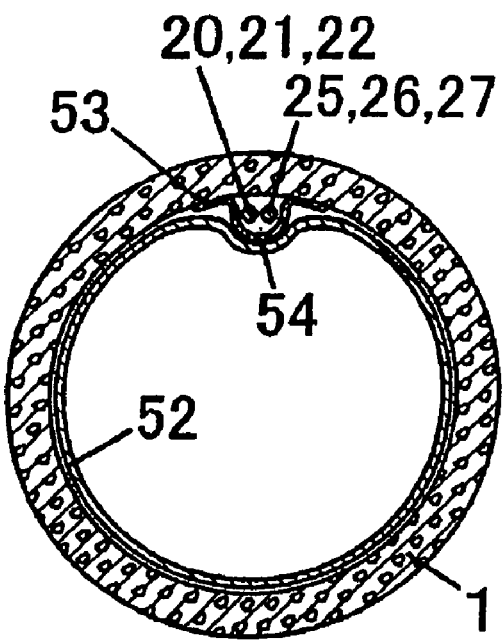
FIG. 12 is a transverse sectional view to show a state that a FRP member is fitted into the inner surface of a main pipe as a slack prevention member.

FIGS. 11 and 12 show a method to remove the slack from the optical fiber cables 20, 21, 22 and the tension members 25, 26, 27 thereby securely disposing them in the upper space of inside the main pipe 1.

In FIG. 11, the numeral 50 indicates a metal ring for a slack prevention member, which is formed in its outer periphery with a concave 51 that can accommodate the optical fiber cables 20, 21, 22 and the tension members 25, 26, 27.

Thus a metal ring 50, of which wall is bent with its diameter contracted, is inserted into the main pipe 1 at positions where the optical fiber cables 20, 21, 22 and the tension members 25, 26, 27 sag. Then, the diameter of the metal ring 50 is expanded to press itself against the inner surface of the main pipe 1 thus pressing the optical fiber cables 20, 21, 22 and the tension members 25, 26, 27, which are accommodated in the concave 51, against the inner surface of the main pipe 1 to take up the slack by removing the sag.

This operation can be applied to positions where the optical fiber cables 20, 21, 22 or the tension members 25, 26, 27 sag into the main pipe 1, but it is preferable to prevent any potential sagging by placing the metal rings 50 at a predetermined spacing.

In FIG. 12, the slack prevention member is formed of a FRP ring 52. This FRP ring is disposed at a desired position in an uncured state and thereafter is expanded in diameter to press the optical fiber cables 20, 21, 22 and the tension members 25, 26, 27 against the inner surface of the main pipe 1, and configured to be cured in this state.

In this embodiment, as the uncured FRP material 52 hardens, the slack prevention member adheres to the optical fiber cables 20, 21, 22 and the tension members 25, 26, 27, and therefore, a metal piece 53 formed with a concave, which can accommodate the optical fiber cables 20, 21, 22 and the tension members 25, 26, 27, is inserted between these optical fiber cables 20, 21, 22 and the tension members 25, 26, 27, and the uncured FRP material to prevent adhesion thus facilitating the replacement of the optical fiber cables 20, 21, 22.

In FIGS. 11 and 12, the concave 51, 54 is formed at a single position, but it may be formed at multiple positions depending on the number of the optical fiber cables 20, 21, 22 and the tension members 25, 26, 27.

Also the shape of the slack prevention member 50, 52 is not limited to a ring-shape, but a plate-shape may be used, which is configured to form a reduced diameter pipe with their ends overlapped and to be expanded in diameter by sliding the overlapped portions. Also an arcuate-shape larger than a half circle as described later may be used.

So far it has been described referring to FIG. 2 that in where the branch pipe 4, 5 branch off from the main pipe 1, the openings of branch pipe 6, 7 are formed in an obliquely upper part on the main pipe 1. Most of branches have this configuration and therefore, when the trunk optical fiber cable 20 and the trunk tension member 25 are laid along an upper middle part within the main pipe 1, they will not hinder the sewerage flow from a branch pipe 4, 5.

However, such configuration is not always the case depending on individual main pipes 1. There may be a case in which the directional angle of the branch pipe 4, 5 and/or the position of the opening of branch pipe 6, 7 are offset in such a way that the upper middle part of the main pipe 1 overlaps the opening of branch pipe 6, 7 and the trunk optical fiber cable 20 or the trunk tension member 25 traverses the opening of branch pipe 6, 7 thereby possibly hindering the sewage flow.

Figure 13:
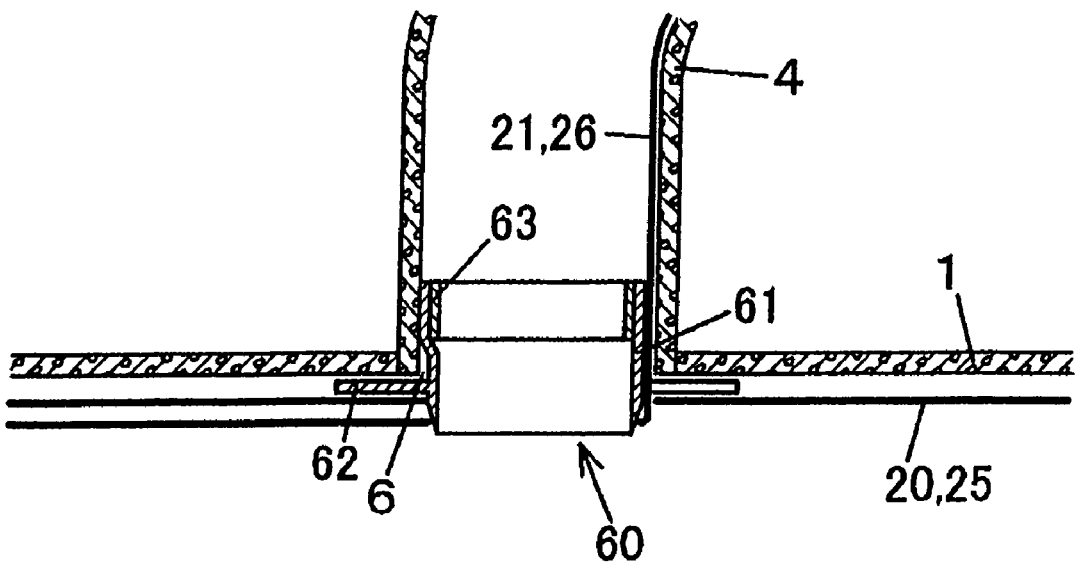
FIG. 13 is a longitudinal mid-section view to show a state that a guide member is fitted into an opening of branch pipe.

FIG. 13 shows a structure which prevent the optical fiber cables 20, 21, 22 and the tension members 25, 26, 27 from traversing the opening of branch pipe 6, 7 in the above described case.

In FIG. 13, the numeral 60 indicates a guide member which is formed of a tubular part 61 to be inserted into the branch pipe 4 and a collar part 62 which abuts with the inner surface of the main pipe 1 at the fringe of the opening of branch pipe 6, and the tip of the cylindrical part 61 protrudes into the main pipe 1 from the collar part 62.

The cylindrical part 61 is formed with a diameter expansion means 63 in the portion which is inserted into the branch pipe 4. The diameter expansion means such as a spring ring made of stainless steel, a metal ring which can be expanded by plastic deformation, and so forth can be used, each one of which can expand the cylindrical part 61 from inside pressing it against the inner surface of the branch pipe 4 is to be used. Also the collar part 62 is formed with a cutaway part 64 for inserting the branch optical fiber cable 21 and the branch tension member 26.

Thus, the branch optical fiber cable 21 and the branch tension member 26 reach the cutaway part 64 guided by the outer periphery of the end part of the cylindrical part 61 and, from the cutaway part 64, they pass through the gap between the cylindrical part 61 and the branch pipe 4, 5 extending into the branch pipe 4, 5.

Moreover, the trunk optical fiber cable 20 and the trunk tension member 25 skirt around the outer periphery of the tip part of the tubular part 61 and thus extend along the upper middle part of the main pipe 1 without traversing the opening of branch pipe 6, 7.

Figure 14:
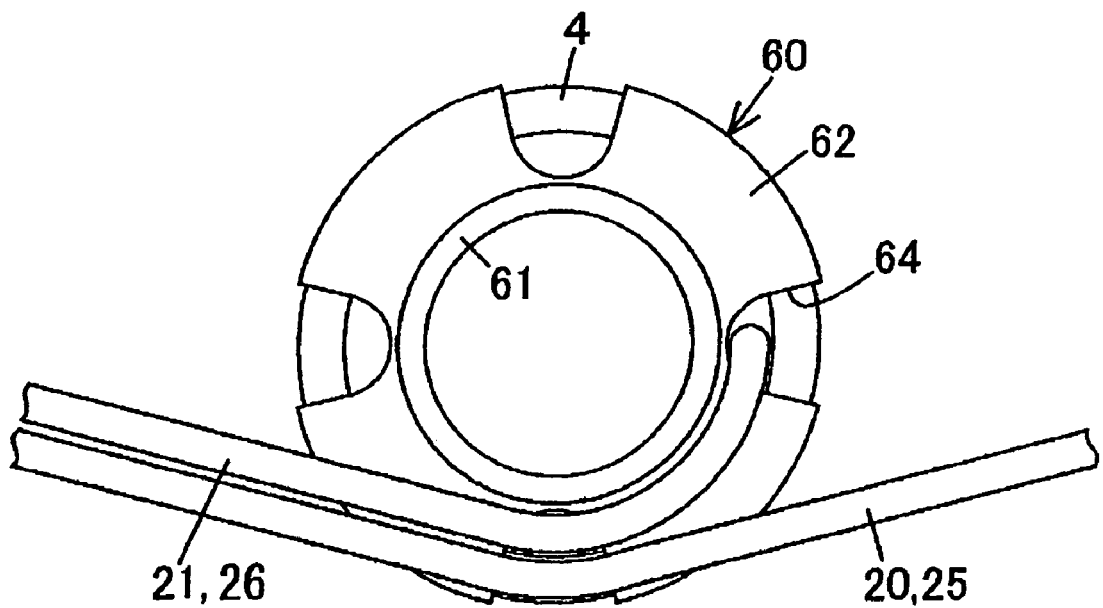
FIG. 14 is a bottom view of the opening of branch pipe in FIG. 13.

Further, as shown in FIG. 14, placing the optical fiber cables 20, 21 and the tension members 25, 26 under the collar part 62 makes it possible to prevent the guide member 60 from falling into the main pipe 1 with the help of the tension on the tension members 25, 26.

Figure 15:
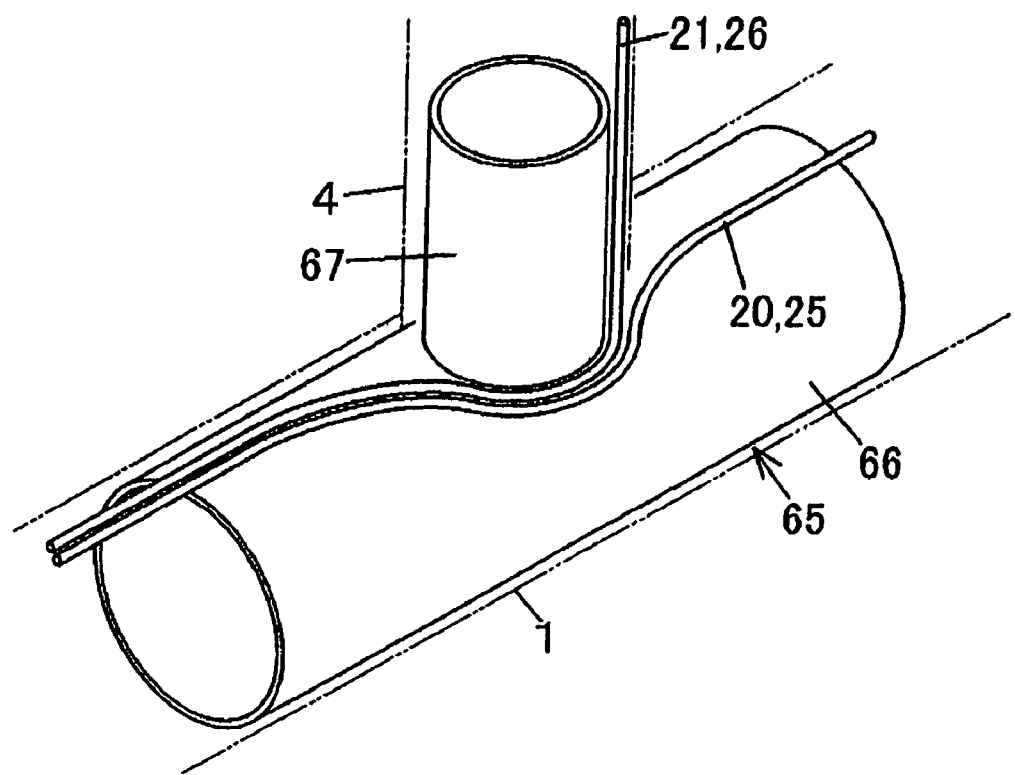
FIG. 15 is a perspective view to show a T-shape guide member fitted into an opening of branch pipe.

FIG. 15 shows another embodiment of the guide member, which is a T-shape guide member 65 having a substantially T-shape formed by joining a tubular main part 60 and a tubular branch part 67. After the optical fiber cables 20, 21, 22 and the tension members 25, 26, 27 are disposed in the pipeline, the T-shape guide member 65 is inserted into the main pipe 1 in a contracted state and placed at the opening of branch pipe 6. Then the tubular branch part 67 is inserted into the branch pipe 4 and, in that state, the tubular main part 66 and the tubular branch part 67 are expanded pressing themselves against the inner surfaces of the main pipe 1 and the branch pipe 4.

In this way, the optical fiber cables 20, 21 and the tension members 25, 26 which traversed the opening of branch pipe 6 are put into a path skirting around the fringe of the opening of branch pipe 6 and are clamped between; the tubular main part 66 and the tubular branch part 67; and the main pipe 1 and the branch pipe 4, at the same position.

The branch pipes 4, 5, as described before, ascend at a steep angle from the opening of branch pipe 6 in the upper side part of the main pipe 1 and change their directions near the earth's surface connecting to the branch pipe boxes 8, 9 at a gentle angle.

When the branch optical fiber cables 21, 22 and the branch tension members 26, 27 are inserted into such branch pipes 4, 5 and tension is applied on the branch tension members 26, 27, the branch tension members 26, 27 may diagonally traverse the branch pipe 4, 5 depending on their relative positions to the openings of branch pipe 6, 7 thus possibly hindering the sewage flow. That is, in a case as shown in FIG. 2, even if the tension device 34 is placed at a position 34A above the branch pipe boxes 8, 9 or at a position 34B below the branch pipe boxes 8, 9, the branch tension members 26, 27 will diagonally traverse the branch pipes 4, 5.

Figure 16:
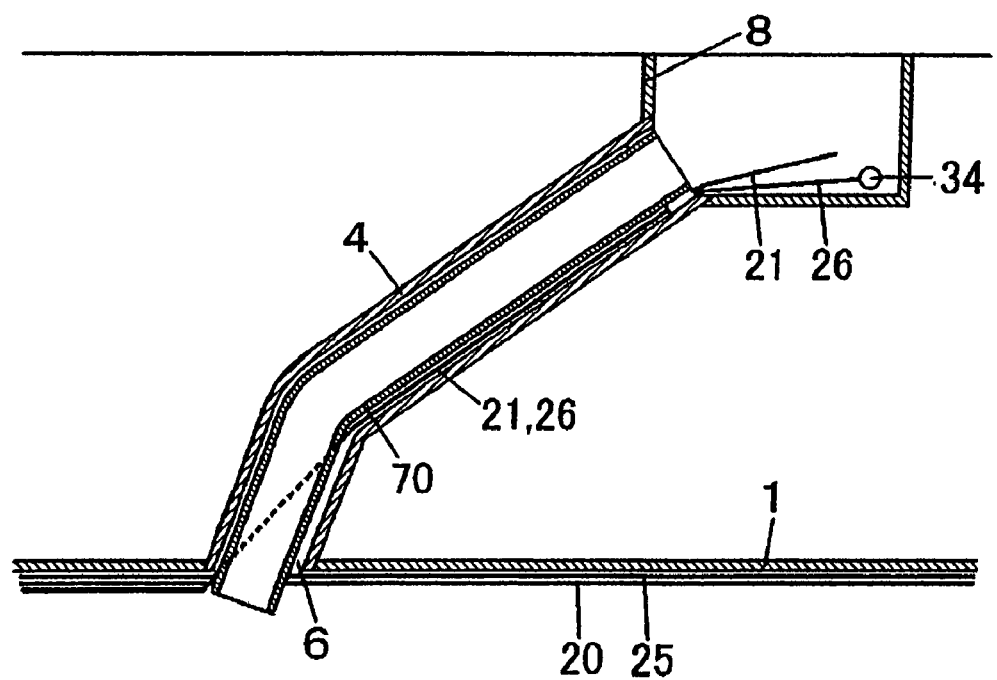
FIG. 16 is a longitudinal mid-section view to show a state that a flexible shape retaining pipe is inserted in a branch pipe.

FIG. 16 shows a method to solve the above mentioned problem in which after the branch optical fiber cable 21 and the branch tension member 26 are inserted into the branch pipe 4 and tension is applied on the branch tension member 26, a flexible shape retaining pipe 70 with a smaller diameter than that of the branch pipe 4 is inserted into the branch pipe 4 from the opening of branch pipe 8 to put the branch optical fiber cable 21 and the branch tension member 26 closer to the wall surface of the branch pipe 4 clamping the branch optical fiber cable 21 and the branch tension member 26 between the branch pipe 4 and the flexible shape retaining pipe 70.

For the flexible shape retaining pipe 70, for example, a hose formed of cylindrical fabric woven with a warp thread and a mono-filament or wire with a bending resiliency as the weft, or so called spiral hose in which hard plastic wire disposed in a spiral form is used as reinforcement, and the like can be used. The diameter of the flexible shape retaining pipe 70 is slightly smaller than the inner diameter of the branch pipe 4, and it is preferable that the shape retaining pipe will make some gap between itself and the inner surface of the branch pipe 4 so that it can be inserted into the branch pipe 4 with ease.

Accordingly, after the optical fiber cables 20, 21 and the tension members 25, 26 are inserted into the main pipe 1 and the branch pipe 4 and tension is applied on the tension member, the flexible shape retaining pipe 70 is forced into the branch pipe 4 from the branch pipe box 8.

FIG. 17 is another example to show a state of inserting the flexible shape retaining pipe 70 into the branch pipe 4, in which a bag 73 having a substantially ballistic type tip is fitted into the end of the flexible shape retaining pipe 70 such that the tip protrudes therefrom. The insertion operation is conducted by pulling a pull member 72 tied to the tip of the bag 73 while pressing the bag 73 against the flexible shape retaining pipe 70 by sending a pressurized fluid from behind the bag 73 through a fluid supplying hose 74. It is preferable to tuck the flexible shape retaining pipe from behind at the same time.

As described so far, the branch pipes 4, 5 ascend slantwise at a steep angle as shown in FIG. 2 and then change their ascending angles near the earth's surface connecting to the branch pipe boxes 8, 9 at a gentle angle. And the optical fiber cables 20, 21, 22 and the tension members 25, 26, 27 are disposed in the upper middle part of the main pipe 1 and the branch optical fiber cables 21, 22 and the branch tension members 26, 27 branching off therefrom are inserted into the branch pipes 4, 5. Therefore, if tension is simply applied on the tension members 26, 27, the tension members 26, 27 will be laid slantwise crossing the branch pipes 4, 5 between the upper space of inside the openings of branch pipe 6, 7 and the inflection point, at which the angles of the branch pipes 4, 5 change, thereby possibly hindering the sewerage flow.

Although the fluid pass can be secured by a method shown in FIGS. 16 and 17, it is difficult to insert the flexible shape retaining pipe 70 while tensioning the branch tension members 26, 27. Moreover, tension may be inadvertently applied on the branch optical fiber cable, and therefore the method can not be claimed to be sufficient.

To solve this problem, the branch optical fiber cables 21, 22 and the branch tension members 26, 27 which branch off from the trunk optical fiber cable 20 and the trunk tension member 25 laid in the upper space of inside the main pipe 1 are guided below the openings of branch pipe 4, 5 skirting around the openings of branch pipe 6, 7 to be secured at this point and, in this state, the branch tension members 26, 27 are tensioned thereby laying the branch optical fiber cable 21, 22 and the branch tension members 26, 27 along the lower surface of the branch pipes 4, 5 without crossing the interior of the branch pipes 4, 5.

Several examples will be described below in which the branch optical fiber cables 21, 22 and the branch tension members 26, 27 are made to make a detour to reach the lower part of the openings of branch pipe 4, 5.

FIGS. 18 and 19 shows such an example. The numeral 80 indicates a guide member placed at the opening of branch pipe 6 of the branch pipe 4, and the guide member 80 is configured in such a way that a tubular main part 81 and a tubular rotary part 82 are rotatably fitted with each other.

The tubular main part 81 has a diameter smaller than the inner diameter of the branch pipes 4, 5, and the tip part of the tubular main part 81 is formed with a trunk slide part 83 which projects into the main pipe 1 and slidably supports the trunk optical fiber cable 20 and the trunk tension member 25 disposed in the upper space of inside the main pipe 1. Also a support part 84 for supporting the branch optical fiber cable 21 and the branch tension member 26 is formed on the outer surface at the position corresponding to the trunk slide part 83.

The tubular rotary part is rotatably fitted to the rear edge of the tubular main part 81 and, on which outer periphery, a branch slide part 85 for supporting the branch optical fiber cable 21 and the branch tension member 26 is formed.

Figure 18A:
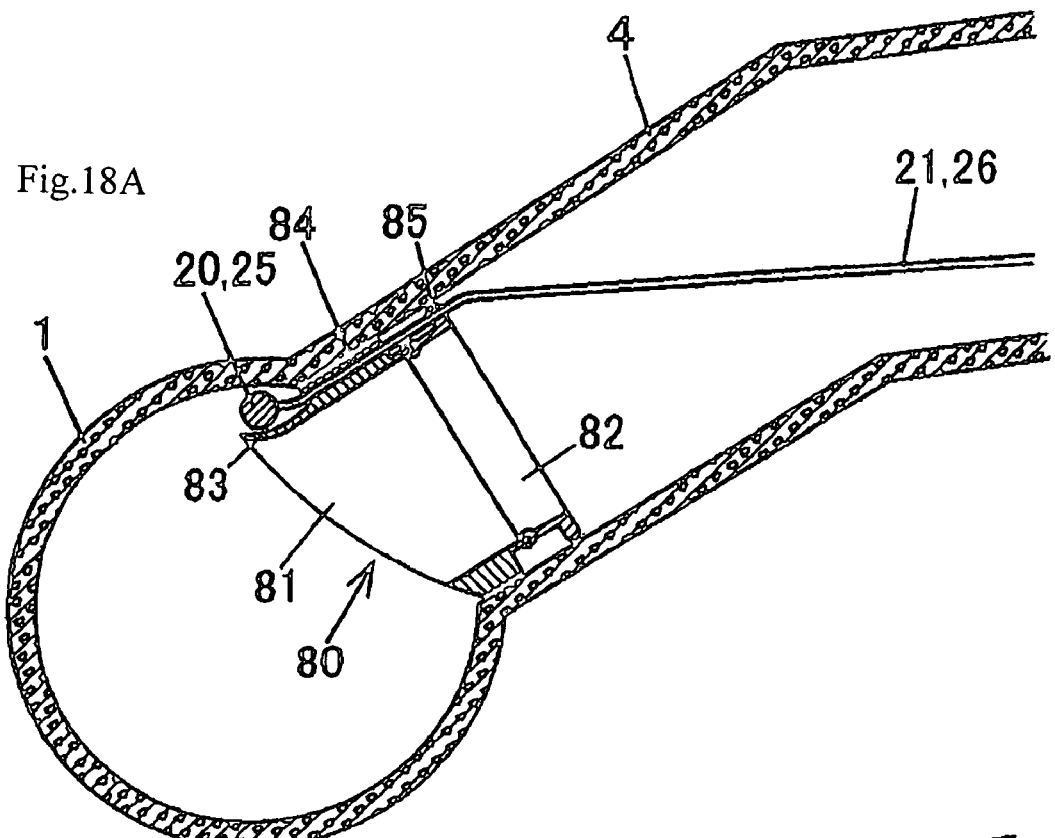
FIG. 18 is a transverse sectional view to show a state that an optical fiber cable and tension member are guided to an opening of branch pipe by fitting a guide member into the opening of branch pipe, wherein (a) the guide member is disposed in the opening of branch pipe, and (b) a tubular rotary part is rotated to guide the cable to the lower part of the opening of branch pipe.
Figure 19A:
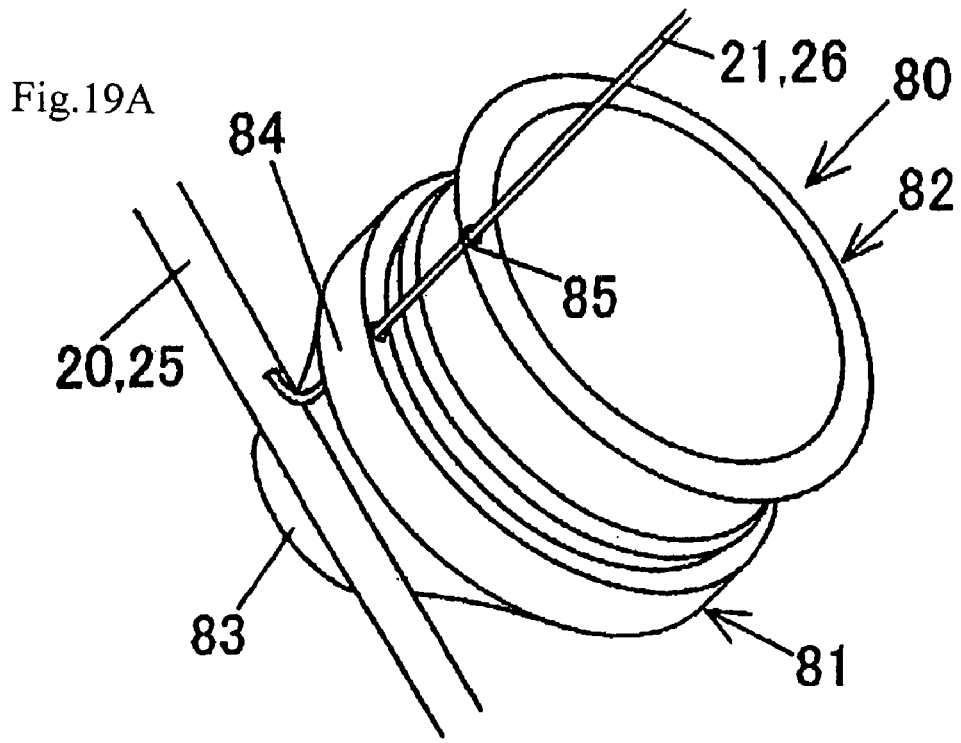
FIG. 19 is a perspective view of the guide member in FIG. 18 to show the states: (a) the guide member is disposed in the opening of branch pipe, and (b) the tubular rotary part has been rotated.

Accordingly, as shown in FIGS. 18(a) and 19(a), in a state in which the support part 84 of the tubular main part 81 and the branch slide part 85 of the tubular rotary part 82 are aligned, the branch optical fiber cable 21 and the branch tension member 26 are inserted into them, and then the guide member 80 is inserted into the branch pipe 4 from the branch pipe box 8 to make it reach the opening of branch pipe 6. And the trunk slide part 83 of the tubular main part 81 is made to project into the main pipe 1 supporting the trunk optical fiber cable 20 and the trunk tension member 25 with its trunk slide part 83. Here, the guide member 80 may be placed beforehand at a position of the trunk optical fiber cable 20 and the trunk tension member 25 corresponding to the opening of branch pipe 6 to insert it into the main pipe 1 and then pull it up from the main pipe 1 to place it at the opening of branch pipe 6 together with the branch optical fiber cable 21 and the branch tension member 26.

Figure 18B:
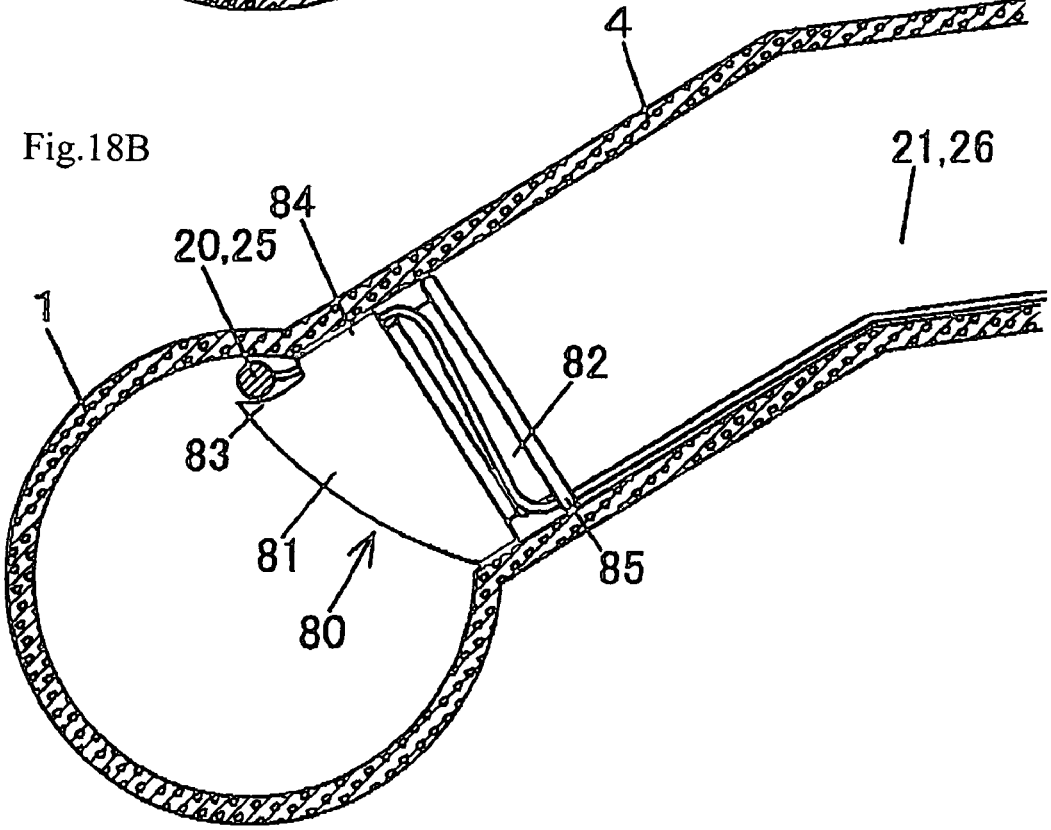
Figure 19B:
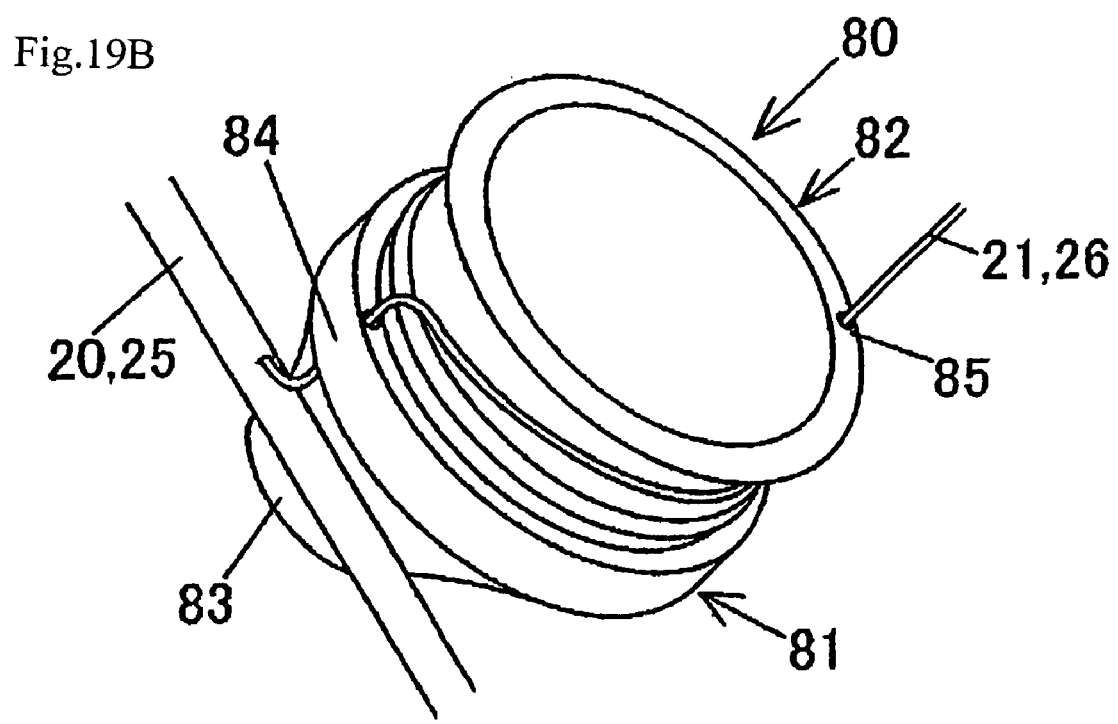

Next, the tubular rotary part 82 is rotated with respect to the cylindrical body as shown in FIGS. 18(b) and 19(b) to place the branch slide part 85 at lower part of the branch pipe 4 thereby guiding the branch optical fiber cable 21 and the branch tension member 26 from the upper part to the lower part of the branch pipe 4 by skirting around the outer surfaces of the cylindrical body 81 and the tubular rotary part 82.

When, in this state, tension is applied on the branch tension member 26 from the branch pipe box 8, the branch optical fiber cable 21 and the branch tension member 26 will be disposed along the lower side surface of the slanted part of the branch pipe 4 without traversing the inside of the branch pipe 4 since the leading edge of the branch tension member 26 is fixed to the branch slide member 85 in the lower part of the branch pipe 4.

However, in this method, since the fixation of the guide member 80 with respect to the branch pipe 4 is not necessarily secure, as shown in FIG. 20, it is preferable to fit a curable fixing member 86 formed of a cylindrical seat molding compound or the like into the inner surfaces from the cylindrical body 81 of the guide member 80, over the tubular rotary part 82, and to the branch pipe 4, and to expand the fixing member 86 by use of an air bag inserted therein or the like and make it harden in a state pressing itself against the inner surfaces of the guide member 80 and the branch pipe 4 so that the guide member 80 is firmly secured to the branch pipe 4.

Moreover, as shown in FIG. 20, forming a tapered face on the end of the fixing member 86 makes it possible to prevent solids flowing in the branch pipe 4 from being trapped by the fixing member 86 thereby smoothing the fluid flow in the branch pipe 4.

Figure 21A:
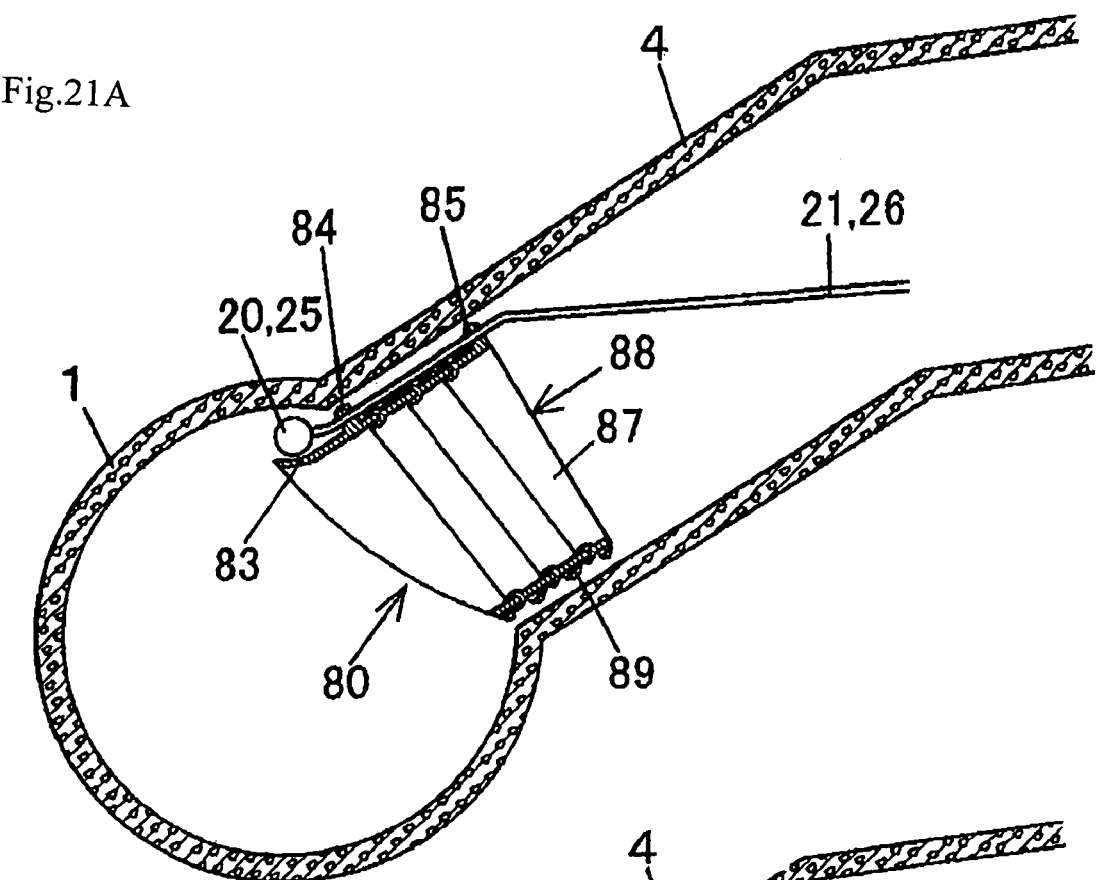
FIG. 21 is transverse sectional views to show an example in which a pipe body formed by rolling up a plate member in a spiral form is used as the guide member and (a) shows a state that the guide member is placed in the opening of branch pipe and (b) shows a state that the pipe body is twisted.
Figure 21B:
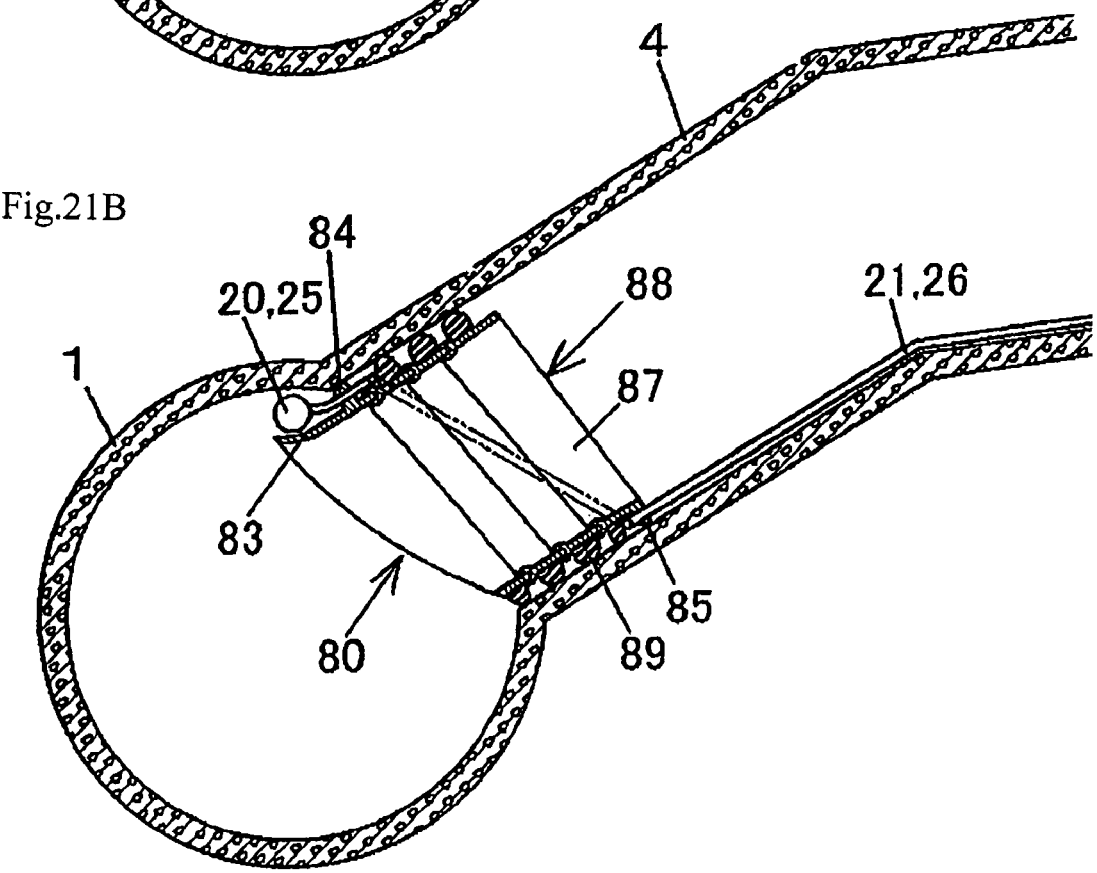

FIG. 21 shows another embodiment of the guide member 80. The guide member 80 in this embodiment is configured to form a pipe body 88 by spirally rolling up a plate member 87 and slidably fitting adjacent side edges of the plate member 87.

The guide member 80 can be twisted by making the plate member 87 comprising the pipe body 88 with each other and its diameter can be expanded or contracted by thus twisting.

Then, the pipe body 88 of such a structure is provided in its front end part with a trunk slide part 83 and a support part 84, and in its rear end part with a branch slide part 85, and the rear end part. The pipe body 88 is twisted to align the support part 84 and the branch slide part 85 and to make its outer diameter smaller than the inner diameter of the branch pipe 4. And in that state, the branch optical fiber cable 21 and the branch tension member 26 are inserted into the support part 84 and the branch slide part 85, and in that state, the guide member 80 is inserted from the branch pipe box 8 leading it to the opening of branch pipe 6.

Next, the trunk optical fiber cable 20 and the trunk tension member 25 are supported by the trunk slide part 83. Then the pipe 88 is twisted in the loosening direction of the spiral to expand the diameter of the pipe 88 pressing it against the inner surface of the branch pipe 4, and to place the branch slide part 85 under the branch pipe 4. Thus, the branch optical fiber cable 21 and the branch tension member 26 are guided from the upper part to the lower part of the branch pipe 4 skirting around the outer surface of the pipe body 88.

By attaching a seal material 89 made of a water-swelling rubber on the outer surface of the foregoing guide member 80 and making the seal material 89 swell with the water inside the branch pipe 4, it is made possible to air tightly fix the guide member 80 against the branch pipe 4.

Figure 22:
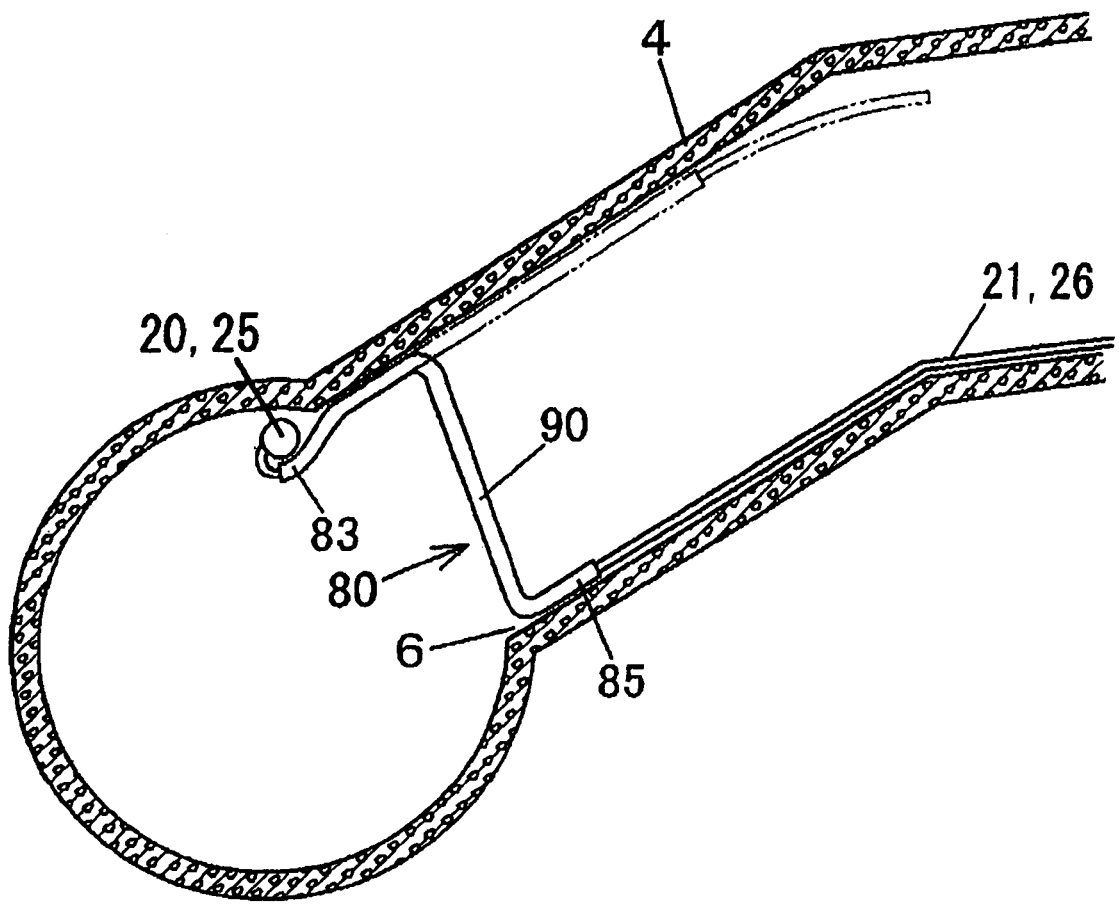
FIG. 22 is a transverse sectional view to show a state that a pipe is mounted in an opening of branch pipe as the guide member.
Figure 23:
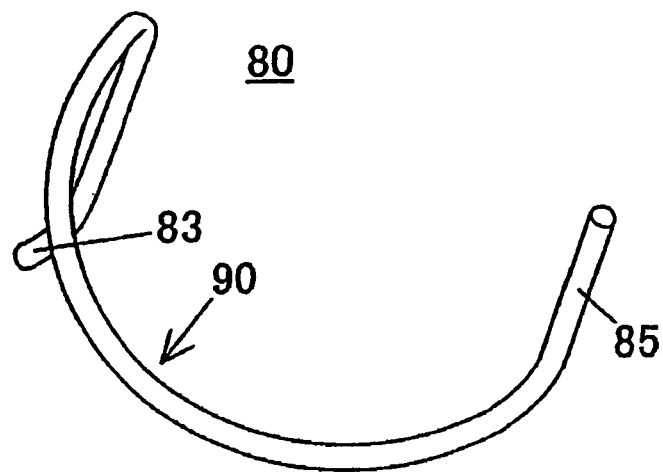
FIG. 23 is a perspective sectional view of the pipe as the guide member in FIG. 22.

FIG. 22 shows yet another embodiment of the guide member 80. The guide member 80 of this embodiment is a pipe 90 of which both ends are made of a rigid material and of which middle part is made of resilient and deformable material, and the inner diameter of the pipe 90 is large enough to slidably insert the branch optical fiber cable 21 and the branch tension member 26.

Then the branch optical fiber cable 21 and the branch tension member 26 are inserted into the pipe 90 in a state that it extends straight, and the pipe 90 is inserted from the branch pipe box 8 leading it to the opening of branch pipe 6. The tip of the pipe 90 is configured to protrude into the main pipe 1 to form the trunk slide part 83 making it hold the trunk optical fiber cable 20 and the trunk tension member 25. And as previously described, the pipe 90 may be disposed from the inside of the main pipe 1.

When the middle part of the pipe 90 is twisted, the middle part is deformed against its resiliency into a spiral shape along the inner surface of the branch pipe 4, and the spiral is pressed against the inner surface of the branch pipe 4 by its resiliency.

Then the rear end of the pipe 90 is placed in the lower part of the branch pipe 4 forming a branch slide part 85.

When the state in which the guide member 80 is pressed against the inner surface of the branch pipe 4 is unstable, it is preferable to place a fixing member 86 similar to the one described in FIG. 20 inside the spiral of the pipe 90 and cure it in a state in which it is expanded and pressed against the inner surface of the branch 4 thus fixing the guide member 80.

Figure 24:
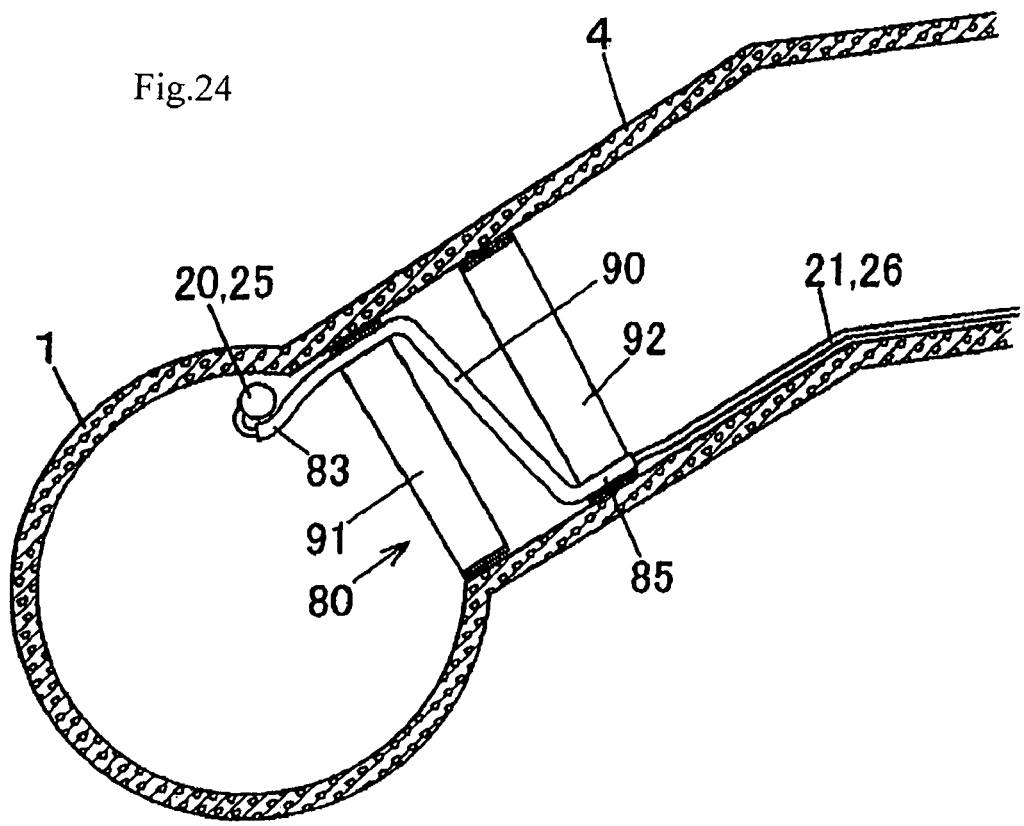
FIG. 24 is a transverse sectional view to show a state that a pipe with expansion members fixed at its ends is used as the guide member.

FIG. 24 shows still another embodiment of the guide member 80 which is a pipe 90 similar to the one described in FIG. 22, ring-shape expansion members 91, 92 being fixed to the both ends of the pipe.

The expansion members 91, 92 are made from a resilient deformable material such as metal and are shaped like a partly cut out ring with a diameter slightly larger than the inner diameter of the branch pipe 4.

In this guide member 80, the expansion members 91, 91 are contracted in diameter to a diameter smaller than the inner diameter of the branch pipe 4 and the both ends of which are temporarily fastened, and the branch optical fiber cable 21 and branch tension member 26 are inserted into the pipe 90 while the pipe 90 extends straight.

And in that state, the guide member 80 is inserted from the branch pipe box 8 and guided to the opening of branch pipe 6, and the front end of the pipe 90 is made to project into the main pipe 1 to form a trunk side part 83 for holding the trunk optical fiber cable 20 and the trunk tension member 25. In this state, the temporal fastening expansion member 91 of the lead end side is released to make it expand by its resiliency pressing it against the inner surface of the branch pipes 4, 5 thus holding itself.

Figure 25A:
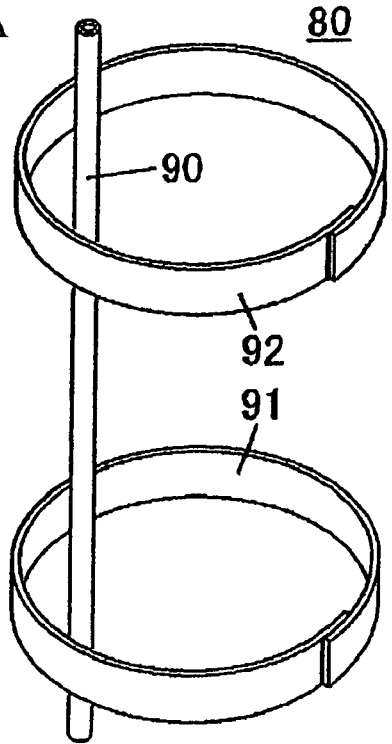
FIG. 25 is a perspective view to show the guide member in FIG. 24, and (a) shows a state before mounting on the opening of branch pipe and (b) shows a state after mounting on the opening of branch pipe.
Figure 25B:
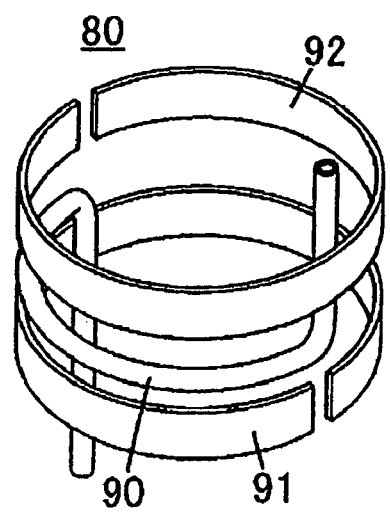

As shown in FIG. 25(*b*), twisting the middle part of the pipe 90 makes the middle part deform against its resiliency into a spiral shape along the inner surface of the branch pipe 4, and the spiral is pressed against the inner surface of the branch pipe 4 due to the resiliency of the pipe 90 and the both ends of the pipe 90 is fixed in the lower part of the branch pipe 4 by the expansion members 91, 92 and the rear end part serves as a branch slide part 85.

Also in this embodiment, for the temporal fastening of the both ends of the enlarging members 91, 92, a structure which is bonded by a hot melt adhesive and detached by heating, or a structure in which an appropriate locking structure is used for detacheable locking can be adopted.

In the above description, the branch pipe is explained only about the branch pipe 4 in FIG. 1, but the explanation equally applies to the branch pipe 5 as well as the case in which even more branch pipes are provided. When the trunk optical fiber cable 20 or the trunk tension member 25 is referred, it includes the state that the branch optical fiber cable 22 and the branch tension member 27 passing through the branch pipe 4 are placed in parallel.

Also the present invention is not limited to the case of the two adjacent manholes 2, 3 as shown in FIG. 1, but it can be applied to over plurality of manholes and, in such cases, the intermediate manholes can be treated in the same way as the branch pipes 4, 5.

In a method of the present invention, a trunk tension member 25 is slidably combined with the trunk optical fiber cable 20 to be laid in the main pipe 1 so that the trunk tension member 25 is stretched substantially straight in the upper space of inside the main pipe by applying tension between the manholes 2 and 3, and this makes it possible to lay the trunk optical fiber cable 20 in the upper space of inside the main pipe 1 along the trunk tension member 25 neither placing excessively tension nor giving unnecessary slack on the trunk optical fiber cable 20.

Similarly in the branch pipes 4, 5, it is also possible to lay the branch optical fiber cables 21, 22 into the branch pipes 4, 5 without placing excessive tension by drawing in the branch tension member 26 while applying tension on it.

Also tying the branch tension members 26, 27 to be installed in the branch pipes 4, 5 with the tension member 25 to be installed in the main pipe 1 at the portion 31 corresponding to the openings of branch pipe 6, 7 makes it possible to haul the trunk tension member 25 toward the branch pipe 5 allowing the trunk optical fiber cable 20 to be laid in the main pipe 1 without loosening further.

Inserting the trunk optical fiber cable 20 and the trunk tension members 25 into the guide conduit 45 allows the trunk optical fiber cable 20 to be slidably combined with the trunk tension members 25 via the guide conduit 45, and the optical fiber cable 20 is laid in the upper space of inside the main pipe 1 through the guide conduit 45 by the tension applied on the trunk tension member 25.

Moreover, making the branch optical fiber cables 21, 22 and the branch tension members 26, 27 to be inserted in the branch pipes 4, 5 branch off from the guide conduit 45 at the positions corresponding to the openings of branch pipe 6, 7 by means of the guide conduit 45 and applying tension on the branch tension members 26, 27 allows each optical fiber cables 21, 22 to be inserted into the branch pipes 4, 5 without being excessively tensioned.

Moreover, providing slack prevention members 50, 52 within the main pipe 1 makes it possible to remove the slack on the optical fiber cable 20 produced within the main pipe 1 by pressing it against the inner surface of the main pipe 1 with the slack prevention members 50, 52.

Furthermore, placing guide members 60, 65 at the openings of branch pipe 6, 7 allows the optical fiber cables 20, 21, 22 and the tension members 25, 26, 27 skirt around the area directly beneath the openings of branch pipe 6, 7 thereby preventing them from hindering the sewage flow.

Also inserting a flexible shape retaining pipe 70 into each branch pipe 4, 5 allows to guide the sewage flow in the branch pipes 4, 5 into the flexible shape retaining pipe 70 thus preventing the optical fiber cables 21, 22 and the tension members 26, 27 from hindering the sewage flow in the branch pipes 4, 5.

Furthermore, disposing the guide member 80 in the openings of branch pipe 6, 7 to guide the trunk optical fiber cable 20 and the trunk tension members 25 as well as the branch optical fiber cables 21, 22 and the branch tension members 26, 27 laid in the upper space of inside the main pipe 1 are guided to the lower part of the branch pipes 4, 5 circumventing the openings of branch pipe 6, 7 and fix them at the position, and applying tension on the branch tension members 26, 27 in this state allows the branch optical fiber cables 21, 22 and the branch tension members 26, 27 to be laid along the lower surface of each branch pipe 4, 5 without crossing the interior of each branch pipe 4, 5.

Next, another embodiment in which laying is conducted along the upper surface of the branch pipe will be described.

In this embodiment, first, the inside of the main pipe 1 and the branch pipes 4, 5 are surveyed with a TV camera to measure numerical data such as the distance between the manholes 2 and 3 (there may be other manholes between them), the lengths from the manhole 2 to the branch openings 6, 7, the lengths of the branch pipes 4, 5, and their diameters.

Also, if there are any obstacles (a lump of mortar, protrusion of a branch pipe into the main pipe, and others), they are to be removed by a specially designed obstacle removing machine so that they will not hinder the laying of the optical fiber cables.

Next, a pull member is installed in the main pipe 1. Known methods for such installation include a method of forcing the rigid body such as a wire into the pipe, a method of flying a parachute-like installation tool by pressurized air, a method of connecting to a self-moving vehicle, and so forth; these known methods may be suitably adopted.

Based on the survey results, the lengths of the trunk optical fiber cable 20, the branch optical fiber cables 21, 22, and the tension members 25, 26, 27 are determined and slidably combined together with respect to each other. Preferably, for an example, the trunk tension member is a wire (high-strength low-elongation characteristics) is used for the trunk tension member 25 and a cylindrical member formed of a flexible stainless steel pipe, the inner and outer surfaces of which being coated with a resin film and integrally formed with high-strength low-elongation fibers (so called super-fabric such as carbon, aramid, and the like) in the lengthwise direction.

Figure 27:
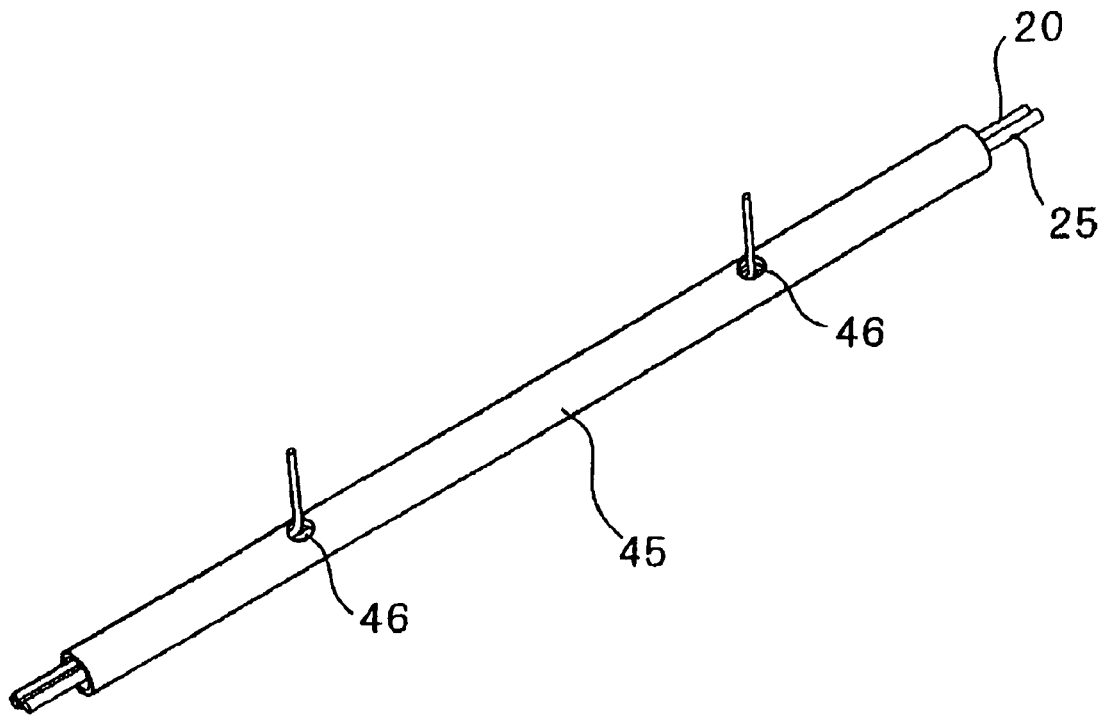
FIG. 27 shows an example of a guide pipe and an optical fiber cable fitted into the guide pipe.

Preferably, the trunk optical fiber cable 20 and the trunk tension member 25 are slidably combined by inserting them into a pipe-shaped guide conduit 45 as shown in FIG. 27.

Preferably, the branch optical fiber cables 22, 22 and the branch tension members 26, 27 are slidably integrated by inserting the branch optical fiber cables 21, 22 in the branch tension members 26, 27 and it is further preferable to keep the parts laid in the main pipe 1 inserted in a guide conduit 45 as shown in FIG. 27 and keep them taken out from openings 46 provided on the guide conduit 45 at distances from the manhole 2 corresponding to the openings of branch pipe 6, 7.

This guide conduit 45 need to have chemical resistance against the fluid in the main pipe 1 and flexibility to be inserted from a manhole 2, 3, and preferably it is formed of plastics such as polyethylene, polypropylene, polyurethane, polyester, or those reinforced with fibers and is a pipe having a length corresponding to the length of the main pipe 1 and at least one or more continuous spaces in the lengthwise direction, and is provided with openings 46 in the thickness direction at positions corresponding to the openings of branch pipe 6, 7. This configuration allows the optical fiber cable and the tension members to be slidably juxtaposed in the lengthwise direction within the guide conduit 45. Moreover, the shape of the guide conduit 45 may be formed by cutting a pipe shown in FIGS. 9, 10 open in the lengthwise direction forming a 'C' shape and making the both edges overlap to make a space inside. This shape makes it possible to place members with ease into the pipe through the cutout part.

Figure 31:
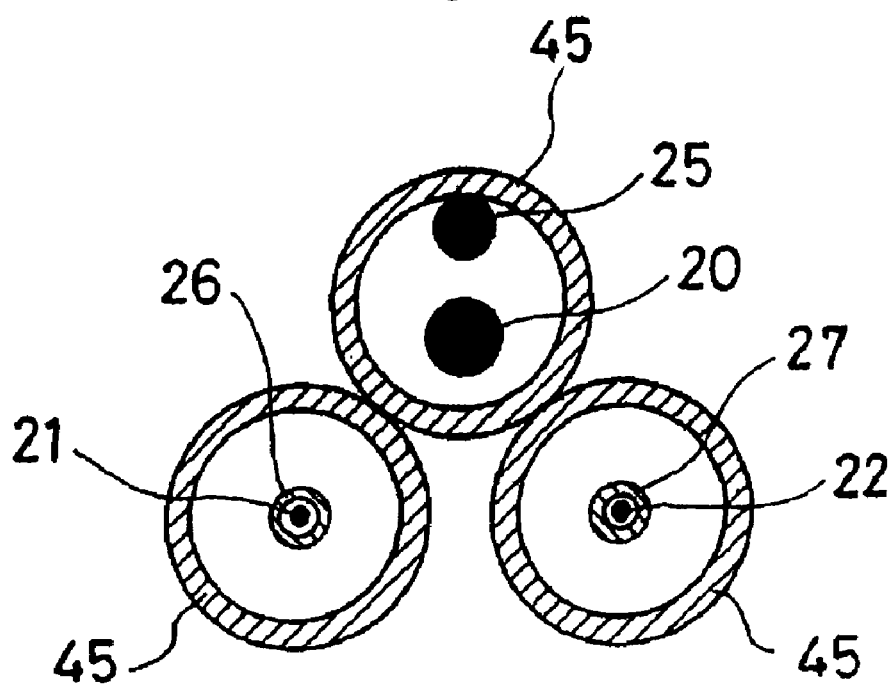
FIG. 31 shows a sectional view to show an embodiment of the guide pipe.

Moreover, the guide conduit 45 may be a single pipe as shown in FIG. 27, or for example, three pipes may be used as shown in FIG. 31 in such a way that each of them is combined to make the trunk tension member 25 bear the total load with each optical fiber cable 20, 21, 22 being inserted in each guide conduit 45. Of course, the guide conduit 45 may be an unitary structure such as the ones shown in FIGS. 44 and 45 which has a plurality of cavities. In the case in which multiple guide pipes are used, when the guide pipes 45 are not tied together, each guide conduit 45 need to be provided with a trunk tension member 25 inserted within it.

Moreover, the tension members 25, 26, 27 are made of a high-strength low-elongation material and extends parallel with the optical fiber cables 20, 21, 22, the tension members 25, 26, 27 and optical fiber cables 20, 21, 22 being moveable with respect to each other in the length direction with some clearance.

As shown in the above described FIG. 3, for the tension members 25, 26, 27, elongated members such as ropes, strings, and belts made of high-strength low-elongation fibers such as poly-para-phenylene-benzo-bis-oxazole (POB) fibers, aramid fibers, carbon fibers, metal fibers, and glass fibers may be used.

Figure 36A:
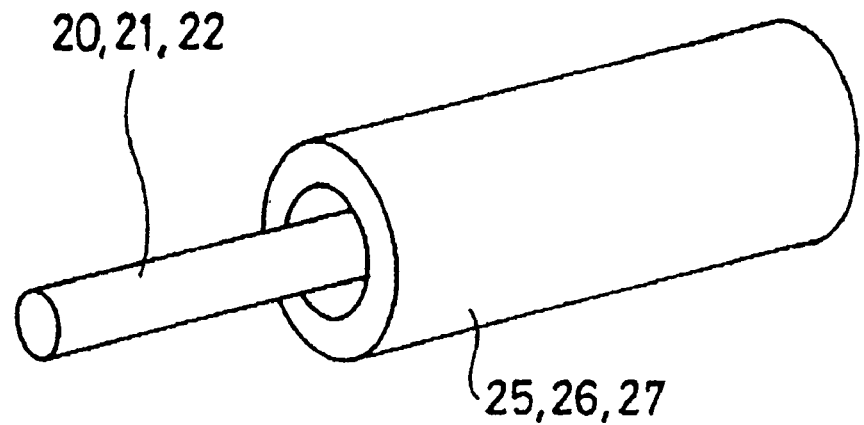
FIG. 36 shows (a) a perspective view and (b) its enlarged transverse sectional view of a pipe-shaped tension member with optical fiber cables inserted therein.
Figure 36B:
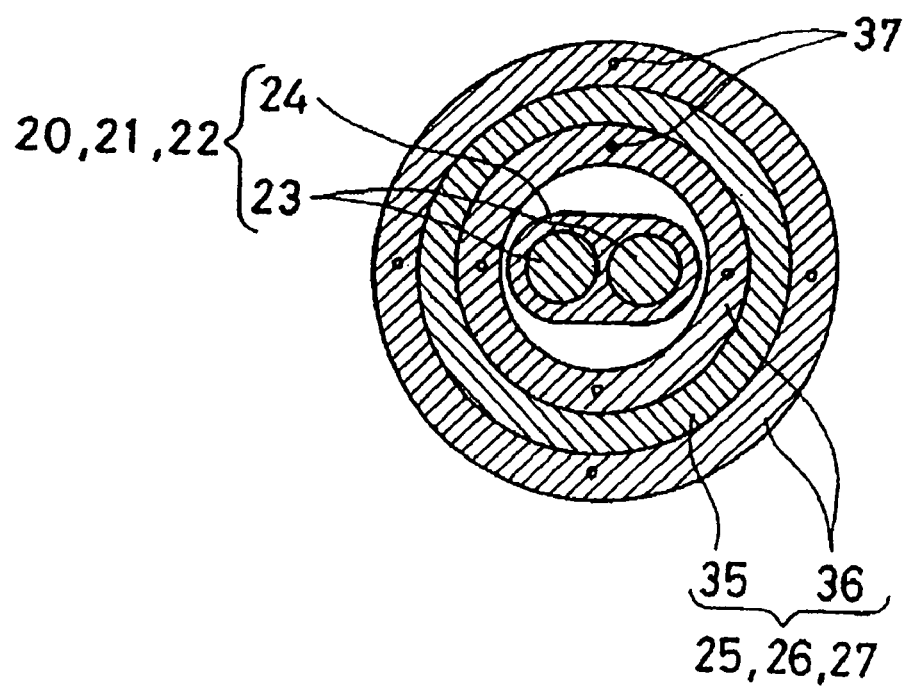

FIG. 36(*a*) shows another embodiment of the structure in which the tension members 25, 26, 27 are slidably integrated with the optical fiber cables 20, 21, 22. The tension members 25, 26, 27 has a pipe form and the optical fiber cables 20, 21, 22 are slidably inserted in the tension members 25, 26, 27.

Figure 35:
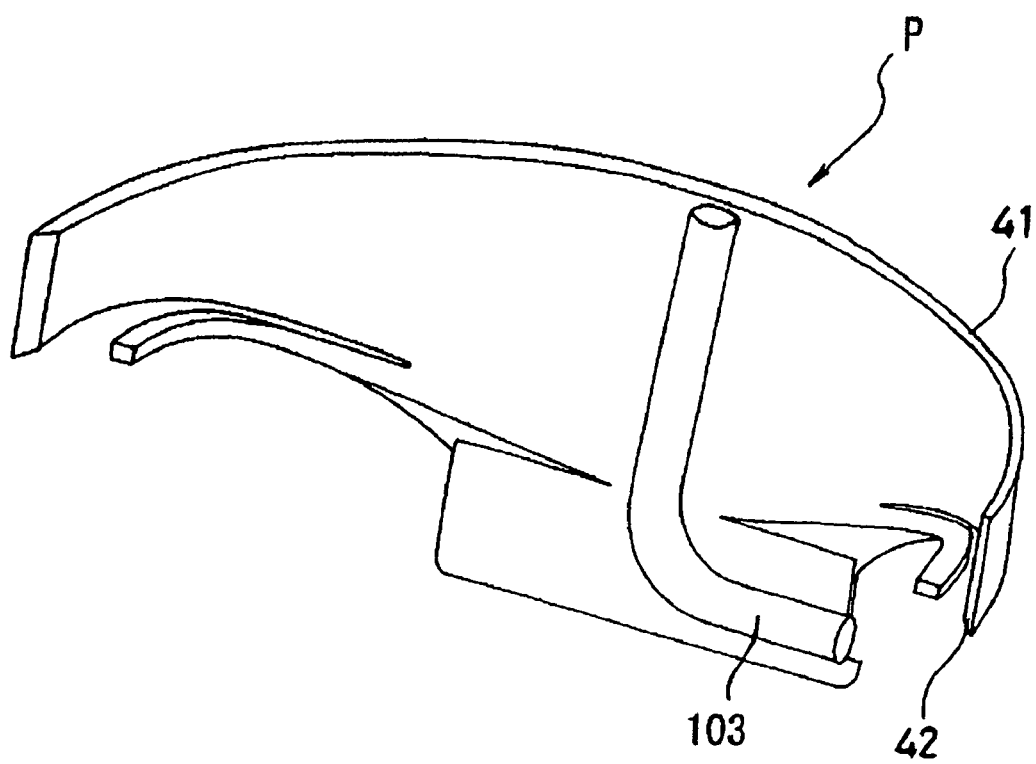
FIG. 35 is perspective view to show another example of a guide member for guiding an optical fiber cable so that the optical fiber cable is laid in the upper part inside the branch pipe.

FIG. 36(*a*) is an enlarged cross sectional view of FIG. 35 (*b*), and the tension members 25, 26, 27 are formed of a metal pipe 35 such as a stainless steel pipe, the inner and outer surfaces of which being coated with an anti-corrosion resin coating 36. Inside the metal pipe 35, two-core optical fiber cables 20, 21, 22 are inserted, each of which being formed of two optical fibers 23 whose outer surface is coated with an anti-corrosion resin coating 24. The optical fiber cable is not limited to the two-core type, but four-core type and others may be used. For the trunk optical fiber cable 20, in particular, a cable with more than 200 cores are used depending on the number of the branches.

Configuring the inner diameter of the inner coating of the metal pipe 35 to be larger than the outer diameter of the optical fiber cables 20, 21, 22 allows the optical fiber cables 20, 21, 22 to be slidable in the metal pipe 35. The metal pipe 35 is preferably flexible and bendable. Also the anti-corrosion coating 36 is preferably reinforced in the longitudinal direction by embedding filamentary high-strength low-elongation fibers 37 inside the coating.

Figure 28:
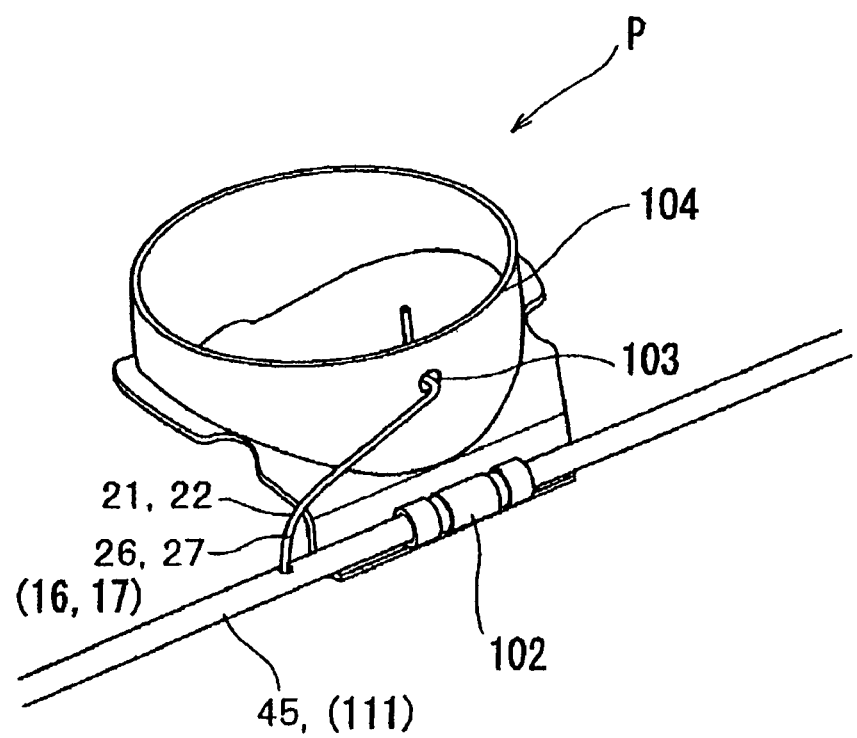
FIG. 28 is a perspective view of a guide member which guides an optical fiber cable so that the optical fiber cable is laid in the upper space of inside the branch pipe.

Next, each guide member P shown in FIG. 28 is attached to the guide conduit 45 in the vicinity of the openings 46 corresponding to the positions at which the branch tension members 26, 27 branch off from the trunk tension member 25. The guide member P has a diameter substantially corresponding to the inner diameter of the branch pipes 4, 5 and is comprised of a tubular insertion part 104 whose cross section is an arcuate-shape or ring-shape larger than a half circle, a trunk slide part 102 which projects downward from the cylindrical insertion part 104 for supporting members to be laid in the main pipe 1, and a branch slide part 103 provided in the insertion part 104 and for slidably holding members to be laid in the branch pipes 4, 5. A guide conduit 45 is slidably passed through the trunk slide part 102 placed in the guide member P and also the branch tension members 26, 27 and the branch optical fiber cables 21, 22 are slidably passed through the branch slide part 103. The trunk slide part 102 and the branch slide part 103 may be formed of a hole or a pipe form (see FIG. 35).

It is preferable to arrange the branch tension members 26, 27 and the optical fiber cables 21, 22 which are taken out from the branch slide part 103 of the guide member P into a compact form not to wind themselves around the guide conduit 45 while at work. Moreover, in a case in which a guide conduit 45 is not used as shown in FIG. 8, the guide member P is mounted on the trunk tension member 25.

Next, a method for laying the optical fiber cables 20, 21, 22 within the main pipe 1 will be described below referring mainly to FIG. 26.

The guide conduit 45 is connected to one end of the pull member which is, in advance, passed through between manholes 2 and 3 and then the guide conduit 45 is passed through from the manhole 2 to the manhole 3. Also a TV camera is inserted from the branch pipe boxes 8, 9 to confirm whether or not the guide member P is located near each opening of branch pipe 6, 7.

When there is a risk that the guide member P is damaged from the friction against the inner wall of the pipe or trapped by steps in the pipeline while it is moved in the main pipe 1, it is preferable to draw it in together with the pull string by placing it on a moveable cart or a simple boat.

Figure 32:
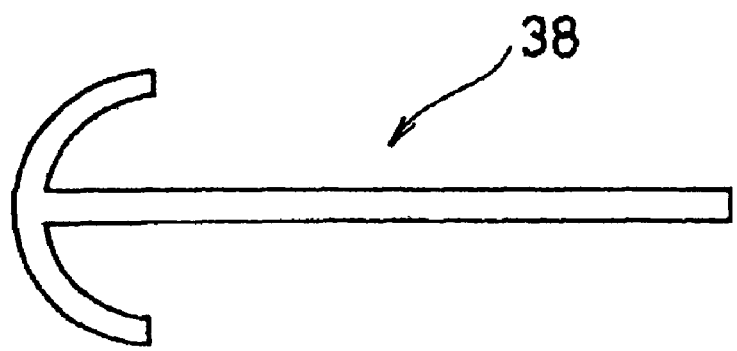
FIG. 32 shows an example of the jigs for pulling a tension member.

Next, a work rod, which is provided at its tip with a hook jig 38 as shown in FIG. 32, is inserted from the branch pipe box 8 to hook up the tension member 26 with the jig 38 while observing with the TV camera to take out the tension member 26 and the branch optical fiber in the branch pipe box 8. At this time, the guide conduit 45 in the main pipe 1 is moved to adjust its position to facilitate the hooking of the tension member 26 with the work rod. It is also preferable to apply temporal tension to the trunk tension member 8, therefore this is adopted depending on the situation of the work site.

Then the tension member 26 is taken up from the branch pipe box 8 to insert the tip of the guide member P into the opening of branch pipe 6. When the orientation of tip of the guide member P is not changed upon taking up the tension member 26, it is preferable to insert an air packer 39 as shown in FIG. 33 in a shrunk form into the opening of branch pipe 6 from the branch pipe box 8, and insert it further into the guide member P to make it expand, and then take up the air injection part thereby changing the orientation of the tip of the guide member P in the direction of the branch pipe 4. As for the method for fixing the guide member P to the opening of branch pipe 6, an adhesive or a glue may be applied beforehand on the outer surface of the tubular insertion part 104 of the guide member P to fix it through the contact with the inner surface of the branch pipe 4, or a resilient member such as a rubber and a sponge may be placed on the outer surface of the tubular insertion part 104, or a tapered face with its diameter decreasing to the front end may be formed, to fix it by contact bonding through friction.

It is also possible to use a guide member P having a shape as shown in FIG. 35. When using this type of the guide member P, the arcuate fixing part 41 is made to contract in diameter with a thin lead string and the like, and after being inserted into the branch pipe 4, the thin lead string is cut releasing the diameter contraction and expanding the arcuate fixing part 41 in diameter, thus fixing the arcuate fixing part 41 into the branch pipe 4. Also, in this case, as in the case with the guide member P having a shape as described in FIG. 28, the fixing may be carried out by applying an adhesive or a glue in advance on the outer surface of the arcuate fixing part 41 and fixing it through contact with the inner surface of the branch pipe 4, or by applying a resilient body such as a rubber and a sponge in advance, or forming a tapered face 42 of which diameter tapers off to the front, and fixing it by contact bonding through friction.

Figure 47:
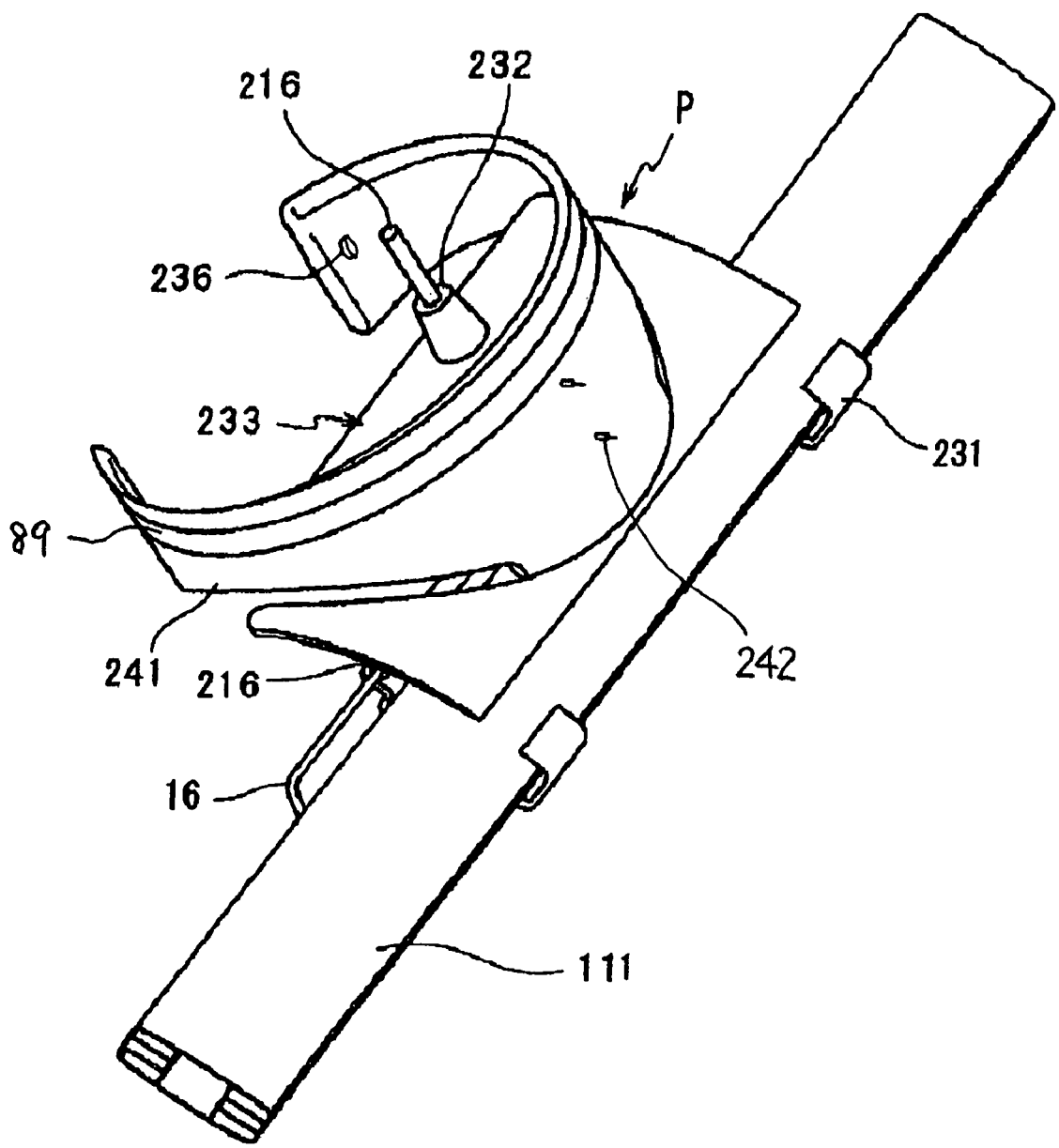
FIG. 47 is a perspective view to show a state that a guide member holds a guide pipe and communication cables.

Furthermore, the guiding member P may have a form as shown in FIG. 47 which will be described later.

Conducting similar operations successively in other branch pipes 5, the branch optical fiber cables 22 and the branch tension member 27 are taken out from the branch pipe box 9 and the guide member P is inserted and secured in the opening of branch pipe 7.

Next, using a tension device 34 mounted in each manhole 2, 3 and consisting of, for example, a manual winch of a drum wind type paired with a hook, one end of the tension member 25 is fixed to the hook and tension is applied on the other end by means of the winch to lay the guide conduit 45 and each of the optical fiber cables 20, 21, 22 and the tension members 25, 26, 27 in the upper space of inside the main pipe 1.

Figure 34:
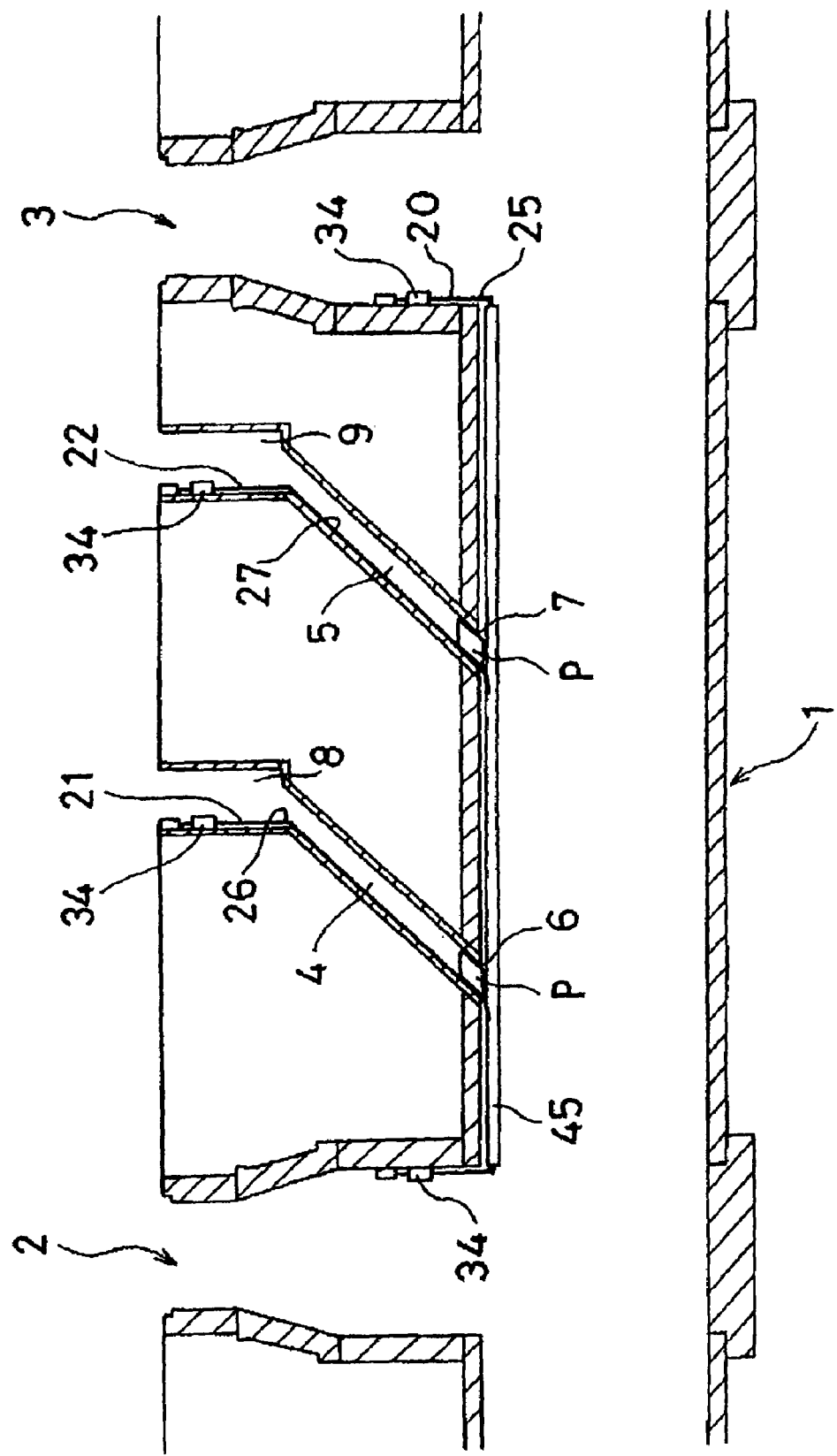
FIG. 34 is a general schematic view to show another embodiment of optical fiber cable laying structure according to the present invention.

When the branch pipe 4 is a straight pipe as shown in FIG. 34, it is possible to lay the branch optical fiber cables 21, 22 in the upper space of inside the branch pipes 4, 5 by tensioning the branch tension members 26, 27 with a tensioning mechanism 34 mounted in each branch pipe box 8, 9.

Figure 26:
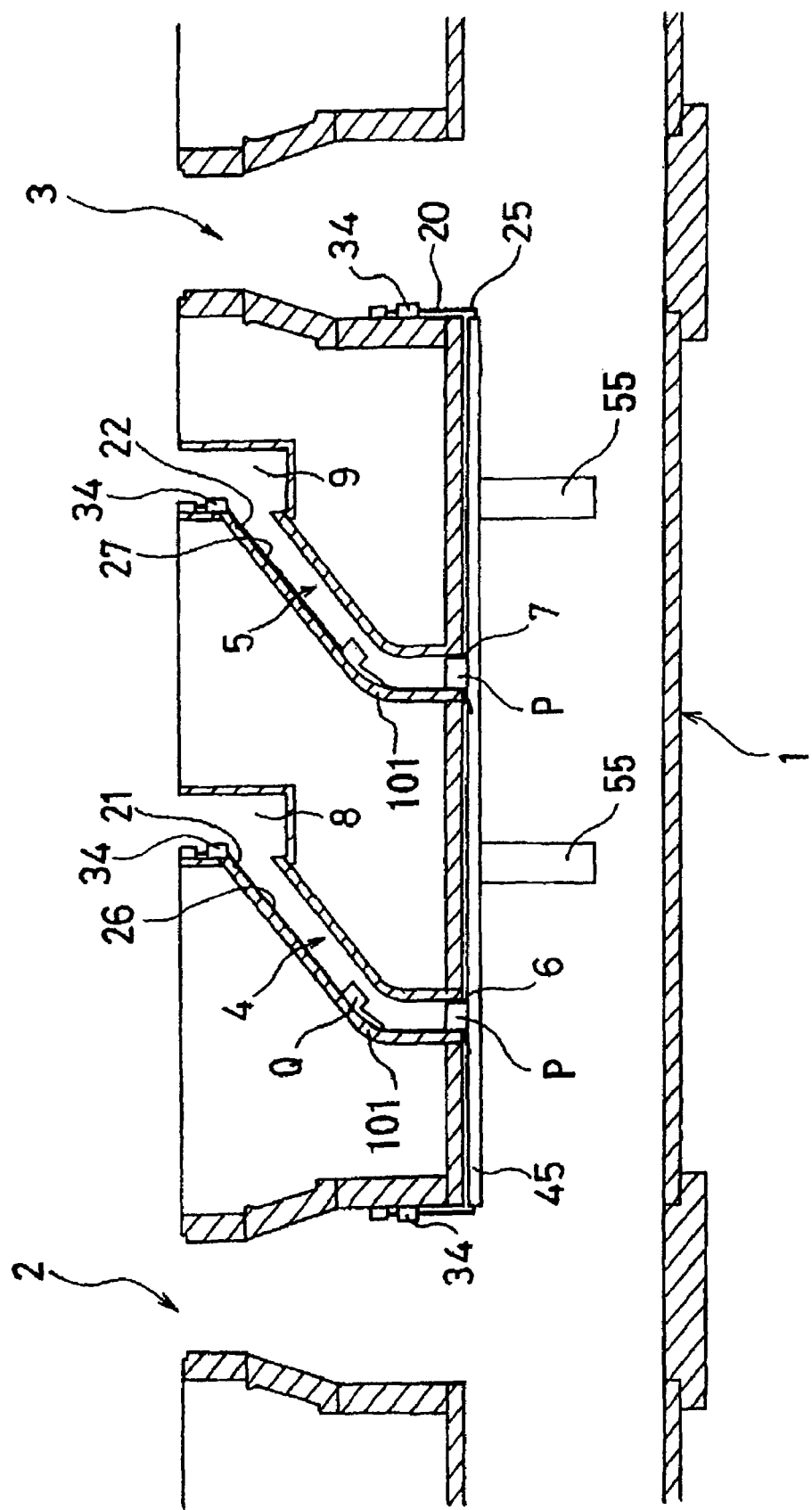
FIG. 26 is a general schematic view to show another embodiment of optical fiber cable laying structure according to the present invention.
Figure 30:
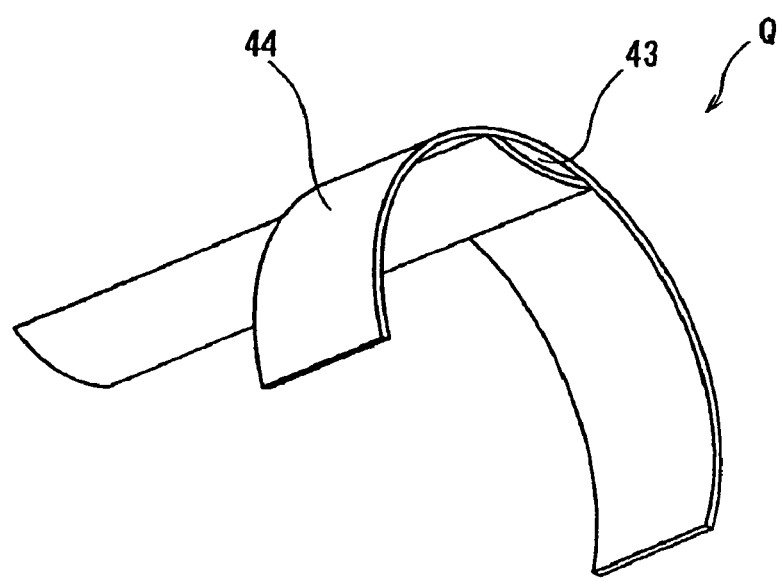
FIG. 30 shows an fixing member for fixing an optical fiber cable so that the optical fiber cable is laid in the upper part of the inner surface of the valley part of a pipe bend.

However, when the branch pipes 4, 5 include a pipe bend as shown in FIGS. 2 and 26, it is not possible to lay the optical fiber cables 21, 22 along the upper part of the inner surface of the valley part 101 which is a bent part of the bent branch pipes 4, 5 by merely tensioning the branch tension members 26, 26 with a tensioning mechanism 34 mounted in each branch pipe box 8, 9. Therefore, in this case, a fixing member Q as shown in FIG. 30, for example, is placed along the upper part of the inner surface of the valley part 101 of a pipe bend of each branch pipe 4, 5.

The method of disposition is such that the fixing member Q is moved close to the pipe bend with its arcuate fixing part 44 contracted in diameter while inserting the tension member 26 and the optical fiber cable 21, which has reached to the branch pipe box 8, into the slide part 43. As for the moving means, a method of attaching to the exterior of an air packer as described above or other specially designed apparatuses may be used. When the slide part 43 is placed in the upper part of the inner surface of the valley part 101 of the pipe bend, the diameter contraction of the arcuate fixing part 44 is released to fix it in the branch pipes 4, 5 as in the case with the guide member P.

Figure 29:
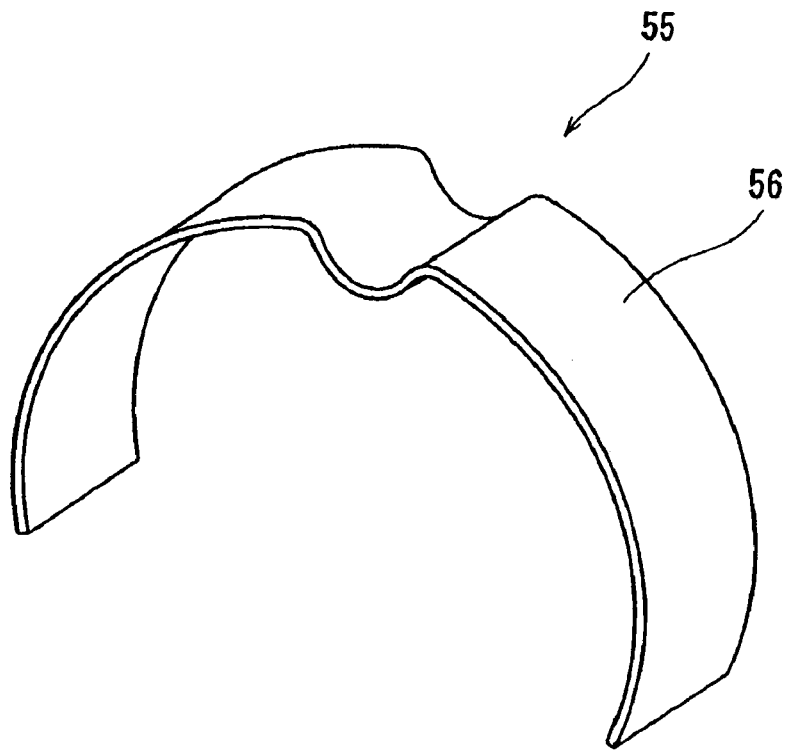
FIG. 29 shows an example of the slack prevention member.

When there is slack produced on the guide conduit 45 or the trunk tension member 25 within the main pipe 1, a slack prevention member 55 shown in FIG. 29 is placed within the main pipe 2 as shown in FIG. 26. The method for moving and fixing the slack prevention member 55 is similar to the cases of the fixing member Q and the guide member P, and the fixing is conducted by means of the arcuate fixing part 56.

Next, as another embodiment, a method for laying optical fiber cables in main pipes and branch pipes in the cases with smaller number of branch pipes will be described.

First, as in the case with the previous embodiment, the main pipe 1 and the branch pipes 4, 5 are surveyed with a TV camera and then pull members 10, 11, 12 are installed in each of the main pipe 1 and branch pipes 4, 5.

Then, one end of each pull member 10, 11, 12 is connected to the guide conduit 45, the tension member 26, and the tension member 27, and then, the other ends of the pull members 10, 11, 12 are taken up almost at the same time thereby inserting the optical fiber cables 20, 21, 22 and the tension members 25, 26, 27 from the manhole 2 to the manhole 3 and the branch pipe boxes 8, 9 and also placing the guide members P in the vicinity of the openings of branch pipe 6, 7 in the main pipe 1 by observing them with a TV camera. Subsequently, in a like manner, the guide member P is disposed at the openings of branch pipe 6, 7.

When the guide member P has been mounted in the openings of branch pipe 6, 7, tension is applied to the tension member 25 in the main pipe 1 using the tension device 34 installed in each manhole 2, 3 to dispose each member in the upper space of inside the main pipe 1.

Finally, when the branch pipes 4, 5 are a bent pipe as shown in FIG. 26, a fixing member Q is disposed in each valley part 101 as described. The placement of the fixing member Q can be conducted in advance during the preparation work. In that case, pull members 11, 21 are to be installed in the slide part.

For the material of the guide member P, the fixing member Q, and the slack prevention member 55, the same material as for the pipes, for example, hard vinyl chloride, high density polyethylene, or metal can be adopted. Particularly, for the material for the type of members of which arcuate or ring-shape fixing part is contracted in diameter and then expanded in diameter to press it against the inner wall of the pipe, it is preferable to use soft vinyl chloride, lower than medium density poly ethylene, or spring steel as a single material or in combination at least for the fixing part to give a resiliency to it.

Moreover, forming a tapered face which tapers off toward the outer surface in the end of an arcuate or ring-shape fixing part of each member makes it possible to prevent it from trapping flowing objects or from being displaced due to high pressure cleaning during a pipe diagnosis.

Next, as another embodiment, a laying method for the case in which there are some households for which laying communications cables such as optical fiber cables is not conducted will be described.

Figure 37:
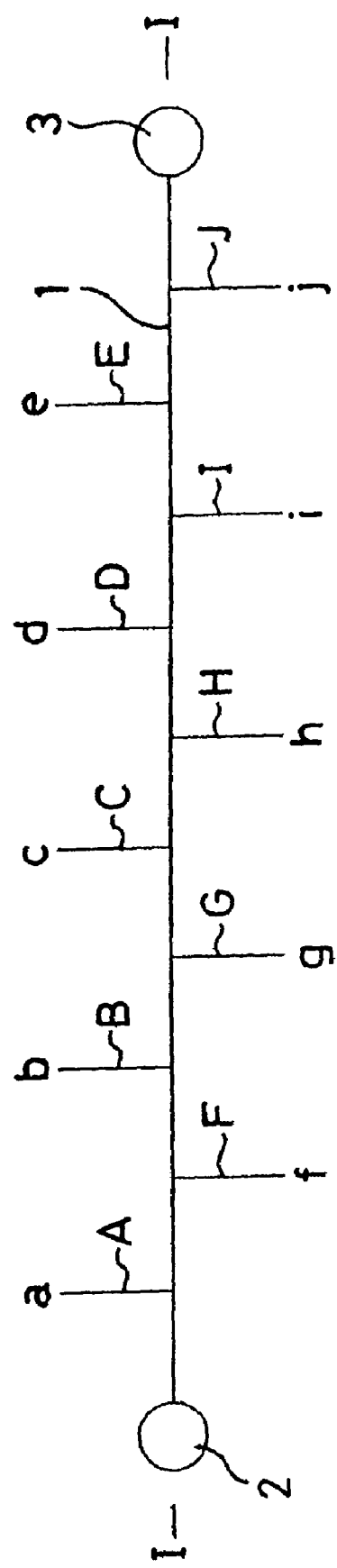
FIG. 37 is a diagrammatic view to show an example of a layout of the underground pipeline relating to another embodiment.

FIG. 37 shows an underground pipeline 1 provided between the manholes 2, 3 and for laying communication cables. The present invention is applicable in the case in which there are other manholes between the manholes 2, 3 and also in the case in which the manhole is a communications base. In FIG. 37, there are provided a plurality of branch pipes A, B, . . . J corresponding to each household a, b, . . . j between the manholes 2 and 3.

FIG. 1 shows a sectional view of FIG. 37 taken along I—I line. In FIG. 1, the numeral 1 denotes the main pipe of a sewerage pipe which is installed between a manhole 2 and another manhole 2. And from the upper space of inside the main 1, the branch pipes 4, 5 (corresponds to one of A to J in FIG. 37) branch off at the openings of branch pipe 6, 7, and each branch pipe 4, 5 is connected to a branch pipe box 8, 9 which is the branch pipe terminal for each household (corresponding to a, b, . . . j in FIG. 37).

Generally the main pipe 1 is laid along the road at a depth of several meters and formed with openings of branch pipe 6, 7 at its obliquely upper part as shown in FIG. 2, and the branch pipes 4, 5 ascend at a steep angle from the openings of branch pipe 6, 7 and then changes their directions near the earth's surface connecting to the branch pipe boxes 8, 9 at a gentle angle.

As shown in FIG. 37, in the underground pipe line of this embodiment, ten branch pipes A to J branch off from the main pipe 1 toward the households located upwardly at a, b, c, d, e and downwardly at f, g, h, i, j. And, in this embodiment, explanation is given assuming that the laying of the branch communication cable is conducted only for three households located at b, e, and j, and no communications cables are laid for the other households located at a, c, d, f, g, h, and i.

First, the inside of the main pipe 1 is surveyed with a TV camera or the like to measure the distance between the manholes 2 and 3, the distances from the manhole 2 to each opening of branch pipe 6, 7 of the branch pipes 4, 5, the distances from the branch pipes 4, 5 to the branch pipe boxes 8, 9, the depths of the branch pipe boxes 8, 9, and so forth (see FIG. 1). After conducting the above described survey, guide pipes to accommodate the communication cables are prepared.

Here, in this embodiment, for the households a, c, d, f, g, h, i for which branch communication cables are not to be installed, a lead string formed of a plastic tube or a rope-like body to be described later is laid as far as the vicinity of each opening of branch pipe of the main pipe 1 or each branch pipe box.

Figure 38:
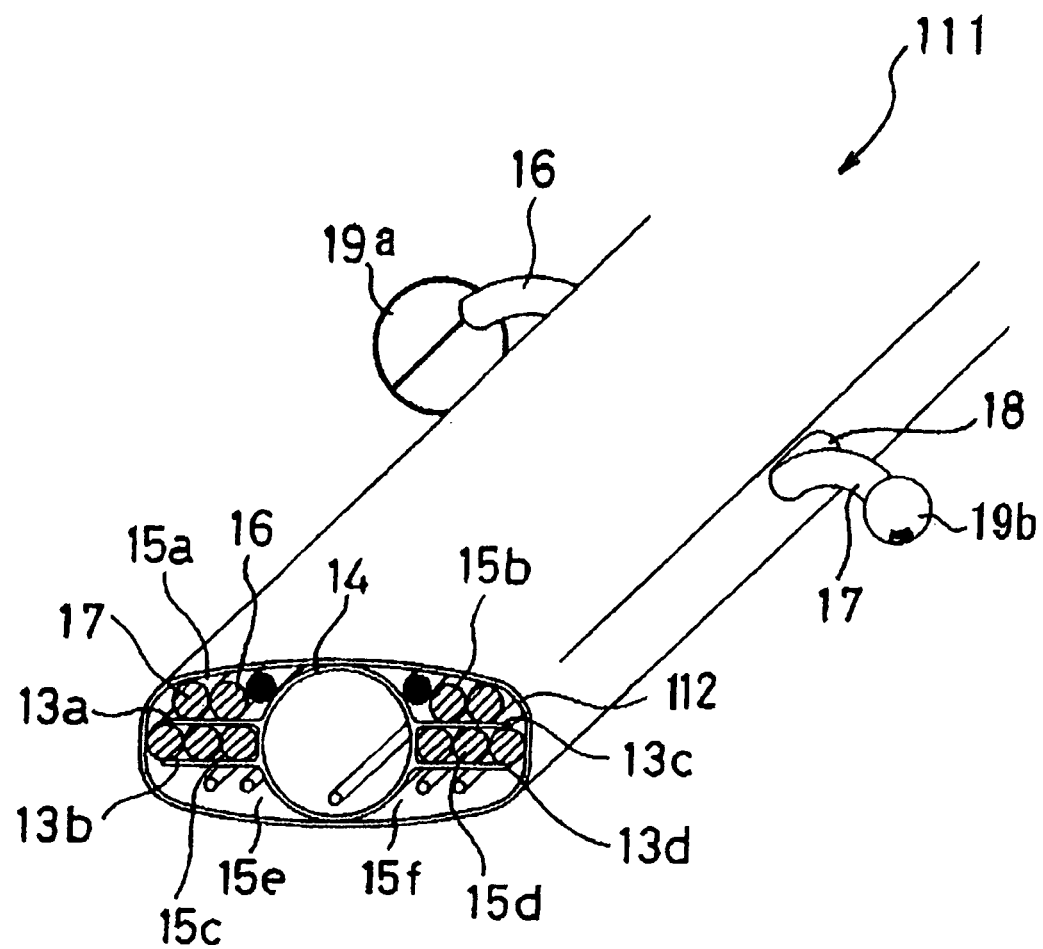
FIG. 38 is a perspective sectional view of a guide pipe or another embodiment for communication cable laying relating to the present invention.

An example of the guide conduit 111 used in this embodiment is shown in FIG. 38. The shape of the guide pipe shown in FIG. 38 is preferable particularly for this embodiment. The guide conduit 111 is preferably made of plastics such as polyethylene from the view point of lightness and chemical resistance, but other materials also can be selected depending on the kinds of the underground pipeline.

The guide conduit 111 has a dual pipe structure consisting of an outer pipe 112 and an inner pipe 14 having a partition plate 13 extending from side to side as shown in FIG. 38. The inside of the inner pipe 14 provides passages for the trunk communication cable 128 (equivalent to 20) or a lead string 123 for trunk cable. On both sides of the outer periphery of the inner pipe 14, there are provided two partition plates 13a, 13b, 13c, 13d extending from side to side vertically dividing the space between the inner pipe and the outer pipe. The outer pipe 112 is a hollow pipe having a substantially oval cross section so that a plurality of branch communication cables 16 (equivalent to 21, 22) or branch lead strings 17 are disposed in parallel.

The six spaces 15a, 15b, 15c, 15d, 15e, 15f provide the passage for the branch communication cable 16 or the branch lead string 17. The branch communication cable 16 corresponds to the previously described optical fiber cables 21, 22 and may be accompanied by the tension members 26, 27 as described. Moreover, it is preferable to use a branch communication cable 16 and a branch lead string 17 of substantially the same diameter. By this configuration, possible misregistration between adjacent branch communication cables is inhibited when the branch lead string 17 is replaced with a branch communication cable 16. Also, since no excessive force is applied when drawing in a branch communication cable 16, it is possible to prevent breakage of the branch communication cables 16.

As an example of the branch communication cable 16, a cable with a diameter of about 5 mm in which a four-core communication wire is inserted in a stainless pipe and whose outer surface is coated with polyethylene is preferably used in this embodiment. Also as the branch lead string 17, a urethane tube or string with an outer diameter substantially same as that of the branch communication cable 16 is preferably used. In this embodiment, the method of connecting the branch communication cable 16 and the branch lead string 17 can be provided by crimping the abutted ends with a metal ring, or when both of the coatings of the communication cable 16 and the branch lead string 17 are made of plastics and the branch lead string has a tubular structure, the connection may be formed by forming a splice by inserting a certain length of the branch communication cable into the branch lead string and then bonding that part by use of a thermo-compression bonding or an induced electricity bonding, thus melting and crushing the plastic of the splice from outer surface to make a step-free shape. The branch communication cable 16 may be a two-core type or other types other than the four-core type cable.

The height of each passage 15 for the branch communication cable 16 and the branch lead string 17, which is partitioned by a partition plate 13 of the space 15 between the outer pipe 112 and the inner pipe 14 of the guide conduit 111, is configured to be lower than twice of the outer diameter of the branch communication cable 16. Adopting such dimensions will inhibit intersections overpassing adjacent branch communication cables, when inserting the branch communication cable 16 or the branch lead string 17 whose diameter is approximately same as that of the branch communication cable 16 into the guide conduit 111, and therefore the branch communication cables will be free from breaking due to excess tensioning by an cable entanglement within the guide pipe or excess bending exceeding the allowable bending radius. Also the structure which accommodate a plurality of the branch communication cables 16 in parallel in the lateral direction allows to suppress their height when inserted in the main pipe, and therefore when there is an open space in the upper space of inside the pipe as in the case with sewerage pipes and storm drain pipes, cables can be laid in that space without hindering the normal functions of the underground pipes.

As shown in FIG. 38, in a state that the guide conduit 111 is being drawn into the main pipe 1, the guide conduit 111 is formed with an opening part hole 18 (equivalent to the opening part 46) for drawing out the branch communication cable 16 and the branch lead string 17 from the guide conduit 111 at a position about 1 meter from each opening of branch pipe 6, 7. This opening part 18 opens on each side of the guide conduit 111 in the position (within a range about one meter ahead or behind) at the distance corresponding to the length measured from the manhole 2 to each opening of branch pipe from the one end of the guide conduit 111. The opening part 18 is preferably formed in advance at a factory or the like based on the survey in the underground pipelines.

Upon taking out of a branch communication cable 16 and/or a branch lead string 17 from an opening part 18, if the distance from one end of the main pipe 1 connecting to the manhole 2 to the opening of branch pipe of the branch pipe A is 1 m, for example, then the opening part 18 is also opened at the position 1 m form one end of the guide conduit 111, and from this opening part 18, the branch communication cable 16 and the branch lead string 17 are taken out. In this occasion, it is preferable to avoid placing the opening part 18 directly beneath an opening of branch pipe, since the fluid from the branch pipe may flow into the opening part 18.

The branch communication cable 16 and/or branch lead string 17, which has been taken out of an opening part 18, has a member 19a, 19b non-detachably attached to its tip and called a lead tug used for taking out the branch communication cables from the inside of the guide pipes. The shape of these lead tugs 19a, 19b can be various shapes such as a hook-shape and a ring-shape, but it is necessary to configure that the outer diameter of the lead tugs are larger than the size of the opening part 18 so that a leading end of the branch communication cable 16 taken out from the guide conduit 111 will not return into the guide conduit 111. In FIG. 38, the lead tug 19a is a sphere of about 100 mm diameter braided with about 1 mm thick wire into a hand ball shape. Also the lead tug 19b is a plastic ball of about 20 mm diameter, for example like a ping-pong ball. Of course it may be arranged such that one end of the communication cable 16 is formed into a shape through which it can be hooked or grasped directly.

When the lead tug 19b is being connected to the branch communication cable 16, the branch communication cable 16 is preferably being pulled out to some length from the guide conduit 111 to make it easy to hook or grasp it from the openings of branch pipe 6, 7. When the lead tug 19b is being connected to the branch lead string 17, since the position of the lead tug 19b is left intact until when the insertion of a branch communication cable 16 is needed, the position of the lead tug 19b is preferably drawn up close to the opening part 18 so that it will not go out of the guide conduit 111 and therefore will not hinder the flow within the underground pipeline.

Furthermore in this embodiment, as described below, the places for inserting branch communication cables 16 and branch lead strings 17 in a guide conduit 111 are disposed according to an orderly insertion rule correlating to the state of forming the branch pipes A to J which extend to each household locating at a, b, . . . , j from the main pipe 1 in order to prevent entanglements between branch communication cables 16, between branch lead strings 17, or between a branch communication cable 16 and a branch lead string 17 within the guide conduit 111.

Figure 39B:
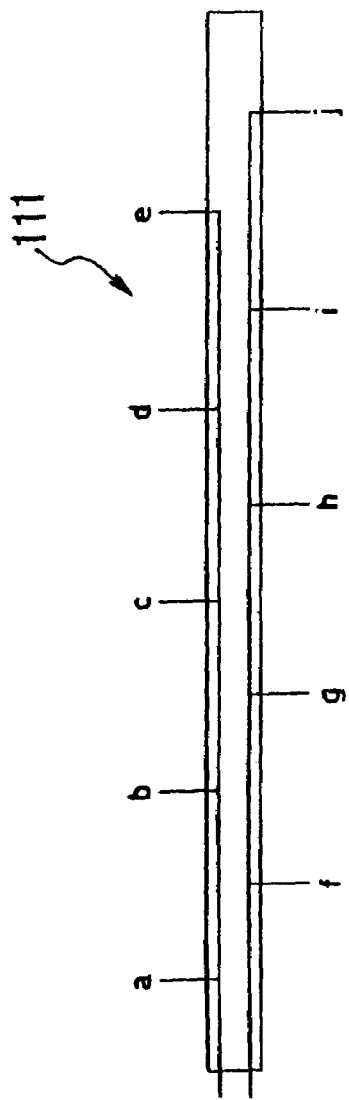
FIG. 39 is a schematic view to show an example of the method for laying a communication cable in a guide pipe; (a) is a sectional view and (b) is a top view.
Figure 39A:
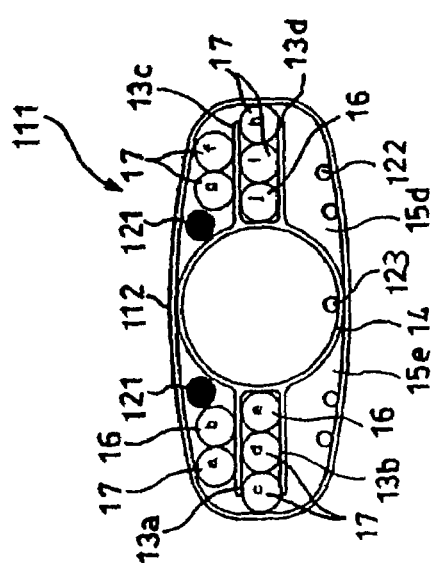

In FIG. 39(a), branch communication cables 16 and/or branch lead strings marked by a to j are inserted in the guide conduit 111. FIG. 39(b) show its top view. The state of insertion of branch communication cables and the like in a guide conduit 111 is the same as that of the piping configuration of the underground pipeline shown in FIG. 37. Specifically, the number of branch pipes are ten, A to J, in the main pipe 1 of the underground pipeline FIG. 37, and when branch communication cables are laid for only three of the households at b, e, and j, that is, when branch communication cables 16 are laid in the branch pipes 4, 5, the branch communication cables 16 are inserted into the position corresponding to b, e, j in the guide conduit 111 and branch lead strings 17 are inserted in other positions a, c, d, f, g, h, i. And at the positions corresponding to each opening of branch pipe as shown in FIG. 39(b), the branch communication cables 16 and the branch lead strings 17 are taken out and formed with a lead tug 19a, 19b respectively in their leading end.

In the figure, the black filled-in portions indicate the trunk tension members 121 (equivalent to 25), and thin lead strings 122 such as a wire, a fishing line, and a monofilament yarn with a diameter of 1 to 2 mm and a trunk lead string 123 are installed in the lowest spaces 15e, 15d partitioned by the inner pipe 14 and partition plates 13 in the guide conduit 111. These trunk tension members 121 and the thin lead string 122, and the trunk lead string 123 are installed over the total length of the guide conduit 111. Moreover, in FIG. 39(b), the lead tugs 19a, 19b, the trunk tension members 121, the thin lead string 122, and others are omitted. The trunk tension member 121 may be formed using a long stock such as a rope, a string, a belt made of high-strength low-elongation fibers such as poly-para-phenylene-benzo-bis-oxazole (POB) fibers, aramid fibers, carbon fibers, metal fibers, glass fibers, or a stainless wire.

Thus, the orderly insertion rule within the guide pipe is configured such that the branch communication cables and others are disposed side by side within the guide conduit 111, and the branch communication cable 16 and/or the branch lead string 17 (a in FIG. 39) which positions at extreme outside are inserted in the branch pipe (A in FIG. 37) which locates closest to the manhole 2 (see FIG. 1), and then the branch communication cable 16 (b in FIG. 39) which locates next to the extreme outside position is inserted in a next connecting branch pipe successively toward the inside of the main pipe.

The role of the trunk lead string 123 is to insert the trunk communication cable 128 (equivalent to 20) in the inner pipe 14. Normally a trunk communication cable is very rigid because of its large diameter. Therefore, if it is inserted in a guide pipe in advance, it is difficult to take up on a reel drum, and there arises a need to increase the core diameter of the reel drum. For this reason, the insertion operation is likely to be conducted on site. On the other hand, the thin lead strings 122 in the lowest space 15e, 15d play a role of a lead string to insert the cables into new branch pipes when new houses are built and the new branch pipes are connected to the main pipe in the future. In this case, when branch pipes are newly installed, opening parts 18 are opened in the guide conduit 111 at positions corresponding to the openings of branch pipe 6, 7 (see FIG. 1) and the thin lead strings 122 are pulled out to replace them with branch communication cables 16 and/or the branch lead strings 17.

There will be no problem in inserting the branch lead string 17, whose diameter is the same as that of the branch communication cable, in place of the thin lead string 122. Also, when conducting the replacement of a thin lead string 122 with a branch communication cable 16, a pull member which has a intermediate diameter between the outer diameters of the thin lead string and the branch communication cable may be used instead of connecting them directly to facilitate the transfer of the take-up force.

Next the method of laying the guide pipes 111 in which the branch communication cables are inserted in the underground pipe will be described.

A guide conduit 111, into which the branch communication cables 16 are inserted, is wound upon a reel drum and transported to the worksite. As shown in FIG. 1, at the worksite, the guide pipe is disposed in the main pipe 1 by taking up the pull member from the other manhole 3 after connecting a pull member installed between the manholes 2 and 3 in advance and one end of the guide conduit 111 atone end of the main pipe 1, for example, at the manhole 2. The methods of inserting the pull member 10 between the two manholes 2, 3 include a method of forcing a rigid body such as a wire into a pipe, a method of flying a parachute-like laying tool by air pressure, and a method of connecting to a self-moving vehicle in the pipe, and all these known methods can be adopted as needed. When there are no manholes in the section of a pipeline to lay the communication cables, pits are dug to use them as a manhole. When taking up the guide conduit 111 from one manhole 2 to the other manhole 3, a twist prevention device such as a swivel may be interposed between the pull member and the guide conduit 111 to prevent the guide pipe from being twisted.

After placing the whole length of the guide pipe inside the main pipe 1, the twist prevention device is removed. In this stage, each of the opening parts formed on the guide pipes corresponds to a respective opening of branch pipe. Then, the branch communication cables and/or the branch lead strings are laid in the branch pipes A to J. At this time, by inserting a pull member 11, 12 from each branch pipe A to J, for example, to the manhole 2 in advance, it is possible to lay the branch communication cable 16 and the branch lead string 17 by connecting with the pull member 11, 12 when inserting the guide conduit 111. Also an arm-type gripping jig or the like may be inserted from the inside of each branch pipe A to J to grip the lead tugs 19a, 19b formed on one end of the branch communication cable 16 and the branch lead string 17 which locate near the openings of branch pipe 6, 7 thereby draw them out to each of the branch pipe boxes 8, 9. In this case, laying operation of the branch communication cables and others may be assisted by making fine adjustment of the position of the guide pipe to and fro in the main pipe.

Figure 40:
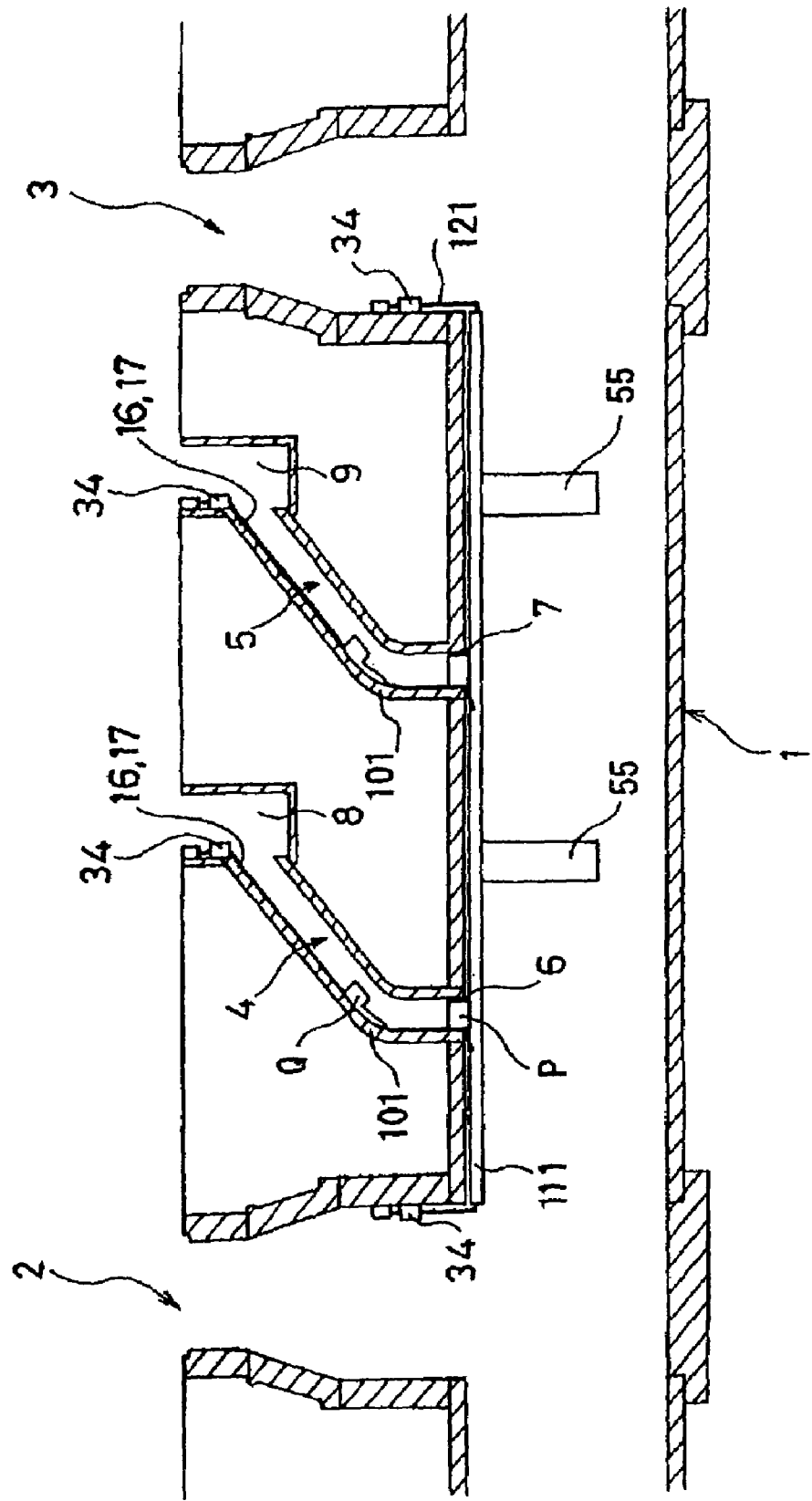
FIG. 40 a sectional view to show a state that guide pipes and communication cables are laid in an underground pipeline.

In this embodiment, in a pipeline in which sewage and the like flows in the lower part of the main pipe 1, especially in an underground pipeline such as a sewer pipeline and a storm drain pipeline, the guide conduit 111 is preferably placed in the upper space of inside the main pipe 1 as shown in FIG. 40 and the branch pipe so that the normal function of the underground pipeline is not impaired.

The fixing method in the upper space of inside the main pipe 1 and the branch pipe is preferably achieved by using, for example, a guide member P as shown in FIG. 28 for each branch pipe A to J. The guide member P has substantially the same diameter with the inner diameter of the branch pipes 4, 5 and is comprised of a tubular insertion part 104 with a cross section larger than a half circle, a trunk slide part 102 for slidably supporting the guide conduit 111 laid in the main pipe 1 and projecting downwardly from the tubular insertion part 104, and a branch slide part 103 provided in the tubular insertion part 104 and for slidably holding the branch communication cables 16 and the branch lead strings 17 laid in the branch pipes 4, 5.

When using the guide member P, the lead tug 19a, 19b are passed through the branch slide part 103 when pulling them to the branch pipe boxes 8, 9. In this case, before forming the lead tug at factory or at other places, the branch communication cable 16 or the branch lead string 17 is preferably passed through the branch slide part 103 to form lead tugs 19a, 19b. By doing this, operational efficiency at worksite will be improved. In a practical work procedure, first a TV camera is inserted from the branch pipe boxes 8, 9 to confirm whether a guide member P is located at each opening of branch pipe 6, 7.

When each guide member P is moved within the main pipe 1, if there are possibility that the guide member P may be damaged from friction against the inner surface of the pipe or may be trapped by steps in the pipeline, it is preferable to place it on board a cart or simple boat which can move in the main pipe 1 and draw it in with the pull member simultaneously.

Next, an arm-type grasping jig is inserted from the branch pipe box 8 and the lead tugs 19a, 19b are grasped and taken out from the branch pipe box 8 while observing with a TV camera. At this time, the position of the lead tugs 19a, 19b are finely adjusted for easy grasping by moving the guide conduit 111 in the main pipe 1.

Then the branch communication cable 16 or the branch lead sting 17 are taken up at the branch pipe box 8 and the leading edge of the guide member P is inserted into the opening of branch pipe 6. In the case in which the orientation of the leading end of the guide member P is unchanged when taking up the branch communication cable 16 or the branch lead string, preferably an air packer shown in FIG. 33 or the like is inserted into the opening of branch pipe 6 from the branch pipe box 8 in a contracted state and further inserted into the inner surface of the guide member P to be expanded, and the air supply part is taken up to change the orientation of the leading end of the guide member P toward the branch pipe 4. To fix the guide member P to the opening of branch pipe 6, an adhesive or a glue may be applied in advance on the outer surface of the tubular insertion part 104 of the guide member P to fix them through contact with the inner surface of the branch pipe 4, or a resilient member such as a rubber and a sponge is placed on the outer surface of the tubular insertion part 104 or a taped surface with its diameter decreasing to the front end is formed to fix them by contact bonding through friction.

It is also possible to use guide members P having shapes as shown in FIGS. 35, 47. When using this type of the guide member P, the arcuate fixing part 41, 241 is contracted in diameter with a thin lead string and the like, and then inserted into the branch pipe 4 and after that, the thin lead string is cut to release the diameter contraction and the diameter of the arcuate fixing part 41, 241 is expanded thereby fixing them in the branch pipe 4. Also, in this case, as in the case with the guide member P having a shape as described in FIG. 28, the fixing may be carried out by applying an adhesive or glue such as rubber or sponge beforehand to the outer surface of the arcuate fixing part 41, 241 and fixing it through contact with the inner surface of the branch pipe 4, or by applying a resilient body such as a rubber and a sponge in advance, or forming a tapered face 42 of which diameter tapers off to the front, and fixing it by contact bonding through friction. Furthermore, it may be arranged such that a spike 242 projects through the pipe wall.

Conducting similar operations successively in other branch pipes 5, the branch optical fiber cables 16 or the branch lead strings 17 are taken out form the branch pipe box 9 to insert and secure the guide member P in the opening of branch pipe 7.

Next, using a tension device 34, mounted in each manhole 2, 3 and consisting of, for example, a manual winch of drum wind type paired with a hook, one end of the tension member 121 is fixed to the hook and tension is applied on the other end by means of the winch to lay the guide conduit 111 and each of the optical fiber cables 20, 21, 22 and the tension members 25, 26, 27 in the upper space of inside the main pipe 1.

When the branch pipe 4 is a straight pipe, it possible to lay the branch optical fiber cables 16 or the branch lead strings 17 in the upper space of inside the branch pipes 4, 5 by the tensioning through the tensioning mechanism 34 mounted in each branch pipe box 8, 9.

However, when the branch pipes 4, 5 include a pipe bend as shown in FIG. 40, it is not possible to lay the branch optical fiber cables 16 or the branch lead strings 17 along the upper part of the inner surface of the valley part 101 of the pipe bend of the branch pipes 4, 5 by merely applying tension by means of the tensioning mechanism 34 mounted in the branch pipe boxes 8, 9. Therefore, in this case, a fixing member Q as shown in FIG. 30, for example, is placed along the upper part of the inner surface of the valley part 101 in a pipe bend of each branch pipe 4, 5.

The method of disposition is such that the fixing member Q is moved to near the pipe bend with its arcuate fixing part 44 contracted in diameter while inserting the branch communication cable 16 or the branch lead string 17, which has reached the branch pipe box 8, into the slide part 43 of the fixing member Q. As for the moving means, a method of attaching to the exterior of an air packer as described above or other dedicated apparatuses may be used. When the slide part 43 is placed in the upper part of the inner surface of the valley part 101 of the pipe bend, the arcuate fixing part 44 is fixed in the branch pipes 4, 5 as in the case with the guide member P.

As described above, the guide member 111, the branch communication cables 16, and the branch lead strings 17 can be laid in the upper space of inside the main pipe 1 and each of the branch pipes A to J. This procedure may be conducted either before or after the laying of the branch communication cables, and may also be conducted in a state that the guide pipe is nearly suspended in the air by temporal tension applied on the trunk tension member when laying the branch communication cables and others.

Figure 41:
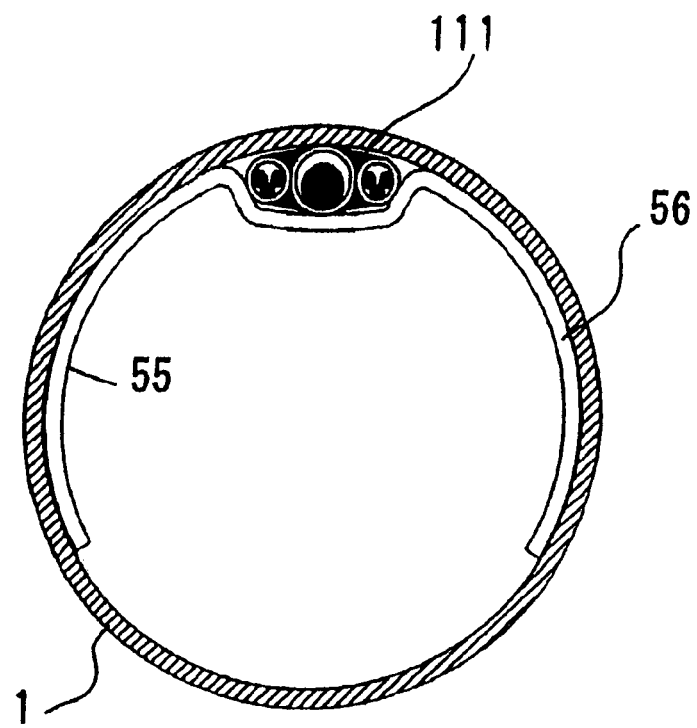
FIG. 41 shows a state that a guide pipe is disposed in the upper space of inside the guide pipe.

Also, instead of the method of applying tension with the above described tension device 34 and the like, multiple slack prevention members 55 shown in FIG. 29 may be disposed in the main pipe 1 as shown in FIG. 41 to support the guide conduit 111. The relocation and fixation of the slack prevention member 55 are conducted as in the case with the fixing member Q and the guide member P and the fixation is conducted with the arcuate fixing part 56.

Figure 42:
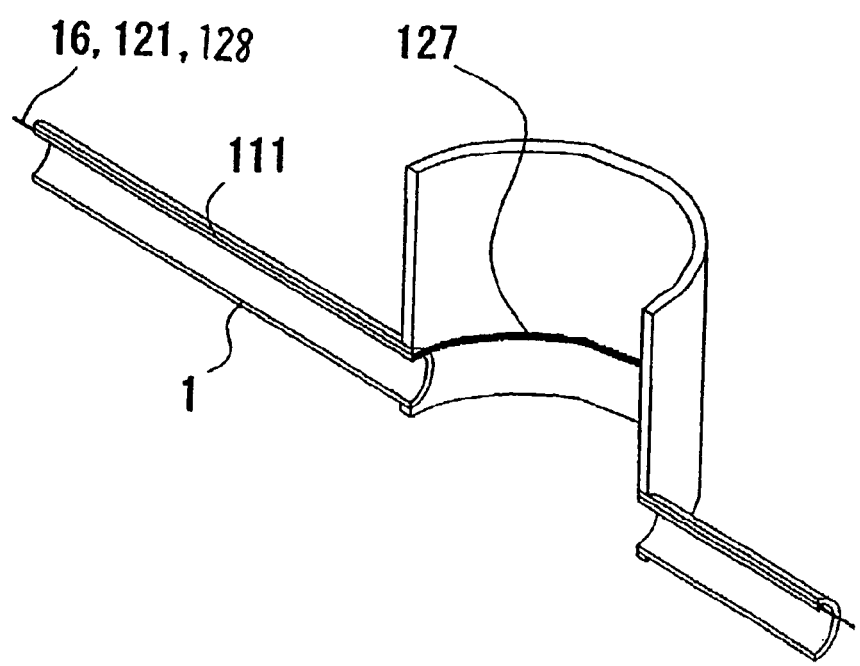
FIG. 42 is a perspective view to show an embodiment of a guide pipe connecting to be used when laying guide pipes skipping some manholes.
Figure 44A:
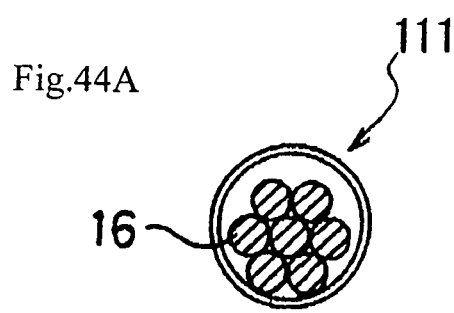
FIG. 44 is a sectional view to show a guide pipe or another embodiment.
Figure 44B:
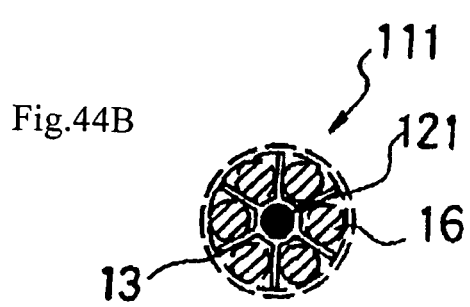
Figure 44C:
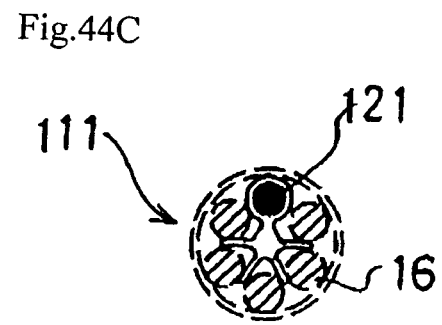
Figure 44D:
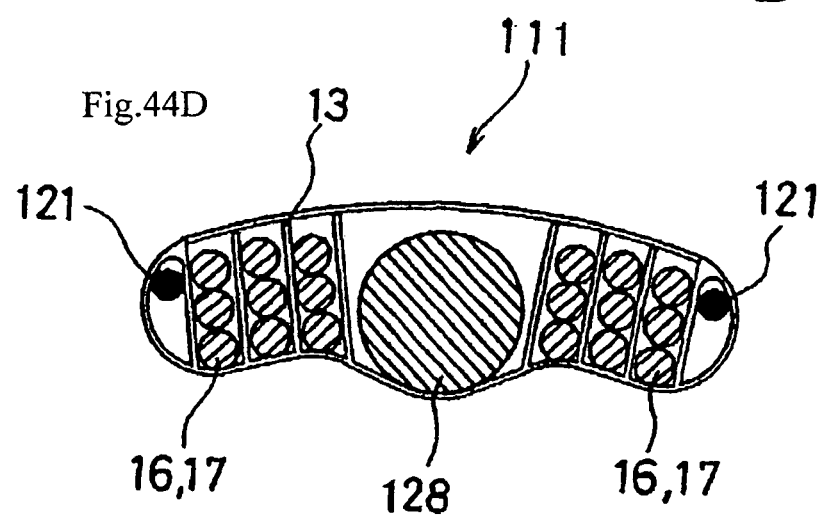
Figure 45A:
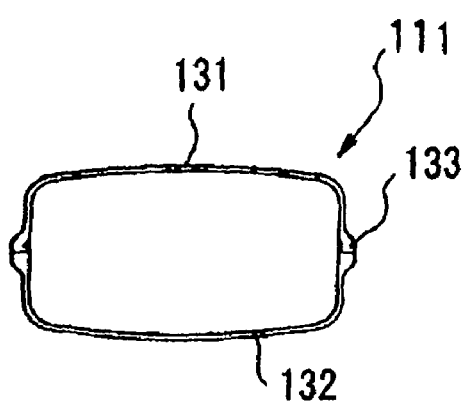
FIG. 45 is a schematic view to explain the method of inserting communication cables or others into guide pipes.
Figure 45B:
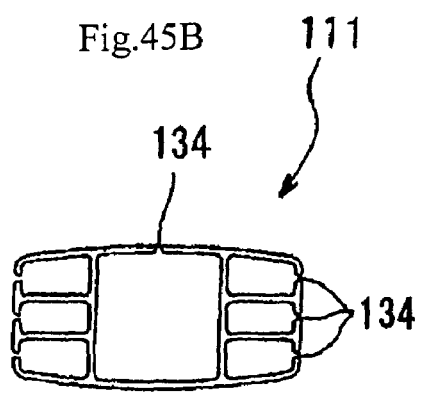
Figure 45C:
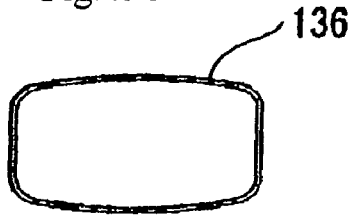
Figure 45D:
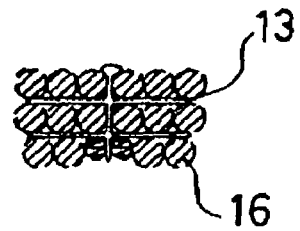

When installing the guide conduit 111 skipping several manholes during laying operation, it is preferable to avoid the positions in the extension of the main pipe 1 by connecting the guide pipe with a guide conduit connection member 127 which is curved (or bent in the case of a rectangular hole) along the inner side wall of the manhole as shown in FIG. 42. The guide conduit connection member 127 may be a half-cut pipe which allows to remove the guide conduit 111 within the manhole making the communication cables 16, 128 and the trunk tension member 121 skirt around along the side wall of the manhole by means of a pipe saddle and the like.

As so far described, it is made possible to install the branch communication cable 16 in the branch pipes B, E, J connecting with the households b, e, j, which want the laying of the communication cable on the current occasion of installing the guide conduit 111 in the main pipe 1, and to install the branch lead string 17 for the other households a, c, d, f, g, h, i which do not want the laying of the communication cable during the current laying operation. When some of the households a, c, d, f, g, h, i have the desire to install the communication cable in the future, it is possible to install a branch communication cable 16 by replacing it with a branch lead string 17 which has been laid as far as each opening of branch pipe of the branch pipes A, C, D, F, G, H, I or the branch pipe box which is the end of the branch pipe.

When installing the branch communication cable 16 as a replacement, an end of the branch communication cable 16 is connected to one end of the branch lead string 17 which is laid in the branch pipe on the side of the manhole 2 corresponding to the household which want to newly install a branch communication cable 16. After connecting the branch communication cable 16 with the branch lead string 17 on the side of the manhole 2, it is possible to draw in the branch communication cable 16 into the guide conduit 111 thereby installing it in the branch pipe by pulling the branch lead string 17 from the branch pipe side.

Further, when new branch pipes are installed, it is also possible to cope with that by connecting the branch communication cable 16 with an end of a thin lead string 122 contained in the guide conduit 111 or an end of a branch lead string 17 contained as reserve and thereby replacing the thin lead string 122 or the branch lead string 17 with the branch communication cable 16.

As so far described, it is made possible to lay the branch communication cable 16 with ease and convenience upon a need of laying of the branch communication cable 16. Thus laying of communication cables is realized at workability and a cost comparable to aerial laying. Moreover, it becomes possible to realize laying of communication cables in which the normal function of the underground piping will not be compromised, and there will be no negative effect on the maintenance work of the underground piping, and also the communication cables will not be damaged by the normal use or maintenance work of the underground piping.

However, the guide pipe for use in communication cable laying in underground pipelines according to the present invention is not limited to the above described embodiments and may have structures shown in FIG. 43 to FIG. 45.

The guide pipe in FIG. 43(*a*) shows a pipe which has an enough width for accepting a plurality of branch communication cables 16 and its height is smaller than the twice of the outer diameter of the branch communication cables 16. Adopting such dimensions assures that the branch communication cable 16 will not intersect with adjacent branch communication cables overpassing them when a branch communication cable 16 or a branch lead string having the same diameter as that of the branch communication cable is inserted into the guide conduit 111, and therefore the branch communication cable 16 will neither undergo excessive tension due to entanglement nor will break by being bent exceeding its allowable bending radius. Also the structure which accommodate a plurality of branch communication cables 16 in parallel in the lateral direction allows to minimize the height of the guide pipe when inserted in the main pipe, and therefore when there is an open space in the upper space of inside the pipe as in the case with a sewage pipe and a storm drain pipe, cables can be laid in that space without impairing the normal function of the underground piping. In FIG. 43(*b*), the guide conduit 111 is provided in its interior with partition plates which provide vertical divisions and the height of the interior is same as that of FIG. 43(*a*). In FIG. 43(*c*), the guide conduit 111 of FIG. 43(*b*) is provided nearly in its middle part with a partition plate 13 which provides horizontal divisions. FIG. 34(*d*) shows the same structure as in FIG. 34(*c*), but the inner partition plates 13 are separate parts and fitted into the outer pipe of the guide conduit 111. In FIG. 43(*e*), the guide conduit 111 of FIG. 43(*c*) is provided nearly in its middle part with an inner pipe 14 for containing the trunk communication cable 128 (or trunk lead string 123) for the main pipe 1. The trunk communication cable 128 corresponds to the above described trunk optical fiber cable 20, but it may be accompanied by trunk tension member 25 as described above.

FIG. 44(*a*) shows a simple pipe form in which communication cables are inserted in allowable numbers. Also in FIG. 44(*b*), the guide conduit 111 of FIG. 44(*a*) is provided with partition plates as separate parts for dividing the passage of the communication cable 16. In the middle section, wires for installing the guide conduit 111 in the upper space of inside the main pipe 1 and the trunk tension members 121 (solid part) formed of high-strength low-elongation fibers are inserted. Similarly, in FIG. 44(*c*), the space for the trunk tension member 121 is formed in the upper part of the partition plate 13. In FIG. 44(*d*), the branch communication cables and others are separated by horizontally dividing partition plates 13 and the trunk communication cable 128 is accommodated in the middle. And on both sides, spaces for inserting the trunk tension members 121 are provided. Moreover, the upper part consists of a cover, which is integrally formed by fitting, to accommodate the branch communication cables 16 in the guide conduit 111.

The methods for inserting the branch communication cables 16 or the branch lead strings 17 into such guide pipes 111 include a method in which necessary number of thin string type pull members are inserted in the guide conduit 111 in advance and with which the branch communication cables 16 and/or the branch lead strings are combined and pulled in, and a method in which the guide conduit 111 is provided with a special feature for inserting cables as shown in FIG. 45(*a*). To be more specific, as shown in FIG. 45(*a*), the guide conduit 111 is divided into an upper part 131 and a lower part 132, and convexo-concave parts 133 are provided on the contact surface of the divided parts for fitting. Therefore, the branch communication cable 16 and others are inserted in a state in which the upper part 131 is detached. As the shape of the dividing pieces 131, 132, a cover type shown in FIG. 44(*d*) may also be adopted. Also as shown in FIG. 45(*b*), a cut 134 may be formed on the outer periphery of each space formed by partition plates. Through this notch 134, the branch communication cables 16 and installation pull members are inserted. It is also possible to fit a rail-like I-shaped member (not shown) into the notch 134 after the cable insertion.

This configuration is preferable especially for a cut on the upper surface, since the intrusion and build-up of dew drops in the underground pipeline or fluids from branch pipes are prevented. FIGS. 45(*c*) and (*d*) show an example of cable insertion method when the partition plate 13 is separated, in which the branch communication cables 16 are placed in advance on the partition plate 13 as shown in FIG. 45(*d*) and secured with a tape-like member at an appropriate interval, and they are inserted into the pipe 136 shown in FIG. 45(*c*). Also when using the trunk tension members 121, they may be placed in any place in the guide conduit 111 as described so far, but it is preferable to insert them in parallel in the height direction for the sake of the parallelism of the guide pipe. There is no limitation on the number of cables, an appropriate number can be determined depending on the installation length and the total weight of the guide pipe. Moreover, the trunk tension member 121 may be integrally formed with the guide conduit 111, and also may be integrally formed with the partition plate as shown in FIG. 44(*b*), (*c*).

Figure 46B:
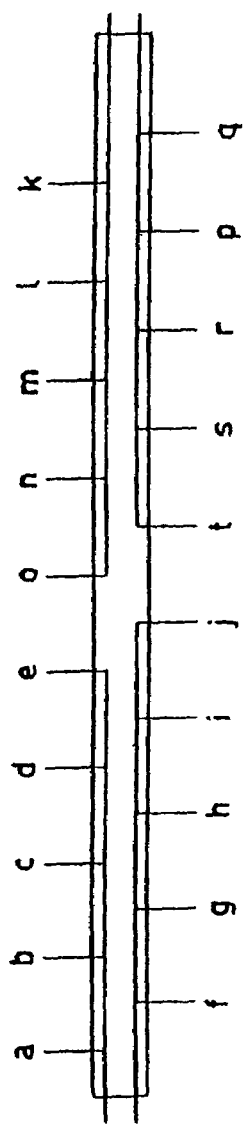
FIG. 46 is a schematic view to show an embodiment of the cable arrangement such as communication cables in the guide pipe in a case in which the distances between manholes are large.
Figure 46A:
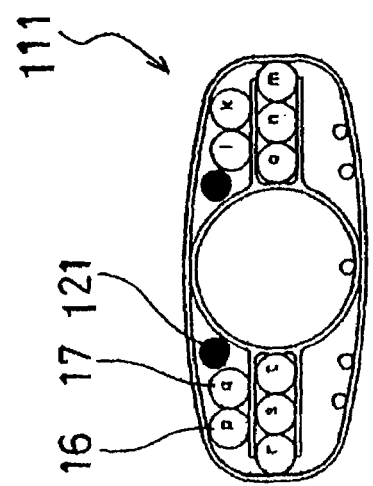

In the above described example of the embodiments relating to the present invention, explanation has been made about a state in which the branch communication cables 16 and others are inserted from one end of the guide conduit 111, but it is also possible to insert the branch communication cables 16 from both ends of the guide conduit 111, for example, when the distance between the manholes is large as shown in FIG. 46 or the branch communication cables 16 and the like are laid in the area crowded with residences.

In FIG. 46, a large number of the branch communication cables 16 are inserted in the guide conduit 111. FIG. 46(*a*) is a cross sectional view taken from the right side of the guide conduit 111 and FIG. 46(*b*) is a top view of the guide conduit 111. The cross sectional view of the guide conduit 111 taken from the left side in FIG. 46(*b*) corresponds to FIG. 39(a) shown before. The insertion positions of the branch communication cables 16 and others in the guide conduit 111 are configured to be symmetric with respect to the position which corresponds to the half of the number of the branch pipes which the guide conduit 111 supports. Also symmetric branch communication cables 16 and others are disposed in parallel in the lateral direction of the guide conduit 111 and then into the branch pipes successively from the one closer to each manhole. This configuration makes it is possible to cope with the case in which the distance between the manholes are very large by connecting two guide pipes 111 and placing them in parallel successively from the one closer to each manhole. The guide conduit 111 may also be an unitary long pipe.

Next, as another embodiment applicable to the embodiments so far described, a method of cable insertion will be described, in which the bending of the branch communication cables such as optical fiber cables is restricted by a tube which is a branch tension member. This is also applicable to the branch tension members 26, 27 shown in FIGS. 8, 7, 36.

FIG. 40 shows a cross sectional view of an example of the laying structure in the underground pipeline for the branch communication cables 16. The branch communication cables 16 are formed of, for example, optical fibers which have excellent properties as the communication medium, and laid in the main pipe 1 and the branch pipes 4, 5 of a sewerage pipe between the manholes 2 and 3. The branch communication cable 16 is inserted in a branch tension member 216 (equivalent to 26, 27) at least from the openings of branch pipe 6, 7 to the branch pipe boxes 8, 9 at the end of the branch pipes and inserted in the guide conduit 111 within the main pipe 1. This is to give the branch communication cables water resistance, chemical resistance, rat proof characteristics, and anti-high-pressure-cleaning. In this way, since the branch communication cables 16 are protected by the branch tension member 216, it is secured that their water resistance and chemical resistance will not degrade, that breakages due to rat bites will be prevented, and that breakages of the branch communication cable 16 will be prevented by the protection of the branch tension member 216 even when bitten by rats. Also when cleaning the inside of the branch pipes 4, 5 with high pressure cleaning, it is unlikely that the branch communication cable 16 is broken by directly contacting with the high pressure cleaning water and getting flaws. Moreover in the main pipe 1, it is possible to protect the branch communication cables 16 from the outside by accommodating the branch communication cables 16 in the guide conduit 111.

Then the branch communication cables 16 branch off from the guide conduit 111, and are laid in the branch pipes 4, 5 through the openings of branch pipe 6, 7 leading to the branch pipe boxes 8, 9, and drawn into each household. There will be no problem if there are other manholes between the manholes 2 and 3, and it is also workable even if the manhole is a communications base.

In a pipeline such as a sewer pipeline and a storm drain pipeline, in which fluids such as sewage flows in the lower part of the main pipe 1, the members used for laying the branch communication cables 16 and the guide pipes and others are placed in substantially upper space of inside the main pipe 1 and the branch pipes as shown in FIG. 40 so that the branch pipes will not impair the normal functions of the underground pipeline. This configuration makes it possible to prevent the branch communication cables 16 from blocking the flow of the sewage and the like, or from being broken by rat bites.

Figure 55:
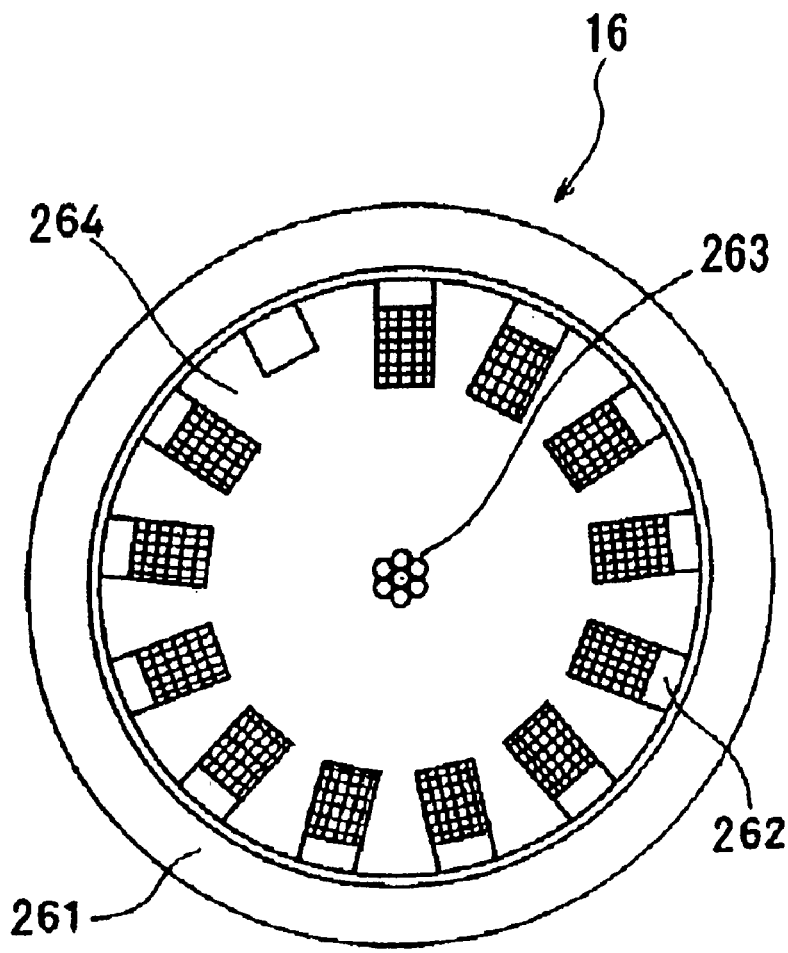
FIG. 55 is a cross-sectional view to show an example of communication cables.
Figure 56:
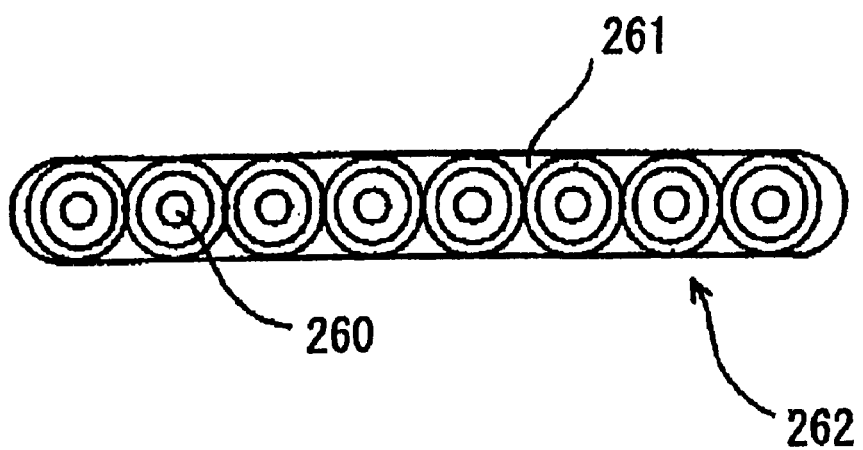
FIG. 56 is a cross-sectional view to show an example of a ribbon fiber used for communication cables.

The branch communication cables 16 correspond to the previously described optical fiber cables 21, 22 and can be configured differently. For example, the communication cable shown in FIG. 55 is configured such that communication tape wires 262, each of which has two to eight communication wires as the core and is coated with a resin coating 261 as shown in FIG. 56, are stacked in the grooves formed on the outer periphery of a slotted core 264, in which center strength members 263 are disposed, and a resin coating 261 is applied thereon. Such communication cables are very rigid and designed to be disposed in straight manner to avoid direct tensioning of the optical fiber 260. Therefore, it can be used preferably for the trunk communication cables 20, 128.

Figure 57:
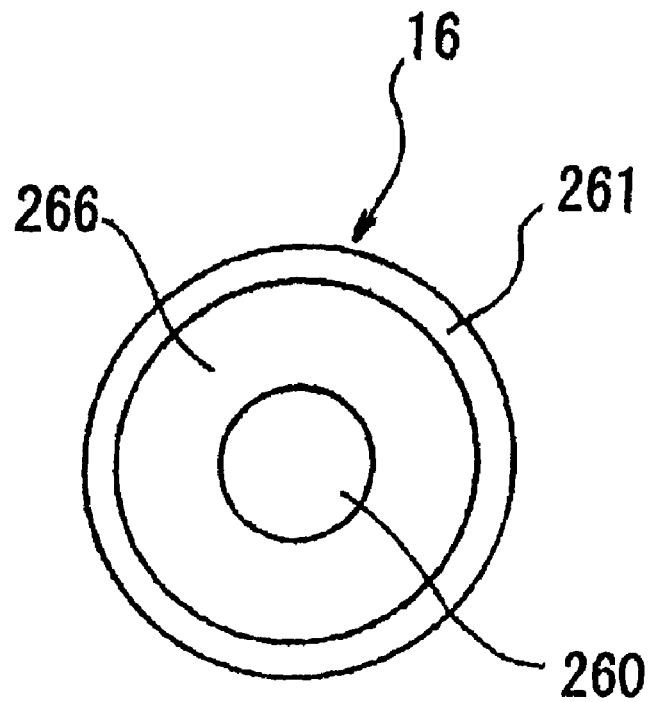
FIG. 57 is a cross-sectional view to show another example of communication cables.
Figure 58:
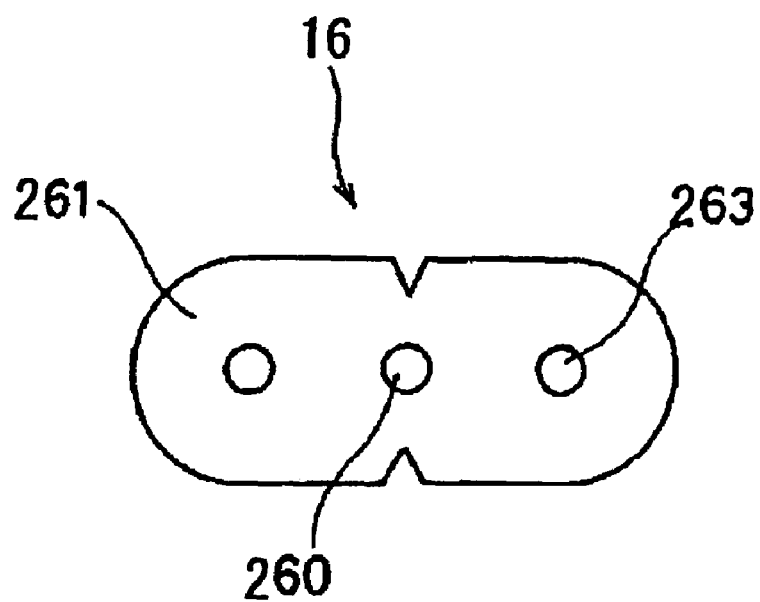
FIG. 58 is a cross-sectional view to show still another example of communication cables.

Other communication cables which has been developed include a communication cable in which a optical fiber 260 is accommodated within a tubular braid 266 made of aramid fibers and a resin film 261 is coated thereon as shown in FIG. 57, and a communication cable which accommodates a optical fiber 260 and strength members 263 and are coated with a resin film 261 as shown in FIG. 58. These communication cables shown in FIG. 57 and FIG. 58 are very flexible and small in diameter compared to the one described in FIG. 56. Therefore they are preferably used for the branch communication cables 21, 22, 16.

Generally a communication cable may break or lose its function when it is bent exceeding a certain angle depending on its material properties. An allowable bending radius is defined by the angle in such a state. Among the communication cables, optical fiber cables have larger allowable bending radii compared to steel wires because their wires are formed of glass or plastic. For instance, an optical fiber cable, which is configured such that a ribbon fiber with two communication wires is provided with two tension members disposed in parallel on both sides of the ribbon fiber and then a resin coating is applied on the outside as shown in FIG. 58, has an allowable bending radius of 35 mm, and there is datum obtained that another optical fiber cable, which is configured such that the communication ribbon fiber is contained in a stainless pipe and then the pipe is filled with a jelly material, and a PE coating is further applied on the pipe surface, has an allowable bending radius of about 80 mm. On the other hand, an optical fiber cable called a 'multimode fiber' which transmits information by use of light reflection, have a still larger allowable bending radius due to its material properties. As described so far, the allowable bending radius is defined according to the kind and configuration of a communication cable.

In this embodiment, the branch tension member 216 is formed of a material with an allowable bending radius exceeding that of the communication cable and preferably a flexible tube made of plastics or stainless steel. This tube prevents the communication cable from being bent exceeding its allowable bending radius. This is to prevent the damages of the communication cables installed in the branch tension member 216 when the branch tension member 216 is bent exceeding the allowable bending radius of the communication cable. For the branch tension member 216, a tubular textile formed of fabrics, knits, or braids may also be used. When using these, it is preferable to use a separate rigid wire or a mono-filament string with a large diameter as the weft for fabrics and as the longitude string for knits and braids, to secure the bending characteristics better than those corresponding to the allowable bending radius of the communication cables. By doing so, even when a tubular textile is used for the branch tension member 216, laying operation of the communication cables can be conducted with relative ease since the branch tension member 216 will not be bent too sharply even in an inflection part in underground pipelines.

Furthermore, when a flexible tube made of stainless steel or plastics, or a material lack of water-tightness such as a tubular textile is used for the branch tension member 216, it is possible to securely protect the communication cables from water and chemicals by forming a water-tight layer on the inner and/or outer surfaces of the branch tension member 216. This water-tight layer is achieved by sticking a plastic or rubber tube on the branch tension member 216 by insertion and/or wrapping, or by coating a curable resin or water proof paint on the inner and/or outer surfaces of the branch tension member 216.

A trunk tension member 121 is housed in the guide conduit 111 disposed in substantially upper space of inside the main pipe 1, and tension is applied on the trunk tension member 121 by use of a tensioning apparatus 34 between the manholes 2 and 3 to lay the guide conduit 111 in the upper part within the main pipe 1.

Moreover, it is possible to prevent the guide conduit 111 from loosening in the radially inward direction in the main pipe 1 by placing a plurality of slack prevention members 55 consisting of an arcuate fixing part 56 having a concave part at its center as shown in FIG. 29 at a proper interval in the main pipe 1. As shown in FIG. 41, the arcuate fixing part 56 of the slack prevention member 55 is fixed on the inner surface of the main pipe 1 while accommodating the guide conduit 111 in the concave part.

Next, the structural configuration of the main pipe 1 and the branch pipes 4, 5 will be described. Generally, the main pipe 1 is located at a depth of several meters from the road surface, and the openings of branch pipe 6, 7 of the branch pipes 4, 5 are formed on the upper half surface of the main pipe 1. The branch pipes ascend at a steep angle from the openings of branch pipe 6, 7 (not shown) and lead to the branch pipe boxes 8, 9 at a gentle angle near the earth's surface.

When the openings of branch pipe 6, 7 are provided in substantially upper space of inside the main pipe, or more specifically in a region of about 30 degrees right and left from the top of the main pipe 1, the guide conduit 111 passes directly beneath the branch pipes 4, 5 thereby possibly blocking the flow of sewage water and the like since the guide conduit 111 is disposed in substantially upper space of inside the main pipe 1. In such cases, it is preferable to attach a guide member P, which is comprised of an arcuate fixing part 241, a trunk slide part 231 projecting downwardly from the arcuate fixing part 241, and a branch slide part 232 provided on the arcuate fixing part 241, to each opening of branch pipe 6, 7 thereby slidably holding the guide conduit 111 with the trunk slide part 231. When using such guide member P (also shown in FIGS. 13, 28, 35), the guide pipe will not pass directly underneath the branch pipes 6, 7, and thus it is possible to prevent the impairment of the function of the branch pipes 6, 7. Also in the guide member P shown in FIG. 47, since the arcuate fixing part 241 has a projection part 233 in the radial direction, waste matters will be removed by the sewage flow even when they build up in the projection part 233, and thus the waste matters will not be trapped by the branch tension member 216. Furthermore, since the guide conduit 111 is slidably held by the trunk slide part 231, the laying operation becomes relatively easy.

On the other hand, when the openings of branch pipe 6, 7 are provided in a range more than about 30 degrees right or left from the top of the main pipe 1, the guide conduit 111 will not pass directly beneath the branch pipes 4, 5 and thus there is no need to use the guide member P. In such cases, it is desirable to attach a fixing member Q (corresponds to the holding member), which consists of an arcuate fixing part 44 placed along the inner wall of the branch pipes 4, 5 and a slide part 43 for slidably holding the branch tension member 216, in substantially upper part within the branch pipes 4, 5 near the openings of branch pipe 6, 7 to hold the branch tension member 216 in substantially upper space of inside the branch pipes 4, 5. Thus the branch tension member 216 is placed in substantially upper space of inside the inner wall of the branch pipes 4, 5 and therefore the normal functions of the branch pipes 4, 5 will not be impaired. Also since the branch tension member 216 is slidably held by the slide part 43, it is possible to prevent the breakage of the branch tension member 216 caused by excessive tensioning during laying operation.

Figure 54:
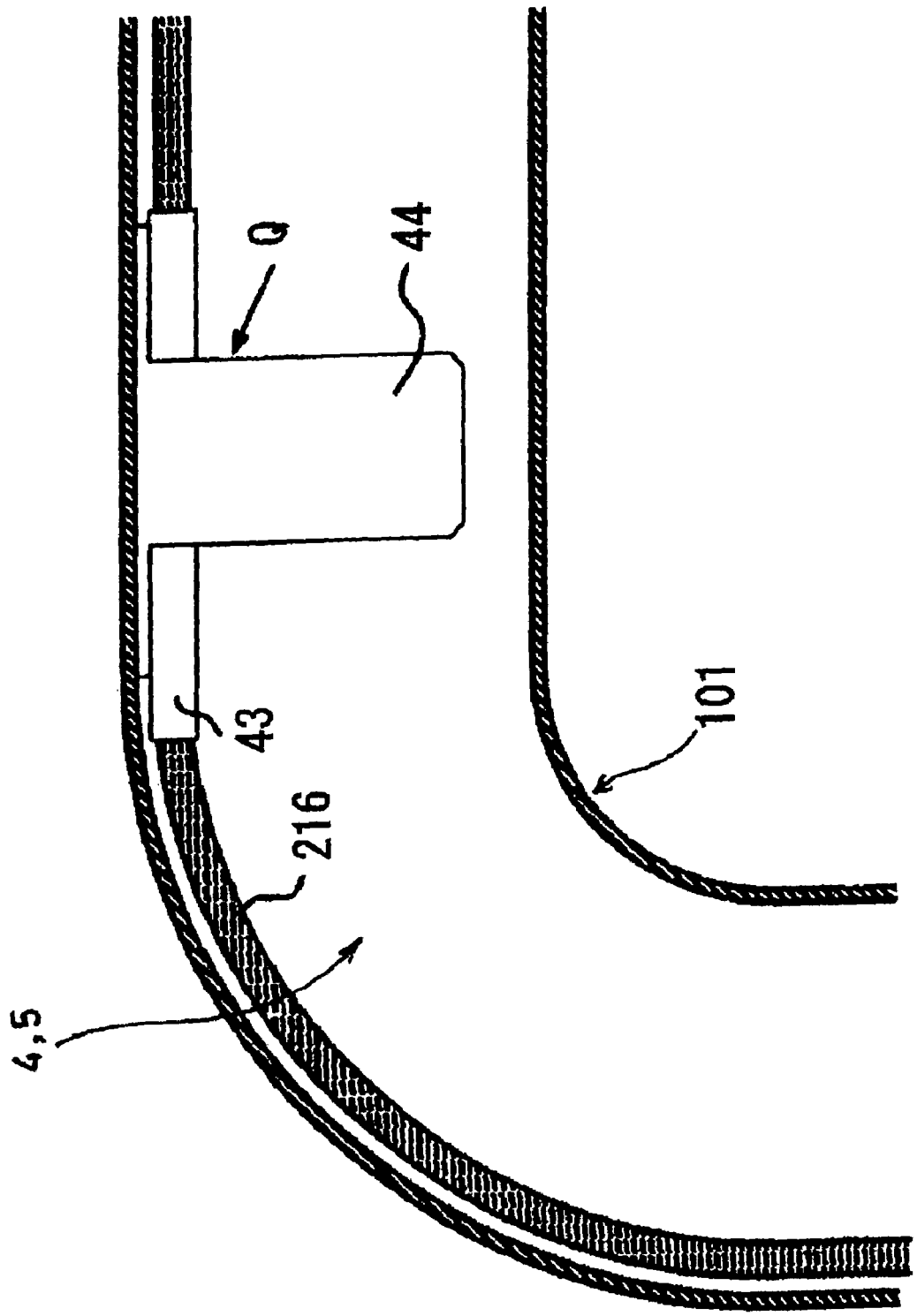
FIG. 54 is perspective view to show an embodiment of a fixing member for laying communication cables and others in the upper space of inside the branch pipe.

Regardless of the above described forming angle of the branch pipes 6, 7, when the branch pipes 6, 7 have a valley part 101 in which a sharp angle change occurs as shown in FIG. 40 and FIG. 54, it is not possible to lay the branch tension member 216 accommodating the branch communication cables 16 along the upper part of the valley part 101 of the branch pipes 4, 5 merely by tensioning by use of the tension device 34 mounted in each branch pipe box 8, 9. In such cases, a fixing member Q which consists of an arcuate fixing part 44 and a slide part 43 shown in FIG. 54 is used to hold the branch tension member 216 in substantially upper part of the inner wall of the branch pipes 4, 5.

Next, the branching configuration of the branch communication cable 16 from the guide conduit 111 will be described in more detail referring to FIGS. 49 to 53.

Figure 49:
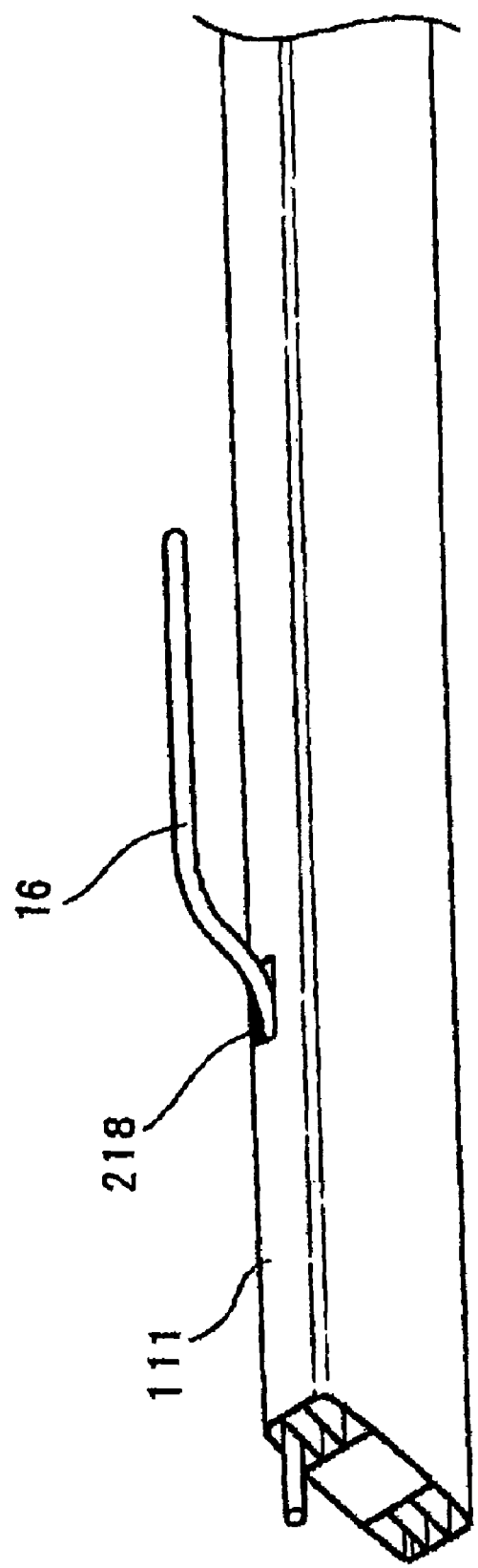
FIG. 49 is a perspective view to show a state that a communication cable branches off from a guide pipe.

FIG. 49 shows a state in which a branch communication cable 16 in the guide conduit 111 is taken out of the guide conduit 111 through an opening part 218 (equivalent to 18 and 46) provided on the side of the guide conduit 111. The guide conduit 111 is a hollow pipe having a rectangular cross section divided by multiple partition plates. There is formed in the center of the pipe a large space for installing the trunk communication cables (not shown) passing through the main pipe 1, and also formed on both sides of the space are two spaces divided into substantially three equal layers for the passage of the branch communication cables and the like.

Figure 50:
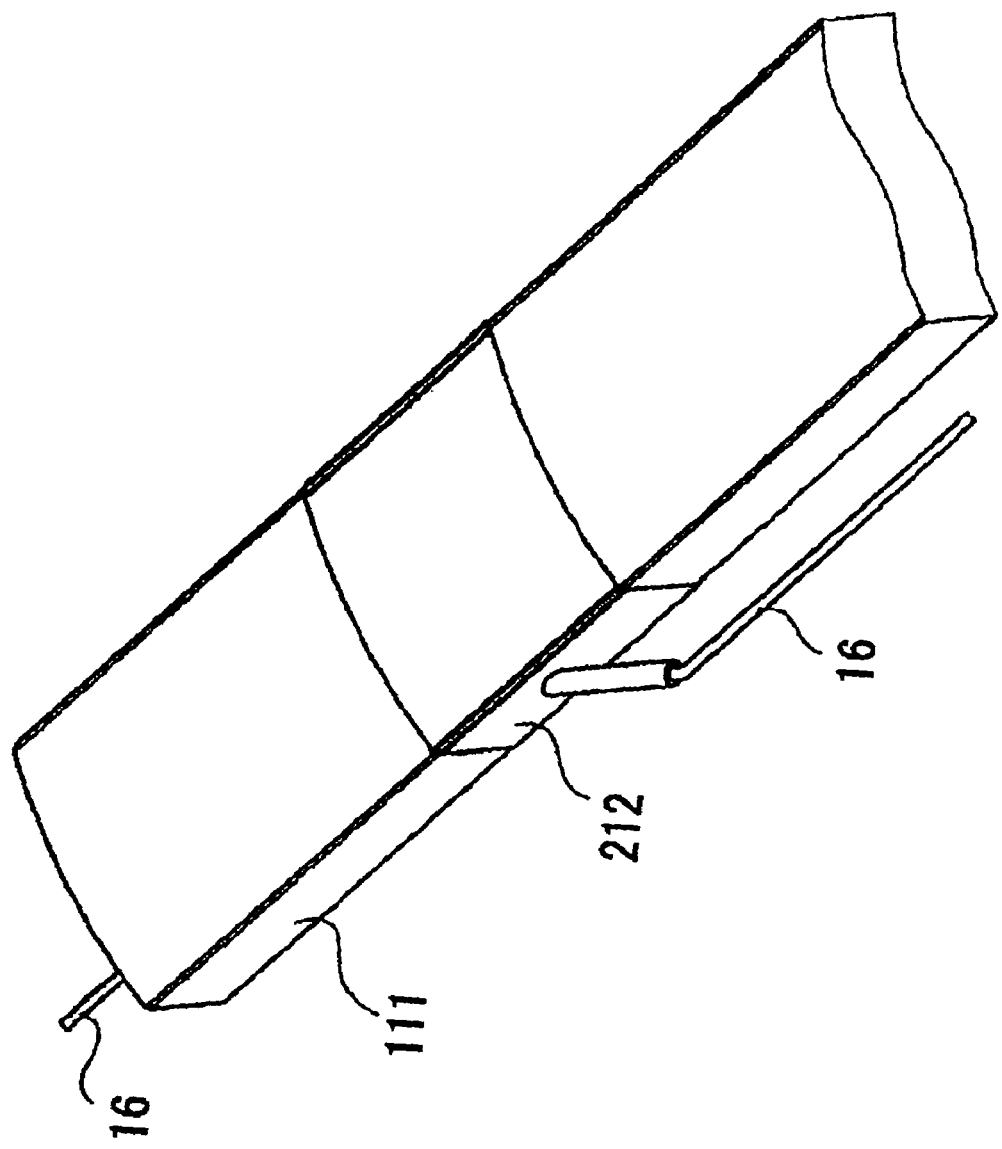
FIG. 50 is a perspective view to show a state that a communication cable branches off from a guide pipe including a branching tool which is an embodiment.

In FIG. 50, the branch communication cable 16 passing through the guide conduit 111 is taken out of the guide conduit 111 through an opening part of the guide conduit 111, and a branching member 212 is mounted on the guide conduit 111 near the opening part. The branching member 212 has a role of protecting the branch communication cable 16 in the vicinity of the opening part 218 of the guide conduit 111. The branch communication cable 16 passes through the opening part of the guide conduit 111 to be guided into the branch pipes 4, 5 through the branching member 212.

To protect the branch communication cables 16 from the outside environment, it is necessary to insert the branch communication cable 16 in a branch tension member 216 at least in the section from the opening of branch pipe 6, 7 to the branch pipe box 8, 9. Therefore the configuration shown in FIGS. 49 and 50 is used when the guide member P shown in FIG. 47 is used, and thus the branch communication cable 16 is protected by the branch tension member 216 attached to the guide member P. The branch tension member 216 extends from the opening of branch pipe 6, 7 to the branch pipe box 8, 9 passing through the branch pipe. Thus the guide conduit 111 is slidably held by the trunk slide part 231 of the guide member P and the branch communication cable 16 is inserted into the branch tension member 216 from the opening part 218 of the guide conduit 111 thereby being lead to the branch pipe box 8, 9 and finally drawn into each household.

Figure 51:
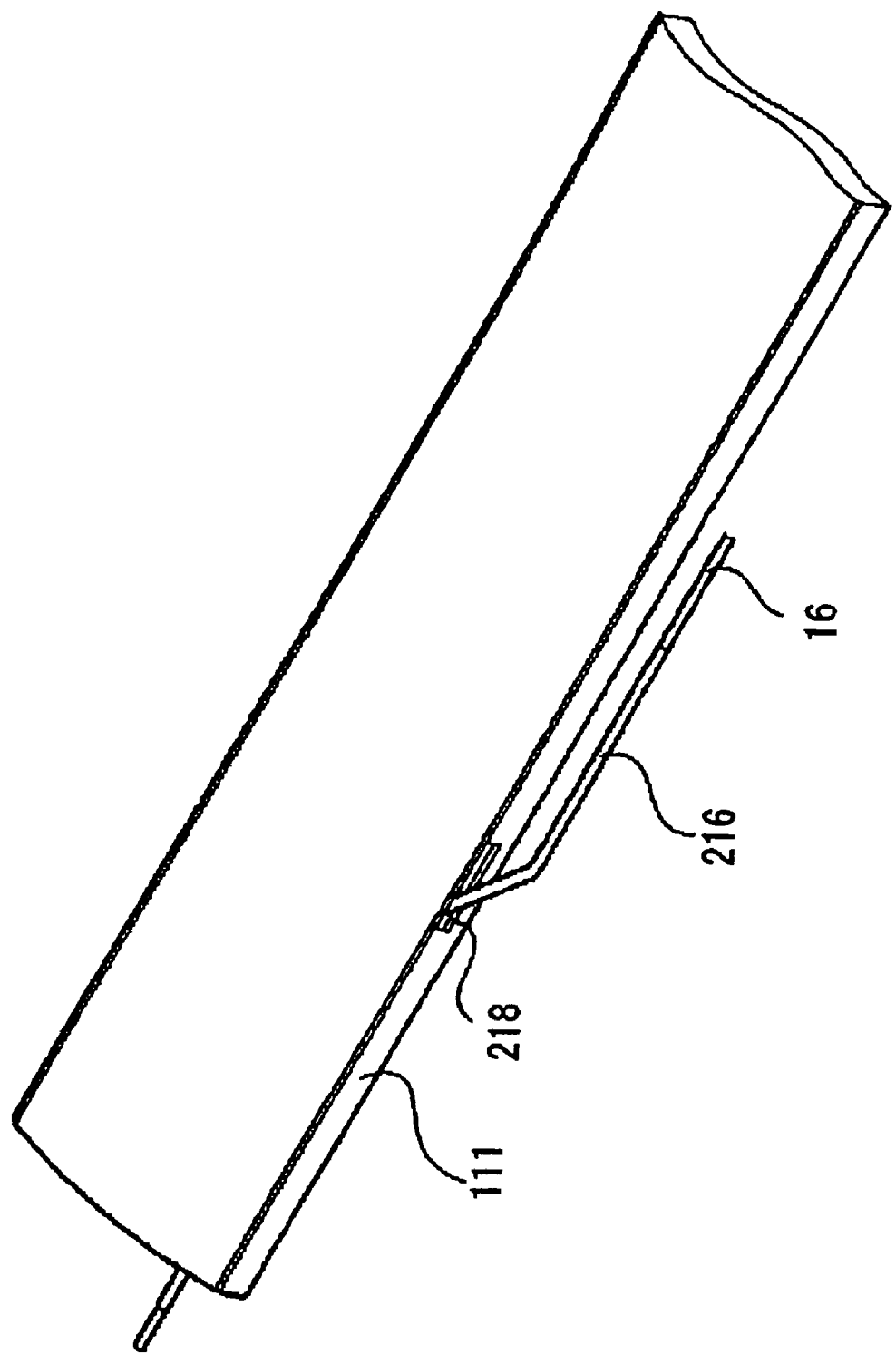
FIG. 51 is a perspective view to show a state that a communication cable inserted in a tube branches off from a guide pipe.

FIG. 51 shows a state that a branch tension member 216 in which the branch communication cable 16 is installed is inserted into a guide conduit 111 from one end of the guide conduit 111 and slidably branches off through an opening part 218 formed on the side surface of the guide conduit 111. The branch tension member 216 extends to a branch pipe box 8, 9 protecting the branch communication cable 16 from the outside environment.

Figure 52:
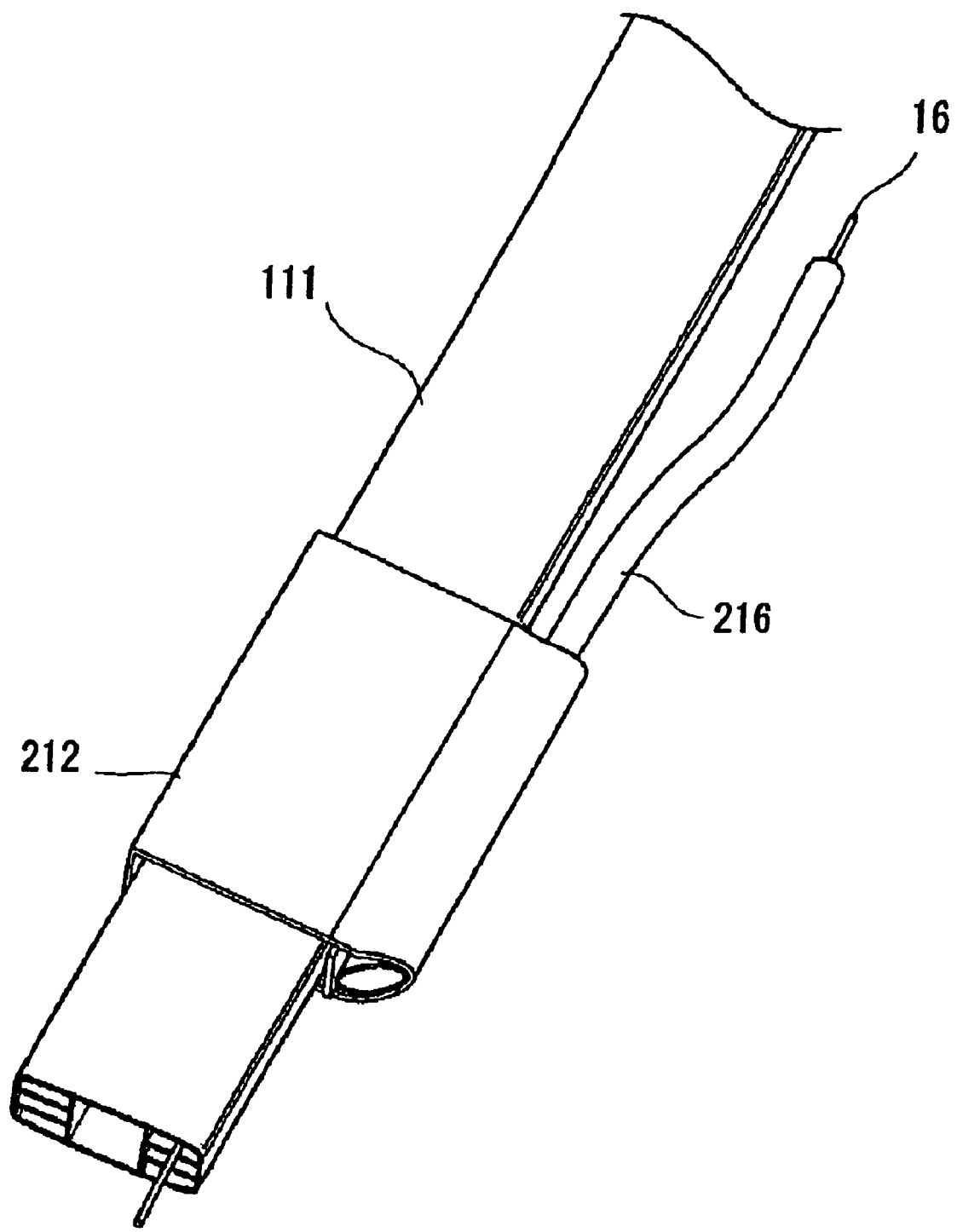
FIG. 52 is a perspective view to show a state that a communication cable branches off from a guide pipe including a branching member, which is another embodiment.

In FIG. 52, a branching member 212 with a different shape from the one shown in FIG. 50 is mounted on a guide conduit 111 near an opening part to protect the branch communication cable 16 in the vicinity of a branching point at which the branch communication cable 16 branches off from the guide conduit 111, i.e., an opening part 218 of the guide conduit 111. The branching member 212 is provided on its side part with a hollow cylindrical member and the guide conduit 111 side surface of the hollow cylindrical part is adapted to communicate with the opening part 218. The branch tension member 216 is continuously connected with the hollow cylindrical member and extends to the branch pipe boxes 8, 9 protecting the branch communication cable 16 from the outside. The branch communication cable 16 passing through the guide conduit 11 is passed through the opening part provided on the side surface of the guide conduit 111 and further guided into the attached branch tension member 216 through the space in the hollow cylindrical member of the branching member 212 formed on the side surface part of the guide conduit 111, thus being laid in the branch pipes 4, 5.

Figure 48:
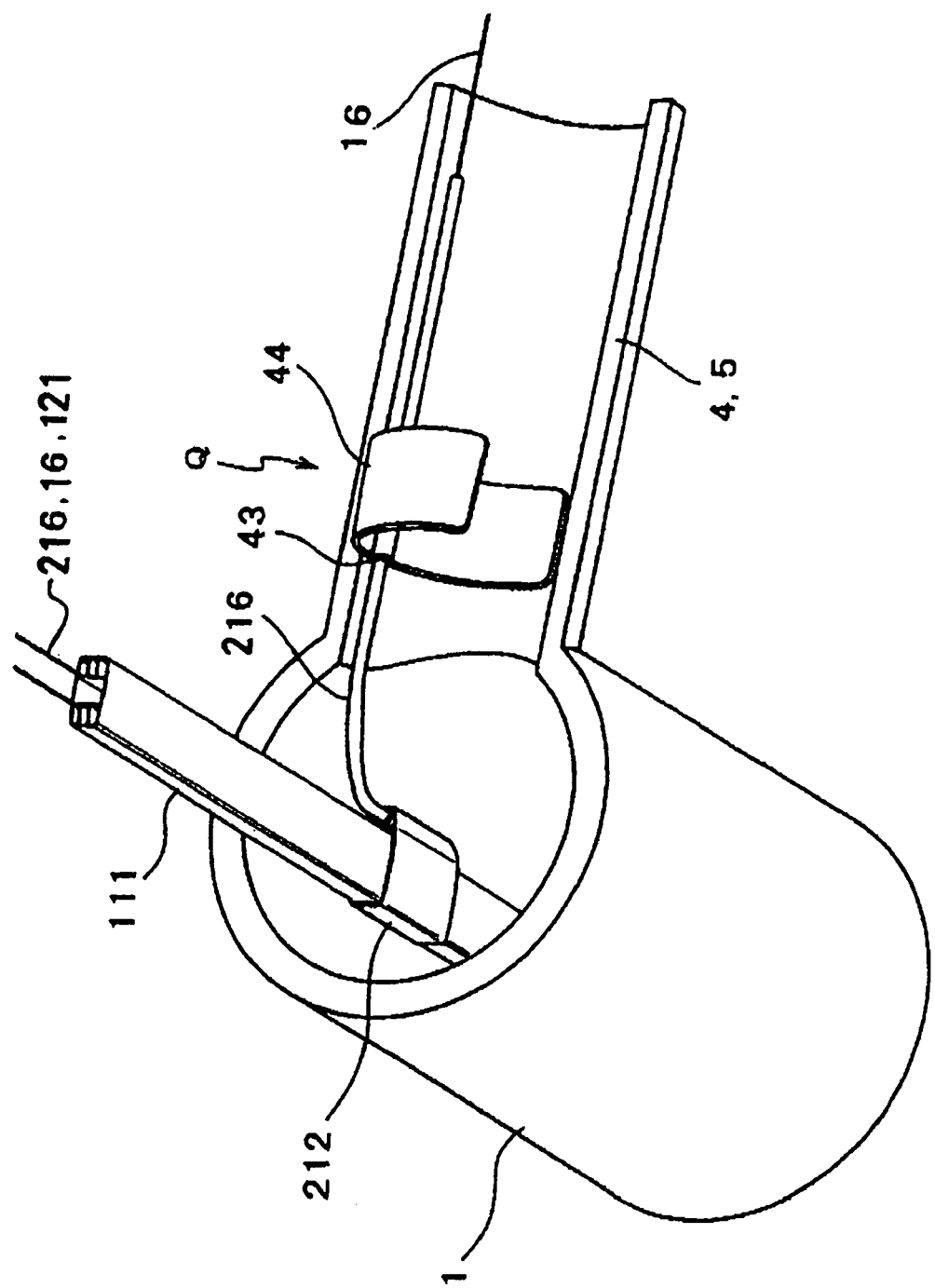
FIG. 48 is a perspective view to show a state that communication cables are laid in a main pipe and a fixing member is used in a branch pipe which branches off from the main pipe.

The configuration shown in FIGS. 51 and 52 is preferably used when the guide member P shown in FIG. 47 is not introduced, since the branch communication cables 16 are installed in the branch tension member 216 without being exposed to the outside, and the branch tension member 216 in which the branch communication cables 16 are installed is supported in substantially upper space of inside the branch pipes 4, 5 by the fixing member Q shown in FIG. 48 and is led to each household.

The opening part 218 formed on the guide conduit 111 is intended to take out the branch communication cable 16 to the outside of the guide conduit 111 to make it branch off into the branch pipe 4, 5 and it is formed at positions substantially corresponding to the openings of branch pipe 6, 7 (about 1 m front or rear of the openings of branch pipe 6, 7) as many as the number of the branch pipes. In this regard, it is desirable to avoid placing an opening part 218 directly beneath a branch pipe 4, 5 so that the fluids from the branch pipe will not flow into the opening part 218. Also the opening part 218 is preferably formed in advance at the factory and the like based on the survey result in the main pipe 1.

Figure 53:
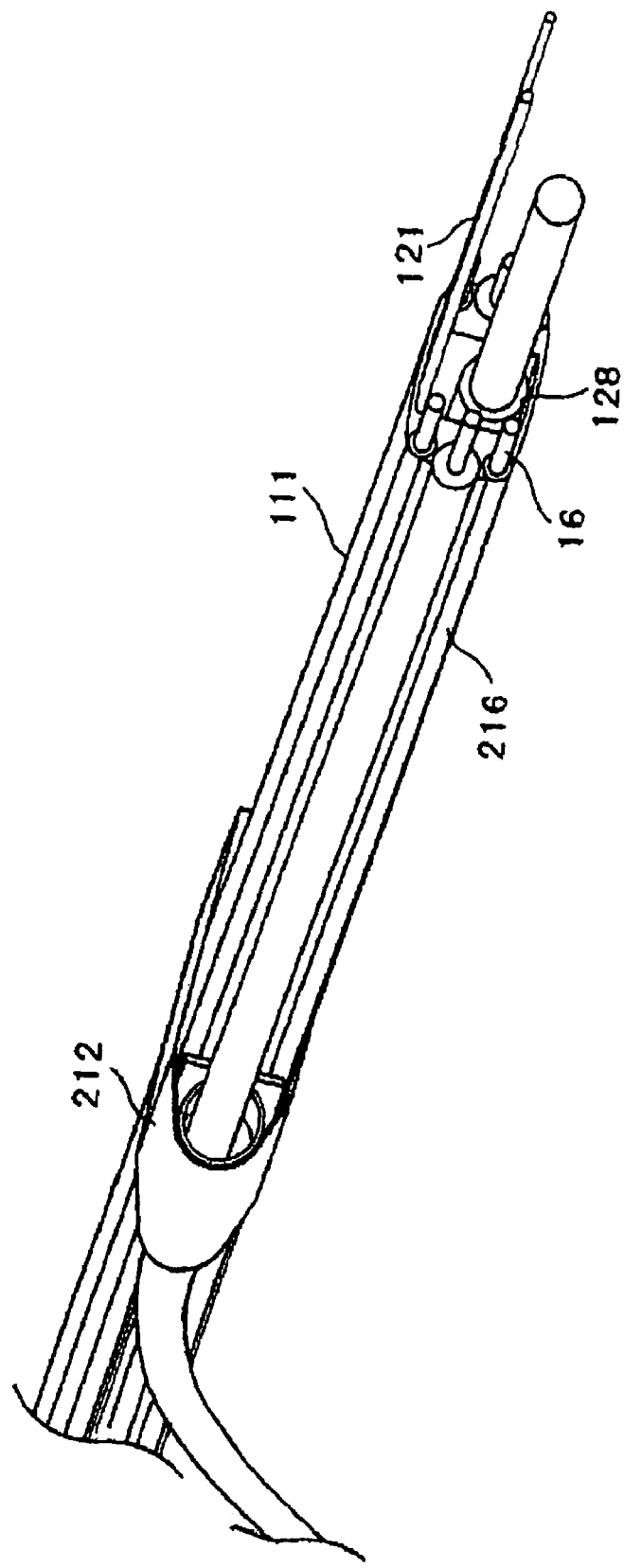
FIG. 53 is a perspective view to show another embodiment of the arrangement of guide pipes and communication cables in a guide pipe relating to the present invention.

FIG. 53 shows still another embodiment. Only the trunk communication cables are installed in the guide conduit 111, and the branch tension member 216, in which the branch communication cables are installed corresponding to the number of branch pipes, is tied in a bundle and secured to the outer periphery of the guide conduit 111. The branch communication cables 16 or the branch tension member 216 branch off from the guide conduit 111 near the opening of branch pipe 6, 7 through the branching member 212 or a lock band and the like shown in FIGS. 52 and 53.

When there are many branch pipes with respect to the main pipe 1, the number of the pull members to be installed in the pipeline described later will increase thereby increasing the risk of entanglement, and therefore it is preferable to attach the previously described lead tug 19 undetacheably to the leading end of the branch tension member 216 containing the branch communication cables. The lead tug 19 makes the operation of taking out the branch tension member 216 from the inside of the guide conduit 111 through the opening part 218 easy and smooth. Various shapes of this lead tug such as a hook-shape, a ring-shape, or many others may be adopted, but it is essential that at least the outer diameter of the lead tug is configured to be larger than the size of the opening part 218 of the guide conduit 111 so that the front end of the branch tension member 216 taken out of the guide conduit 111 will not return to the inside of the guide conduit 111.

When the lead tug 19 is connected to the branch tension member 216, the branch tension member 216 is preferably pulled out to some length to make it easy to be hooked up or grasped from the pipe openings 6, 7.

To prevent the entanglement of a plurality of branch communication cables 16 and/or tubes 216, the disposition of the branch communication cables 16 and/or the tubes 216 is preferably orderly arranged with reference to the positions of the branch pipes extending to each household. That is, as shown in FIGS. 39 and 46, the branch communication cables 16 are placed in parallel in the lateral direction in the guide conduit 111 so that the branch communication cables can be taken out from the outer most position successively from a manhole 2 toward the inside of the main pipe 1.

Next the method for laying branch communication cables 16 in an underground pipe will be described. First the inside of the main pipe 1 is surveyed with a TV camera and the like to accurately measure the distance between the manholes 2, 3, distances from the manhole 2 to the openings of branch pipe 6, 7 of the ranch pipes 4, 5 in the main pipe 1, the distances from the branch pipes 4, 5 to the branch pipe boxes 8, 9, and the depth of the branch pipe boxes 8, 9. Based on the data obtained by the above described pipeline survey, the guide conduit 111 is formed with opening parts 218 at the positions corresponding to the openings of branch pipe 6, 7 in advance at the factory or the like and the branch communication cable 16 or the branch tension member 216 is pulled out from the opening part 218. When the branch pipes 4, 5 are provided on the main pipe 1 in a region of 30 degrees left or right from the top of the main pipe 1, a guiding member P shown in FIG. 47 needs to be attached to the opening of branch pipe 6, 7 for the branching point of the branch communication cables 16. In this case, to enhance the efficiency of work at the site, it is desirable to make the diameter of the arcuate fixing part 241 contracted by inserting a thin lead string into a small hole 236 (drilled on both sides of the arcuate fixing part 241) so that the arcuate fixing part 241 can be inserted in the branch pipes 4, 5 and it is also desirable to form a lead tug 19 in advance by inserting the tube accommodating the branch communication cables 16 through the branch slide part 232 of the guide member P.

The guide conduit 111 prepared at the factory in advance is brought to the work site wound in a drum and the like. When inserting the guide member P, it is preferable to carry it on board a movable cart or simple vessel in the main pipe 1 and draw it in by means of a pull member as described later because the guide member may be damaged due to the friction against the inner wall of the main pipe 1 and also may be trapped by a step in the pipeline while moving in the main pipe 1.

At the work site, first a pull member is installed between the manholes 2 and 3. Also at this time, the provision is made such that a tension device 34 which has a drum reel manual winch and a hook as a pair is mounted in each manhole 2, 3 and in each branch pipe box 8, 9 of each branch pipe 4, 5.

Then, an end of the pull member and the guide conduit 111 is taken up from one end of the main pipe 1, for example, from the manhole 2 to install the guide conduit 111 in the main pipe 1. In this stage, each opening part 218 provided in the guide conduit 111 is substantially aligned with each opening of branch pipe 6, 7.

Next, the branch tension member 216 is drawn into the branch pipes 4, 5. This operation will be described about the case in which the branch pipes are provided in a region of 30 degrees left or right from the top of the main pipe 1, and therefore there is no need to use the guide member P shown in FIG. 47. The guide conduit 111 is finely adjusted by moving it fore and aft in the main pipe 1 to place the branch tension member 216 or the lead tug 19 on the leading end of the branch tension member 216 directly beneath the branch pipe 4, 5. Next, an arm-type grasping device and the like is inserted from the branch pipe box 8, 9 to grasp the branch tension member 216 or the lead tug 19 attached to its end and take it out from the branch pipe boxe 8, 9 while monitoring with a TV camera. Alternatively, a pull member may be installed in advance from a branch pipe box to an end of the main pipe 1, for example manhole 2 through the main pipe 1 and the branch pipe 4, 5, then the branch tension member 216 is laid in the branch pipe 4, 5 and the main pipe 1 by connecting the branch tension member 216 with the pull member and pulling up the pull member from the branch pipe box 8, 9.

When the guide member P is not used, the fixing member Q is preferably placed in the branch pipes 4, 5 of the openings of branch pipe 6, 7 to place the branch tension member 216 along the upper part of the inner wall of the branch pipes 4, 5. This will prevent the impairment of the normal function of the branch pipes 4, 5. First, the branch tension member 216 accommodating the branch communication cables 16 which have reached the branch pipe boxes 8, 9 is inserted into the slide part 43 of the fixing member Q. In a state that the branch tension member 216 is inserted in the slide part 43, the arcuate fixing part 44 and the slide part 43 of the fixing member Q which is contracted in diameter are moved to the openings of branch pipe 6, 7 through the branch pipes 4, 5. To support this moving operation, an air packer or a dedicated apparatus may be used. For example, an air packer and the like is inserted in a contracted state into a branch pipe 4, 5 through a branch pipe box 8, 9 to insert it into the inside of the fixing member Q, and then the contraction of the air packer is released at a mounting position of the fixing member Q. Thus, the arcuate fixing part 44 of the fixing member Q is clamped by the air packer thereby being fixed to the inner wall of the branch pipes 4, 5.

On the other hand, when the branch pipes 4, 5 are disposed in substantially upper space of inside the main pipe 1, more specifically in a region of 30 degrees left or right from the top of the main pipe 1, the guide member P shown in FIG. 47 is utilized. In this case, the branch tension member 216, in which the branch communication cable 16 is installed in advance, is passed through the branch slide part 232 of the guide member P, and the lead tug 19 is formed at the leading end of the branch tension member 216. Similarly with the previously described method, the lead tug 19 at the lead end of the branch tension member 216 is grasped with a grasping device and the like while monitoring with a TV camera to take it out from the branch pipe box 8, 9. Simultaneously, the guide member P contracted in diameter by a thin lead string is inserted into the openings of branch pipe 6, 7 with its lead end first. To assist this operation, the above described air packer or the like may be inserted into the opening of branch pipe 6, 7 from the branch pipe box 8, 9 in a contracted state, and it is inserted into the inner surface of the guide member P and then made it expand to clamp the guide member P, thus it is made possible to insert the guide member P into the opening of branch pipe 6, 7 by pulling up the air packer. Then the air packer is further expanded and then the thin lead string is cut thereby releasing the diameter contraction of the arcuate fixing part 241 thus securing it inside the branch pipes 4, 5.

Subsequently, an end of the trunk tension member 121 housed in the guide conduit 111 is fixed to the hook of the tension device 34 mounted in the manholes 2, 3 and the other end of the trunk tension member 121 is pulled by the winch of the tension device 34 to secure the guide conduit 111 in substantially upper space of inside the main pipe 1. Similarly, the tension devices 34 mounted in the branch pipe boxes 8, 9 are utilized to lay the branch tension member 216 in the branch pipes 4, 5.

However, when the branch pipes 4, 5 have a valley part 101 with a sharp angle change as shown in FIGS. 40 and 54, it is not possible to lay the branch tension member 216 along the upper part of the inner wall of the branch pipes 4, 5 merely by the tensioning by means of the tension device 34. In this case, placing the fixing member Q shown in FIGS. 30 and 54 in the vicinity of the valley part 101 in the branch pipes 4, 5 as described before makes it possible to place the branch tension member 216 along the upper part of the inner wall of the branch pipes 4, 5 even when the branch pipe 4, 5 has a valley part 101. Here the means for moving the fixing member Q is the same as described before.

When using the previously described slack prevention member 55 shown in FIG. 29 to support the guide conduit 111, the slack prevention member 55 is secured to the inner wall of the main pipe 1 with its arcuate fixing part 56 as shown in FIG. 41.

Thus it becomes possible to lay the communication cable in substantially upper space of inside the main pipe 1 and each branch pipe 4, 5 and lead it to each household.

Also, instead of the communication cable, the above described lead string 17, 123 may be inserted in the guide conduit 111 and the branch tension member 216. This configuration makes it possible to prevent damages of the communication cable during laying various members in the underground.

When the branch tension member 216 is formed of a tubular textile, though the tubular textile does not have water-tightness, it can protect the branch communication cable 16 from the water and chemicals by forming a water-tight layer on its inner and/or outer surface. This water-tight layer is achieved by bonding a plastic or rubber tube onto the tube by insertion or wrapping, or painting a curable resin or water resistant paint on the inner and/or outer surface of the tube. It is also preferable to use a separate rigid wire or a large diameter monofilament yarn for the longitude string in the case of fabrics and for the weft in the case of knits or braids. In this way, the branch tension member 216 will not be excessively bent even in an inflection part and thus the laying operation of the communication cable is conducted with relative ease. Moreover, it is also possible to achieve a rat-proof characteristics by knitting a tubular textile using yarns coated with a rat-proof chemical.

INDUSTRIAL APPLICABILITY

Thus, according to the present invention, it is possible to lay a communication cable without impairing the fluid flow in an underground pipeline, by tensioning a tension member between pits and between one of pits and a branch pipe box thereby stretching a tension member inserted in a main pipe substantially straight in the upper space of inside a main pipe to lay each communication cable in the upper space of inside the main pipe, and also by tensioning a branch tension member inserted in a branch pipe to lay a branch communication cable in the branch pipe inhibiting its from loosening. It is also possible to restrict tension on communication cables to a minimum by configuring a tension member to be slidable with respect to each of the communication cables in the longitudinal direction.

When a tension member inserted in a branch pipe is tied to a trunk tension member laid in the main pipe, it is possible to decrease the slack in the trunk tension member within the main pipe by tensioning the branch tension member.

Moreover, when a branch tension member inserted in a branch pipe branches off from a trunk tension member laid in the main pipe, it is also possible to further reduce the slack in the trunk tension member in the main pipe by tensioning the branch tension member.

When a branch communication cable and a branch tension member project from a guide pipe and branch off in the portion of the guide pipe corresponding to an opening of branch pipe in the main pipe, it is possible to protect the communication cable and the tension member with the guide pipe and it is also possible to reduce the slack in the guide pipe within the main pipe.

When the tension member is in the form of a cylinder and communication cables are inserted in that tension member, it is possible to protect the communication cables with the tension member without providing a guide pipe. Thus, the number of parts can be reduced.

When the cross section of the tension member laid in the underground has a shape with a space opened to one direction such as a U-shape, a V-shape, or a W-shape, it makes the installation of the communication cable easier.

When a circular or ring-shape slack prevention member is inserted in the main pipe to press tension members and communication cables or guide pipes against the inner wall of the main pipe by expanding the diameter of the slack prevention member, it is possible to reduce the slack of the tension member and the communication member to a minimum with the slack prevention member inside the main pipe or the guide pipe.

The use of a guide member makes it possible to appropriately guide the branch communication cable and the branch tension member, which branch off at an opening of branch pipe, into the branch pipe and to make the communication cable and the trunk tension member skirt around the area directly beneath an opening of branch pipe thereby preventing the communication cable and the tension member from hindering the fluid flow from the opening of branch pipe to the main pipe.

When a pipe is provided to clamp branch communication cables and a branch tension member inserted in a branch pipe between the inner surface of the branch pipe and the outer surface of the pipe, it is possible to lead the fluid flow in the branch pipe into this pipe. Consequently, a direct contact between the fluid flow in the branch pipe and the branch communication cables and the branch tension member is avoided thereby minimizing the blocking of the fluid flow.

When a guide member is disposed at an opening of branch pipe to install the branch communication cable along the upper surface or the lower surface of the branch pipe by guiding the branch tension member and the branch communication cable at the opening of branch pipe from the upper space of inside the main pipe to the upper part or lower part of the branch pipe and then tensioning the branch tension member in the branch pipe, the branch tension member and the branch communication cable will not traverse the inside of the branch pipe. Consequently, the blocking of the fluid flow in the branch pipe by the branch communication cable or the branch tension member is reduced to a minimum.

In one embodiment, the foregoing guide member includes a trunk slide part projecting from a branch pipe into the main pipe to slidably holding the members to be installed in the main pipe, and a branch slide part for slidably supporting the members to be laid in the branch pipe. This configuration allows easy position adjustment between the guide member and each laying member as well as an easy execution of the installation and a reduced laying operation time.

In using the foregoing guide member, when the guide member is secured with respect to the branch pipe by expanding a curable cylindrical fixing part to press it against the inner surface of the branch pipe and to harden it in that state, it is possible to reliably secure the guide member inside the branch pipe.

In one embodiment, the foregoing guide member is comprised of a tubular main part having a support part for supporting the foregoing branch slide part, the branch communication cable, and the branch tension member, and a tubular rotary part rotatably fitted with the tubular main part and including the foregoing branch slide part, and the arrangement is made such that the support part and the branch slide part are aligned with each other to hold the branch communication cable and the branch tension member and the guide member is disposed at the opening of branch pipe so that the trunk slide part of the tubular main part supports the members laid in the main pipe, and then the tubular rotary part is rotated with respect to the tubular main part to place the branch slide part in the lower part of the branch pipe thus guiding the branch communication cable and the branch tension member to the lower part of the branch pipe. This configuration makes it is possible to guide the branch tension member and the branch communication cable from the upper space of inside the main pipe to the lower edge of the opening of branch pipe in an easy manner by rotating the tubular rotary part with respect to the tubular main part.

In still another embodiment, the above described guide member is a tubular main part formed by spirally rolling up a plate member and slidably fitting adjacent side edges of the plate member with each other, and provided with a trunk slide part and a support part in one end and a branch slide part in the other end, and the arrangement is made such that the support part and the branch slide part are aligned with each other and, in that state the branch communication cable and the branch tension member are inserted into them, and the guide member is disposed at the opening of branch pipe thereby holding the members laid in the main pipe in the upper space of inside the main pipe with the slide part, and the plate member is twisted enlarging the diameter of the tubular main part and placing the branch slide part in the lower part of the branch pipe thus guiding the branch communication cable and the branch tension member into the lower part of the branch pipe. This configuration makes it possible to guide the branch tension member and the branch communication cable from the upper space of inside the main pipe to the lower part of the branch pipe in a simple manner.

When a seal formed of a water-swelling rubber is attached to the outer surface the foregoing guide member so that the seal is swelled with the water in the branch pipe, it is possible to air tightly secure the guide member against the branch pipe.

In still another embodiment, the guide member is a pipe whose end parts are made of rigid material and middle part is made of a resilient deformable material, and the arrangement is made such that the branch communication cable and the branch tension member are inserted into the pipe when it is straight and then the pipe is placed at an opening of branch pipe making the leading end of the pipe project into the main pipe to hold the members laid in the main pipe in the upper space of inside the main pipe, and middle part of the pipe is twisted to deform it into a spiral shape along the inner surface of the branch pipe, and the rear end of the pipe is placed in the lower part of the branch pipe to guide the branch communication cable and the branch tension member into the lower part of the branch pipe. In this configuration, the guide member makes it possible to guide the branch communication cable and the branch tension member along the inner surface of the branch pipe.

In still another embodiment, the foregoing guide member is formed by attaching one end of a pipe made of a deformable resilient material to respective expansion member formed of a ring with a diameter slightly larger than the inner diameter of the branch pipe and with its portion cut open, and the arrangement is made such that the branch communication cable and the branch tension member are inserted in the pipe in a straight state and the expansion member is contracted to be fastened at its ends and placed at an opening of branch pipe to make the leading end of the pipe project into the main pipe to hold the members laid in the main pipe in the upper space of inside the main pipe and then the middle part of the pipe is twisted to deform it into a spiral shape along the inner surface of the branch pipe and placing the rear end of the pipe in the lower part of the opening of branch pipe thus guiding the branch communication pipe and the branch tension member into the lower part of the opening of branch pipe. This configuration makes it possible to secure the pipe in the branch pipe in an easy manner by removing the temporal fasteners in the expansion member at both ends of the pipe making it expand.

When the guide pipe and each communication cable are laid in the upper space of inside the main pipe by stretching the trunk tension member substantially straight in the upper space of inside the main pipe, and the branch communication cable is laid in the upper parts of the main pipe and the branch pipe by placing the guide member at the opening of branch pipe and tensioning the branch tension member between the opening of branch pipe and the branch pipe box thus stretching the branch tension member substantially straight in the upper space of inside the branch pipe, the blocking of the fluid flow in the main pipe and the branch pipe by the communication cables and tension members is minimized. Particularly the use of the guide member allows the installment of the branch communication cable in the branch pipe one by one for each branch pipe, this simplifies the operation minimizing the hung-up and entanglement of the communication cable. Also in the case of large number of the branch pipes, on the above described reason, it is enough to place two operators at a pit and a branch pipe box from which the branch communication cable is drawn out thus minimizing the manpower for the operation and reducing the cost.

When a fixing member is disposed in the upper part of the inner surface of the bottom part of a pipe bend formed in the branch pipe and a branch tension member is slidably attached to the inside or the outside of the foregoing fixing part to place the branch communication cable in the upper part of the inner surface of the pipe bend, it is thus possible to dispose the branch communication cable in the upper part even in branch pipes with a pipe bend.

When the foregoing branch communication cable is installed by replacing the lead string in the guide pipe with the branch communication cable and pull in it into the branch pipe from the guide pipe upon a need of installation of a communication cable in the branch pipe, it is not necessary to lay communication cables which are not decided to use and therefore it is possible to avoid wasting them.

Therefore, the same level of versatility at worksite as an aerial installation is achieved. The use of a lead tug on the end of branch communication cables, branch tension members, lead strings makes the installation of the branch communication cable, branch tension members, and lead strings easy and thus increasing the work efficiency. Moreover, since a lead tug is left hang up outside the guide pipe near an opening of branch pipe of the branch pipes for which the installation of communication cables is unnecessary, it is possible to quickly cope with the need when it arises.

Laying a guide pipe in which a plurality of communication cables are placed in parallel in the lateral direction in the main pipe allows to reduce the height of the guide pipe to a minimum and therefore, when there is a vacant space in the upper space of inside the pipeline such as a sewer pipeline and a storm drain pipeline, it is made possible to place the cables in that space without hindering the fluid flow.

Installing the branch communication cables in a guide pipe in an orderly fashion corresponding to the position of branch pipes makes the installation operation easy and free of entanglement of branch communication cables when installing the branch communication cables into each branch pipe.

When a branch communication cable is installed in a tubular branch tension member which has an allowable bending radius larger than that of the branch communication cable and disposed at least from an opening of branch pipe to a branch pipe box, it is possible to prevent the branch communication cable from being bent and thereby damaged.

Moreover, since the branch communication cable is protected by the tube, its water resistance, chemical resistance, and rat-proof characteristics are improved. Further, the branch communication will not be damaged even when conducting high pressure washing of the branch pipe for cleaning purposes. Furthermore, since a plurality of branch communication cables are installed, it is possible to readily cope with the laying of the branch communication cables in the branch pipes installed in an apartment building.

Accommodating one end of the tube in a guide pipe allows to use the tube in the guide pipe by sliding it even when the length of the tube becomes insufficient, and therefore the stability of work execution is improved and the production does not demand a high accuracy in length of the tube.

Making the tube slidable at least with respect to the holding members (correspond to guide members and fixing members) and disposing the fixing members in a pipe bend of branch pipes allows to install branch communication cables by pulling a tube into a branch pipe without placing excess force on the tube and without damaging the tube and the branch communication cables.

Since a guide pipe for laying communication cables has an enough width for installing a plurality of branch communication cables depending on the corresponding branch pipes, and also has a inner height smaller than twice of the outer diameter of the branch communication cable, it is possible to prevent the disarrangement of the branch communication cables and the branch lead strings accommodated in the guide pipe.

Since there is one or more partitioning plates provided to divide the inside of the guide pipe, the branch communication cables and branch lead strings to be installed in a plurality of branch pipes can be arranged in an orderly fashion without being damaged by intersections and entanglements.

Forming a guide pipe with a dual structure of an inner and outer pipes makes it possible to install a trunk communication cable with a larger diameter and a branch communication cable with a smaller diameter into the same guide pipe thereby restricting the height of the guide pipe and facilitating the communication cable laying design in an underground pipeline.

Therefore, the present invention provides a low cost laying operation of communication cables without using a conventional robot and allows a rapid construction of a communication cable network since it can lay each communication cable in the upper space of inside main pipes by tensioning a trunk tension member.

The invention claimed is:

1. A method for laying communication cables in an underground pipeline wherein one or more branch pipes branch off from a main pipe constructed between pits and the communication cables are laid through the main pipe and the branch pipes, characterized in that, a plurality of high-strength low-elongation tension members, including at least one each of a trunk tension member and a branch tension member, are disposed along a trunk communication cable laid in the main pipe and a branch communication cable laid in a branch pipe, the tension members being slidable in the lengthwise direction with respect to each communication cable, and then each communication cable is inserted into the main pipe and the branch pipe by drawing in the trunk tension member placed along the trunk communication cable from one pit to the other pit within the main pipe and the branch tension member placed along the branch communication cable from said pit to a branch pipe box through the main pipe and the branch pipe, and subsequently each communication cable is laid in the upper space of inside the main pipe by tensioning each tension member thereby stretching the tension members inserted in the main pipe substantially straight in the upper space of inside the main pipe, and also the branch communication cable is laid in the branch pipe in such a way that it is prevented from becoming loose by tensioning the branch tension member inserted in the branch pipe.

2. The method for laying communication cables in an underground pipeline according to claim 1, characterized in that the branch tension member to be inserted in the branch pipe is tied to the trunk tension member to be laid in the main pipe at a position corresponding to an opening of the branch pipe to the main pipe.

3. The method for laying communication cables in an underground pipeline according to claim 1, characterized in that the branch tension member to be inserted in the branch pipe branches off from the trunk tension member to be laid in the main pipe at a position corresponding to an opening of the branch pipe to the main pipe.

4. The method for laying communication cables in an underground pipeline according to claim 1, characterized in that at least one each of the communication cables and tension members are inserted in a guide conduit, both being placed in parallel so as to be slidable with each other in the lengthwise direction, and the branch communication cable and the branch tension member branch off to the outside from said guide conduit at a position on the guide conduit corresponding to an opening of the branch pipe to the main pipe.

5. The method for laying communication cables in an underground pipeline according to claim 1, characterized in that the tension member has a cylindrical form and the communication cable is inserted in the tension member so that the communication cable is slidable in the lengthwise direction with respect to the tension member.

6. The method for laying communication cables in an underground pipeline according to claim 1, characterized in that the tension member is a string-like body or a strip-like body and the communication cable is partly bound to the tension member allowing some slack thereon so that the communication cable is slidable in the lengthwise direction with respect to the tension member.

7. The method for laying communication cables in an underground pipeline according to claim 1, characterized in that the cross section of the tension member consists of a rigid body having a shape including a space open to one direction such as a substantially U-shape, a substantially V-shape, and a substantially W-shape and a communication cable of the communication cables is placed in the space of the tension member so that the communication cable is slidable with respect to the tension member.

8. The method for laying communication cables in an underground pipeline according to claim 1, characterized in that after laying the trunk tension member and the communication cable in the upper space of inside the main pipe by tensioning the trunk tension member, an arcuate or ring-like slack prevention member is inserted in the main pipe, and thereafter the slack prevention member is expanded in diameter to press the trunk tension member and the trunk communication cable against the inner wall surface of the main pipe.

9. The method for laying communication cables in an underground pipeline according to claim 1, characterized in that after installing the tension member and the communication cable into the main pipe and the branch pipe, a guide member is disposed at an opening of the branch pipe to the main pipe to make the communication cable and the tension member skirt around the area directly beneath the opening of the branch pipe.

10. The method for laying communication cables in an underground pipeline according to claim 1, characterized in that after installing the tension member and the communication cable in the main pipe and the branch pipe, a flexible and shape retaining pipe having a diameter smaller than the inner diameter of the branch pipe is inserted in the branch pipe so that the branch communication cable and the branch tension member installed in the branch pipe are clamped between the inner surface of the branch pipe and the outer surface of the pipe.

11. The method for laying communication cables in an underground pipeline according to claim 1, characterized in that after installing the tension member and the communication cable in the main pipe and the branch pipe, the branch tension member and the branch communication cable at an opening of the branch pipe to the main pipe is guided from the upper space of inside the main pipe to the upper part or the lower part of the branch pipe by means of a guide member disposed in the opening of the branch pipe, and the branch tension member is tensioned so that the branch communication cable is laid along the upper surface or the lower surface of the branch pipe.

12. The method for laying communication cables in an underground pipeline according to claim 9, characterized in that the guide member includes a trunk slide part projecting into the main pipe from the branch pipe and slidably holding members to be laid in the main pipe, and a branch slide part for slidably holding members to be laid in the branch pipe.

13. The method for laying communication cables in an underground pipeline according to claim 9, characterized in that a curable cylindrical fixing member is hardened in the end of the guide member on the inward side with respect to the branch pipe in a state that the curable cylindrical fixing member is expanded and pressed against the inner surface of the branch pipe so that the guide member is secured to the branch pipe.

14. The method for laying communication cables in an underground pipeline according to claim 12, characterized in that the guide member consists of a tubular main part having said trunk slide part and a support part for supporting the branch communication cable and the branch tension member, and a tubular rotary part having said branch slide part and rotatably fitted with said tubular main part, wherein the support part and the branch slide part is aligned with each other to hold the branch communication cable and the branch tension member, and then the guide member is placed at the opening of the branch pipe holding the members laid in the main pipe in the upper space of inside the main pipe with the trunk slide part of the tubular main part, and then the tubular rotary part is rotated with respect to the tubular main part thereby placing the branch slide part in the lower part of the branch pipe so that the branch communication cable and the branch tension member are guided into the lower part of the branch pipe.

15. The method for laying communication cables in an underground pipeline according to claim 12, characterized in that the guide member consists of a pipe body formed of a plate member by spirally rolling it up and fitting adjacent side edges of the plate member slidably with each other and formed with a trunk slide part and a support part in one end and a branch slide part in the other end, wherein said support part and said branch slide part are aligned with each other to hold the branch communication cable and the branch tension member, and the guide member is placed at the opening of the branch pipe to make the trunk slide part hold the members laid in the main pipe in the upper space of inside the main pipe, and then the plate member is twisted expanding its diameter and placing the branch slide part in the lower part of the branch pipe so that the branch communication cable and the branch tension member are guided into the lower part of the branch pipe.

16. The method for laying communication cables in an underground pipeline according to claim 9, characterized in that a seal formed of a water-swelling rubber is attached to the outer surface of the guide member making the seal swell with the water in the branch pipe so that the guide member is air tightly secured to the branch pipe.

17. The method for laying communication cables in an underground pipeline according to claim 9, characterized in that the guide member is a pipe, each end of the pipe being made of a rigid material, the middle part of it being made of a deformable resilient material, and the branch communication cable and the branch tension member are inserted in the pipe in a straight state and then the pipe is placed at the opening of the branch pipe making the leading end of the pipe project into the main pipe to hold the members laid in the main pipe in the upper space of inside the main pipe, and the middle part of the pipe is twisted deforming it into a spiral shape along the inner surface of the branch pipe, and the rear end of the pipe is placed in the lower part of the branch pipe so that the branch communication cable and the branch tension member are guided into the lower part of the branch pipe.

18. The method for laying communication cables in an underground pipeline according to claim 9, characterized in that the guide member consists of a pipe made of a deformable resilient material, each end of the pipe being fixed respectively to an expansion member, the expansion member being formed of a ring having a diameter slightly larger than the inner diameter of the branch pipe, its portion being cut open, and the arrangement is made such that the branch communication cable and the branch tension member are inserted in the pipe in a straight state and the expansion members are contracted with their both ends fastened temporarily and, in this state, the guide member is placed at an opening of the branch pipe so that the leading end of the pipe projects into the main pipe holding the members laid in the main pipe in the upper space of inside the main pipe, and then the temporal fastening of the expansion member at the leading end of the pipe is released to make it expand pressing itself against the inner surface of the branch pipe, and then the middle part of the pipe is twisted to deform it into a spiral shape along the inner surface of the branch pipe placing the rear end of the pipe in the lower part of the opening of branch pipe, and further the temporal fastening of the expansion member at the rear end of the pipe is released to make it expand pressing itself against the inner surface of the branch pipe, and thus the branch communication pipe and the branch tension member are guided into the lower part of the branch pipe by the guide member.

19. The method for laying communication cables in an underground pipeline according to claim 1, characterized in that a fixing member is disposed in an upper part adjacent an inner surface of a valley part of a pipe bend formed in the branch pipe and the branch tension member is slidably attached to an inside or an outside of said fixing member so that the branch communication cable is placed in the upper part adjacent the inner surface of the pipe bend.

20. A method for laying communication cables in an underground pipeline, wherein communication cables are laid in a main pipe of the underground pipeline and at least one branch pipe of the underground pipeline extending from the main pipe, the at least one-branch pipe being branched off from the main pipe constructed between pits, characterized in that high-strength low-elongation tension members are inserted in a guide conduit and arranged to be slidable in a lengthwise direction along a respective trunk communication cable, of the communication cables, laid in the main pipe and a respective branch communication cable, of the communication cables, laid in the at least one branch pipe, and the branch communication cable and a respective branch tension member, of the high-strength low-elongation tension members, are taken out from a portion of the guide conduit corresponding to an opening of the at least one branch pipe, and a guide member is slidably attached to an outer periphery of the guide conduit in a portion corresponding to the opening of the at least one branch pipe, the branch communication cable and the respective branch tension member being attached to a portion of the guide conduit corresponding to an upper part in the at least one branch pipe, and thereafter the guide conduit is drawn in from one pit to the other pit through the main pipe thereby drawing in the trunk communication cable and a respective trunk tension member, of the high-strength low-elongation tension members, from said one pit to said other pit through the main pipe and also drawing in the branch communication cable and the respective branch tension member from the one pit to near the opening of the at least one branch pipe in the main pipe, and then the branch tension member placed near the opening of the at least one branch pipe is pulled up from a branch pipe box placing the guide member in the opening of the at least one branch pipe at the same time and drawing in the branch communication cable and the respective branch tension member, and finally the trunk tension member between the pits is tensioned to stretch the respective trunk tension member substantially straight in an upper space of inside the main pipe thereby laying the guide conduit and the trunk communication cable in the upper space of inside the main pipe, and also the branch tension member is tensioned between the opening of the branch pipe and the branch pipe box to stretch the branch tension member substantially straight in the upper space of inside the at least one branch pipe thus laying the branch communication cable in the upper space of inside the branch pipe.

21. The method for laying communication cables in an underground pipeline according to claim 20, characterized in that a fixing member is disposed in an upper part adjacent an inner surface of a valley part of a pipe bend formed in the branch pipe and the branch tension member is slidably attached to the inside or the outside of said fixing member so that the branch communication cable is placed in the upper part of the inner surface of the pipe bend.

22. A method for laying communication cables in an underground pipeline having one or more branch pipes that branch off from a main pipe constructed between pits, the method characterized in that, a high-strength low-elongation trunk tension member is slidably inserted throughout all of a guide conduit or slidably inserted through a portion of a guide conduit, and a lead string for replacing at least one communication cable is accommodated in the lengthwise direction in the guide conduit in advance, and after the guide conduit is laid in the main pipe, the guide conduit is disposed in an upper space inside the main pipe and substantially parallel to an upper inner surface of the main pipe by tensioning the trunk tension member in the main pipe such that the trunk tension member is substantially linearly tensioned and placed at the upper inner surface of the main pipe, and then at least one of the communication cables to be laid is installed in one of the one or more branch pipes to provide a branch communication cable, in such a way that the at least one communication cable is drawn into the branch pipe from the guide conduit by appropriately replacing the lead string associated with the guide conduit by the lead string being connected with the at least one communication cable and pulled out from the inside of the guide conduit, the branch communication cable not being installed until installation thereof has become necessary.

23. The method for laying communication cables in an underground pipeline according to claim 22, wherein the branch pipe is one of two or more branch pipes, characterized in that first one end of the lead string is taken out from a portion of the guide conduit corresponding to openings of the two or more branch pipes, and then the guide conduit is laid in the main pipe and the branch communication cable is laid in one of the two or more branch pipes, and at least a second branch communication cable is installed in a remaining one of the two or more branch pipes in which no communication cables are yet installed in such a way that one end of the lead string is placed at the opening of the remaining one branch pipe and is drawn out to a branch pipe box and the other end of the lead string is connected to the at least second branch communication cable, and then the end of the lead string which has been taken out in the branch pipe box is pulled thereby laying the at least second branch communication cable in at least the remaining one of the two or more branch pipes through the guide conduit.

24. The method for laying communication cables in an underground pipeline according to claim 22, characterized in that after the at least one communication cable and/or the lead string are inserted into the guide conduit and one end of the lead string is taken out from a portion of the guide conduit corresponding to openings of two or more branch pipes, the guide conduit is laid in the main pipe and the branch communication cable is laid in at least one of the two or more branch pipes, and then one end of the lead string placed at the opening of one of the branch pipes is taken out to a branch pipe box and at least a second branch communication cable of the communication cables is installed in a remainder of the two or more branch pipes in which communication cables are not yet installed, in such a way that the second branch communication cable is connected to the other end of the lead string and one end of the lead string which has been taken out to a branch pipe box is pulled laying the second branch communication cable in at least one of the remainder of the two or more branch pipes through the guide conduit, the branch communication cables not being installed until installation thereof has become necessary.

25. The method for laying communication cables in an underground pipeline according to claim 23, characterized in that when drawing out the lead string placed at the opening of the branch pipe through the branch pipe to the branch pipe box, the lead string is taken out to one end of the main pipe and a pull member is installed from the branch pipe box to one end of the main pipe to connect the lead string with the pull member at the end of the main pipe, and then the pull member on a branch pipe box side is pulled to draw in the lead string to the branch pipe box.

26. The method for laying communication cables in an underground pipeline according to claim 22, characterized in that one end of the lead string is taken out of the guide conduit at a portion corresponding to an opening of one of the one or more branch pipes to the main pipe and a lead tug is provided on one end of the lead string placed at the opening of the branch pipe, the lead tug being used for hooking or grasping the lead string from the branch pipe box.

27. The method for laying communication cables in an underground pipeline according to claim 22 or 24, characterized in that an outer diameter of one of the communication cables is substantially equal to that of the lead string.

28. The method for laying communication cables in an underground pipeline according to claim 22 or 24, characterized in that a high-strength low-elongation branch tension member branches off from the guide conduit in a vicinity of an opening of one of the one or more branch pipes to the main pipe and the high-strength low-elongation branch tension member is slidably integrated with the lead string or branch communication cable to lay it in the branch pipe, the lead string or branch communication cable being laid in the branch pipe by laying the high-strength low elongation branch tension member.

29. A method for laying communication cables in an underground pipeline, wherein two or more branch pipes branch off from a main pipe, of the underground pipeline, constructed between pits, characterized in that a high-strength low-elongation trunk tension member is slidably inserted throughout all of a guide conduit or slidably inserted through a portion of a guide conduit, and the trunk tension member is tensioned laying the guide conduit in an upper space of an inside of the main pipe and substantially parallel to an upper inner surface of the main pipe, and also laying at least one branch communication cable, of the communication cables, in the two or more branch pipes which are in need of communication cable installation, and at least one of a remainder of the communication cables to be laid are installed in at least one of a remainder of the two or more branch pipes in which branch communication cables are not yet installed in such a way that a lead string is inserted in the guide conduit and one end of the lead string is taken out from the portion of the guide conduit corresponding to an opening of one of the remainder of the two or more branch pipes, and at least one of the at least two remaining communication cables, to provide at least one more branch communication cable, is attached to the other end of the lead string, and the one end of the lead string placed near the opening of the one of the remainder of the two or more branch pipes is pulled thereby laying the at least one more branch communication cable in the at least one of the remainder of the two or more branch pipes through the guide conduit, the branch communication cables not being installed until installation thereof has become necessary.

* * * * *

UNITED STATES PATENT AND TRADEMARK OFFICE
CERTIFICATE OF CORRECTION

| | |
|---|---|
| PATENT NO. | : 7,179,019 B2 |
| APPLICATION NO. | : 10/110001 |
| DATED | : February 20, 2007 |
| INVENTOR(S) | : Ichiro Seto et al. |

It is certified that error appears in the above-identified patent and that said Letters Patent is hereby corrected as shown below:

Title page,
    On page 1, under (73) Assignees: "Sanski Engineering Co., Ltd." should read --Sanki Engineering Co., Ltd.--.

Signed and Sealed this

Twenty-sixth Day of June, 2007

JON W. DUDAS
*Director of the United States Patent and Trademark Office*